(12) United States Patent
Kimura et al.

(10) Patent No.: US 10,636,368 B2
(45) Date of Patent: Apr. 28, 2020

(54) IMAGE DISPLAY APPARATUS AND METHOD FOR CONTROLLING SAME

(71) Applicant: CANON KABUSHIKI KAISHA, Tokyo (JP)

(72) Inventors: Takushi Kimura, Kawasaki (JP); Izumi Kanai, Machida (JP); Yoshihisa Furumoto, Machida (JP); Takeshi Ikeda, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 60 days.

(21) Appl. No.: 15/547,579

(22) PCT Filed: Feb. 12, 2016

(86) PCT No.: PCT/JP2016/000742
§ 371 (c)(1),
(2) Date: Jul. 31, 2017

(87) PCT Pub. No.: WO2016/136175
PCT Pub. Date: Sep. 1, 2016

(65) Prior Publication Data
US 2018/0040279 A1 Feb. 8, 2018

(30) Foreign Application Priority Data
Feb. 23, 2015 (JP) .................. 2015-033005
Jul. 7, 2015 (JP) .................. 2015-135997

(51) Int. Cl.
*G09G 3/34* (2006.01)
*G02F 1/13357* (2006.01)

(52) U.S. Cl.
CPC ....... *G09G 3/342* (2013.01); *G02F 1/133602* (2013.01); *G02F 1/133611* (2013.01);
(Continued)

(58) Field of Classification Search
CPC .... G09G 3/342; G09G 3/3426; G09G 3/2092; G01B 11/08; G02F 1/133602; G02F 1/1347
(Continued)

(56) References Cited

U.S. PATENT DOCUMENTS 9,488,518 B2   11/2016   Ikeda
9,501,965 B2   11/2016   Ikeda et al.
(Continued)

FOREIGN PATENT DOCUMENTS

EP   2058792 A2   5/2009
JP   1084551 A    3/1998
(Continued)

OTHER PUBLICATIONS

European Search Report issued in corresponding EP Application No. 16754929.4 dated Aug. 24, 2018.
(Continued)

Primary Examiner — Fred Tzeng
(74) Attorney, Agent, or Firm — Venable LLP

(57) ABSTRACT

An image display apparatus includes: a display unit; a plurality of light emitting units; and a light-emission controller configured to individually control light-emission brightness of each of the light emitting units, wherein in a case where brightness of light applied to a region of the display unit on which a black region of an input image is displayed is less than or equal to predetermined brightness, transmittance of the display unit is controlled such that transmittance of the region of the display unit corresponding to the black region becomes higher than that in a case in which the brightness is higher than the predetermined brightness.

11 Claims, 37 Drawing Sheets

(52) U.S. Cl.
CPC ....... *G09G 3/3426* (2013.01); *G02F 2203/64* (2013.01); *G09G 2320/0238* (2013.01); *G09G 2320/0646* (2013.01); *G09G 2360/16* (2013.01)

(58) Field of Classification Search
USPC .......................................................... 345/102
See application file for complete search history.

(56) References Cited

U.S. PATENT DOCUMENTS

| | | | | |
|---|---|---|---|---|
| 9,978,319 B2* | 5/2018 | Furumoto | ............ | G09G 3/3426 |
| 2008/0309811 A1* | 12/2008 | Fujinawa | .............. | G02F 1/1347 |
| | | | | 348/333.01 |
| 2009/0115720 A1* | 5/2009 | Inada | ................... | G09G 3/3426 |
| | | | | 345/102 |
| 2010/0073276 A1* | 3/2010 | Koike | .................. | G09G 3/3426 |
| | | | | 345/102 |
| 2010/0328667 A1* | 12/2010 | Wegmuller | ............... | G01J 3/02 |
| | | | | 356/402 |
| 2012/0200485 A1 | 8/2012 | Uchibe | | |
| 2012/0262567 A1* | 10/2012 | Tsuboi | ............... | H05K 13/0812 |
| | | | | 348/86 |
| 2013/0027540 A1* | 1/2013 | Ito | .......................... | G01B 11/08 |
| | | | | 348/79 |
| 2013/0155125 A1* | 6/2013 | Inamura | ................... | G09G 5/10 |
| | | | | 345/690 |
| 2013/0265323 A1 | 10/2013 | Morikawa et al. | | |
| 2014/0055510 A1 | 2/2014 | Kitada | | |
| 2014/0085360 A1* | 3/2014 | Ohno | .................... | G09G 3/3426 |
| | | | | 345/694 |
| 2015/0035848 A1* | 2/2015 | Furumoto | ............ | G09G 3/3426 |
| | | | | 345/589 |
| 2016/0027168 A1 | 1/2016 | Ikeda et al. | | |
| 2016/0035285 A1* | 2/2016 | Jung | .................... | G09G 3/2092 |
| | | | | 345/207 |
| 2016/0042701 A1 | 2/2016 | Furumoto | | |
| 2016/0155372 A1* | 6/2016 | Ikeda | ................... | G09G 3/3426 |
| | | | | 345/589 |
| 2017/0047022 A1 | 2/2017 | Ikeda | | |

FOREIGN PATENT DOCUMENTS

| | | |
|---|---|---|
| JP | 2002099250 A | 4/2002 |
| JP | 2005049746 A | 2/2005 |
| JP | 2007322882 A | 12/2007 |
| JP | 2013114084 A | 6/2013 |

OTHER PUBLICATIONS

International Preliminary Report on Patentability issued in International Application No. PCT/JP2016/000742 dated Aug. 29, 2017.
Written Opinion and International Search Report issued in International Application No. PCT/JP2016/000742 dated May 17, 2016.
European Office Action issued in corresponding European Application No. 16754929.4 dated Apr. 12, 2019.

* cited by examiner

OCCURRENCE OF
BLACK DISPLAY-UNEVENNESS

FIG. 7

| 2 | 2 | 2 | 2 | 2 | 2 | 2 | 2 |
|---|---|---|---|---|---|---|---|
| 2 | 2 | 2 | 2 | 2 | 2 | 2 | 2 |
| 2 | 2 | 2 | 2 | 2 | 2 | 2 | 2 |
| 2 | 2 | 2 | 2 | 2 | 2 | 2 | 2 |
| 2 | 2 | 2 | 2 | 2 | 2 | 2 | 2 |
| 2 | 2 | 2 | 2 | 2 | 2 | 2 | 2 |

DISTRIBUTION OF
MAXIMUM GRADATION VALUES

FIG. 8

| 6.25 | 6.25 | 6.25 | 6.25 | 6.25 | 6.25 | 6.25 | 6.25 |
|------|------|------|------|------|------|------|------|
| 6.25 | 6.25 | 6.25 | 6.25 | 6.25 | 6.25 | 6.25 | 6.25 |
| 6.25 | 6.25 | 6.25 | 6.25 | 6.25 | 6.25 | 6.25 | 6.25 |
| 6.25 | 6.25 | 6.25 | 6.25 | 6.25 | 6.25 | 6.25 | 6.25 |
| 6.25 | 6.25 | 6.25 | 6.25 | 6.25 | 6.25 | 6.25 | 6.25 |
| 6.25 | 6.25 | 6.25 | 6.25 | 6.25 | 6.25 | 6.25 | 6.25 |

DISTRIBUTION OF
LIGHT-EMISSION BRIGHTNESS

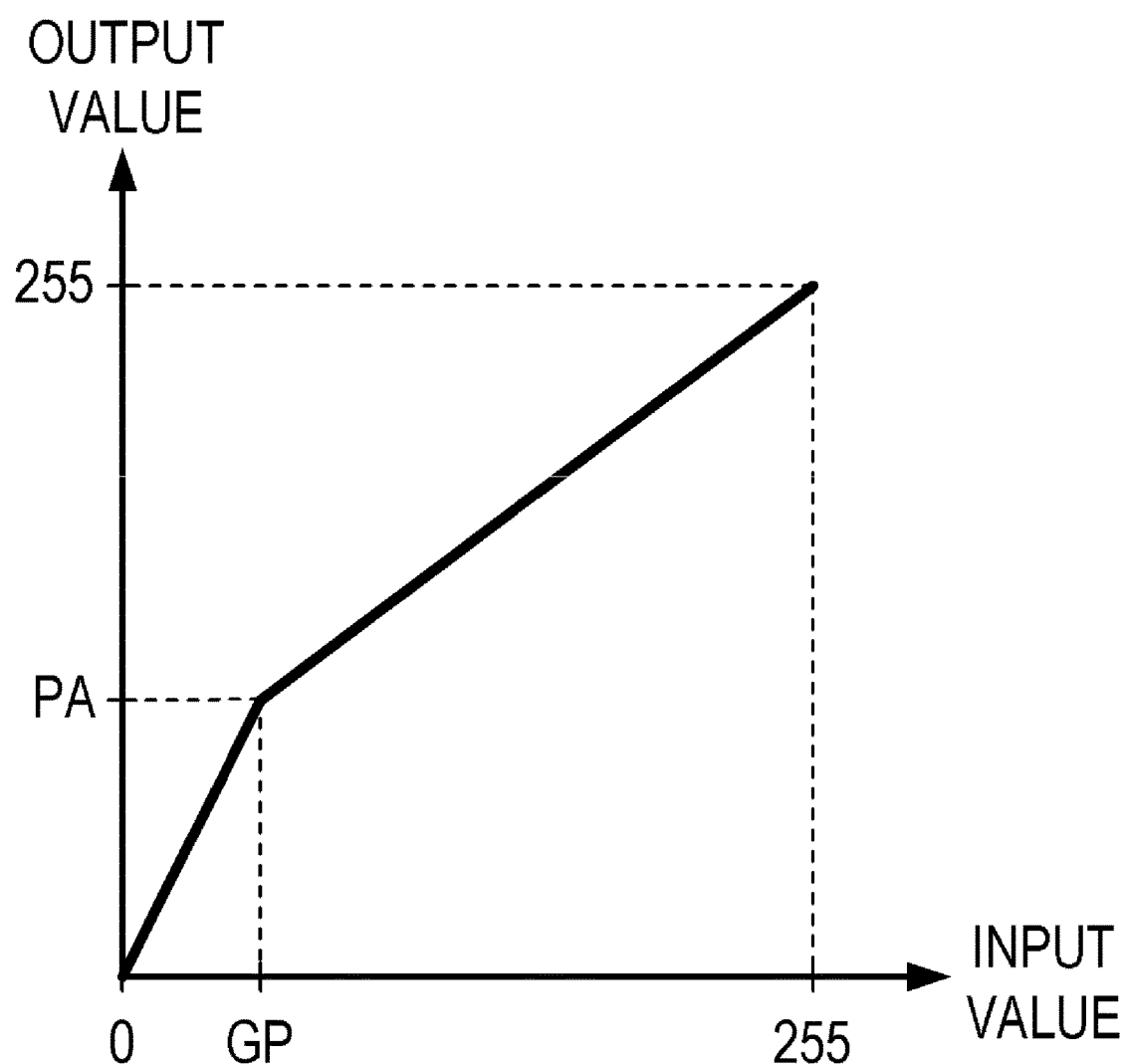

IMAGE DISPLAY APPARATUS AND METHOD FOR CONTROLLING SAME

TECHNICAL FIELD

The present invention relates to an image display apparatus and a method for controlling the same.

BACKGROUND ART

A liquid-crystal display apparatus has a liquid-crystal panel unit and a backlight unit. The liquid-crystal panel unit has a plurality of liquid-crystal devices. By the control of voltage to be applied to the respective liquid-crystal devices, the transmittance of the respective liquid-crystal devices is controlled. The voltage to be applied to the respective liquid-crystal devices is determined according to a gradation value of image data. The backlight unit is provided on the back-surface side of the liquid-crystal panel unit. Light from the backlight unit is modulated when passing through the respective liquid-crystal devices. Thus, an image is displayed on a screen.

However, in a case where uneven stress is applied to a member supporting the liquid-crystal panel unit, the orientation of the liquid-crystal devices (liquid-crystal molecules) is partially disordered without the application of voltage to the liquid-crystal devices. Therefore, the transmittance of the liquid-crystal panel unit does not become uniform even if a gradation value of image data is uniformly set, which results in the display of an image with unevenness (brightness or color unevenness). Such display unevenness (brightness or color unevenness on a screen) is particularly conspicuous in a case where a gradation value of image data is small. Specifically, in a case where a gradation value of image data is small, display unevenness in which display brightness (screen brightness) is partially high is conspicuous. In addition, such display unevenness occurs also in a case where a black image entirely colored in black is displayed. Therefore, such display unevenness will be described as "black display-unevenness" below.

As technology for reducing display unevenness, technology disclosed in PTL 1 has been proposed. According to the technology disclosed in PTL 1, an offset value is added to input image data.

Further, as technology relating to a liquid-crystal display apparatus, technology disclosed in PTL 2 has been proposed. According to the technology disclosed in PTL 2, a plurality of light sources is used as the light sources of a backlight unit. Further, the light-emission brightness of the plurality of light sources is individually controlled based on the brightness of image data, and the image data is corrected based on the light-emission brightness of each of the light sources. By the technology disclosed in PTL 2, the contrast of a display image (image displayed on a screen) can be increased.

CITATION LIST

Patent Literature

[PTL 1]
Japanese Patent Application Laid-open No. H10-84551
[PTL 2]
Japanese Patent Application Laid-open No. 2002-99250

SUMMARY OF INVENTION

Technical Problem

By the technology disclosed in PTL 1, black display-unevenness can be reduced in a case where a gradation value of input image data is increased by an offset value. However, since the display brightness of a black color is increased with an increase in the gradation value of the black color, there is a likelihood that the contrast of a display image is reduced.

Further, in a configuration in which the technology disclosed in PTL 2 is combined with the technology disclosed in PTL 1 in order to reduce black display-unevenness using the technology disclosed in PTL 1, the brightness of input image data is increased by the addition of an offset value. As a result, since the light-emission brightness of light sources is increased due to the addition of the offset value, there is a likelihood that the contrast of a display image is reduced.

The present invention provides technology capable of preventing a reduction in the contrast of a display image caused in a case where black display-unevenness is reduced.

Solution to Problem

The present invention in its first aspect provides an image display apparatus comprising:
a display unit configured to display an image by controlling transmittance of light based on an input image;
a plurality of light emitting units configured to apply light to the display unit; and
a light-emission controller configured to individually control light-emission brightness of each of the light emitting units based on brightness of each part of the input image corresponding to each of the light emitting units, wherein
in a case where brightness of light applied to a region of the display unit on which a black region of the input image is displayed is less than or equal to predetermined brightness, transmittance of the display unit is controlled such that transmittance of the region of the display unit corresponding to the black region becomes higher than that in a case in which the brightness is higher than the predetermined brightness.

The present invention in its second aspect provides an image display apparatus comprising:
a plurality of light emitting units configured to apply light to a display unit;
a light-emission controller configured to individually control light-emission brightness of each of the light emitting units based on brightness of each part of an image corresponding to each of the light emitting units;
a first corrector configured to increase a gradation value smaller than a first gradation value of an input image to generate a first correction image;
a second corrector configured to correct a gradation value of a pixel of the first correction image according to brightness of light applied to the display unit corresponding to the pixel and reduce the corrected gradation value smaller than a second gradation value to generate a second correction image; and
the display unit configured to display an image by transmitting light applied from the plurality of light emitting units based on the second correction image.

The present invention in its third aspect provides a method for controlling an image display apparatus having
a display unit configured to display an image by transmitting light, and
a plurality of light emitting units configured to apply light to the display unit,
the method comprising:
a light-emission control step of individually controlling light-emission brightness of each of the light emitting units based on brightness of each part of an input image corresponding to each of the light emitting units; and a transmittance control step of controlling transmittance of the display unit based on the input image, wherein in a case where brightness of light applied to a region of the display unit on which a black region of the input image is displayed is less than or equal to predetermined brightness, transmittance of the display unit is controlled in the transmittance control step such that transmittance of the region of the display unit corresponding to the black region becomes higher than that in a case in which the brightness is higher than the predetermined brightness.

The present invention in its fourth aspect provides a method for controlling an image display apparatus having a display unit configured to display an image by transmitting light, and a plurality of light emitting units configured to apply light to the display unit, the method comprising:

a light-emission control step of individually controlling light-emission brightness of each of the light emitting units based on brightness of each part of an image corresponding to each of the light emitting units;

a first correction step of increasing a gradation value smaller than a first gradation value of an input image to generate a first correction image;

a second correction step of correcting a gradation value of a pixel of the first correction image according to brightness of light applied to the display unit corresponding to the pixel and reducing the corrected gradation value smaller than a second gradation value to generate a second correction image; and a transmittance control step of controlling transmittance of the display unit, based on the second correction image.

The present invention in its fifth aspect provides a program, wherein the program causes a computer to execute the above mentioned method.

Advantageous Effects of Invention

According to the present invention, a reduction in the contrast of a display image caused in a case where black display-unevenness is reduced can be prevented.

Further features of the present invention will become apparent from the following description of exemplary embodiments with reference to the attached drawings.

BRIEF DESCRIPTION OF DRAWINGS

FIG. 7 is a diagram showing an example of characteristic values according to the first embodiment;

FIG. 8 is a diagram showing an example of the light-emission brightness of light sources according to the first embodiment;

FIG. 30 is a diagram showing an example of a gamma adjustment table according to the third embodiment;

DESCRIPTION OF EMBODIMENTS

First Embodiment

Hereinafter, a description will be given of an image display apparatus and a method for controlling the same according to a first embodiment of the present invention.

Note that although the embodiment will describe an example of a case in which the image display apparatus is a transmission liquid-crystal display apparatus, the image display apparatus is not limited to a transmission liquid-crystal display apparatus. The image display apparatus is only required to be an image display apparatus that has a light-emission unit and a display unit that modulates light from the light-emission unit based on image data to display image on a screen. For example, the image display apparatus may be a reflective liquid-crystal display apparatus. Further, the image display apparatus may be a MEMS shutter display using a MEMS (Micro Electro Mechanical System) shutter instead of liquid-crystal devices.

In the embodiment, black display-unevenness correction processing is applied to input image data before local dimming processing, and then the local dimming processing is performed considering a change in gradation value by the black display-unevenness correction processing. In the embodiment, conspicuous unevenness occurs in an image displayed on the display unit in a case where a gradation value of image data used in the display unit is less than a preset first threshold. Here, "unevenness" represents the unevenness of at least one of brightness and color. In the embodiment, the above unevenness occurring in a case where a gradation value of image data used in the display unit is less than the first threshold will be described as "black display-unevenness," and the "first threshold" will be described as a "black display-unevenness threshold." The black display-unevenness correction processing represents image processing (first correction processing) in which a gradation value is increased to reduce black display-unevenness. In addition, in the embodiment, the light-emission unit has a plurality of light sources corresponding to a plurality of divided regions, respectively, constituting a screen region. The local dimming processing represents processing in which the light-emission brightness of each of the light sources is individually controlled based on image data. Specifically, by the local dimming processing, the light-emission brightness of the light sources is controlled to have lower values in regions in which the brightness of image data is low than regions in which the brightness of the image is high.

In the embodiment, black display-unevenness can be reduced by the black display-unevenness correction processing. Further, by the local dimming processing considering a change in gradation value by the black display-unevenness correction processing, a reduction in the contract of a display image (image displayed on the screen) caused in a case where black display-unevenness is reduced can be prevented.

Figure 1:
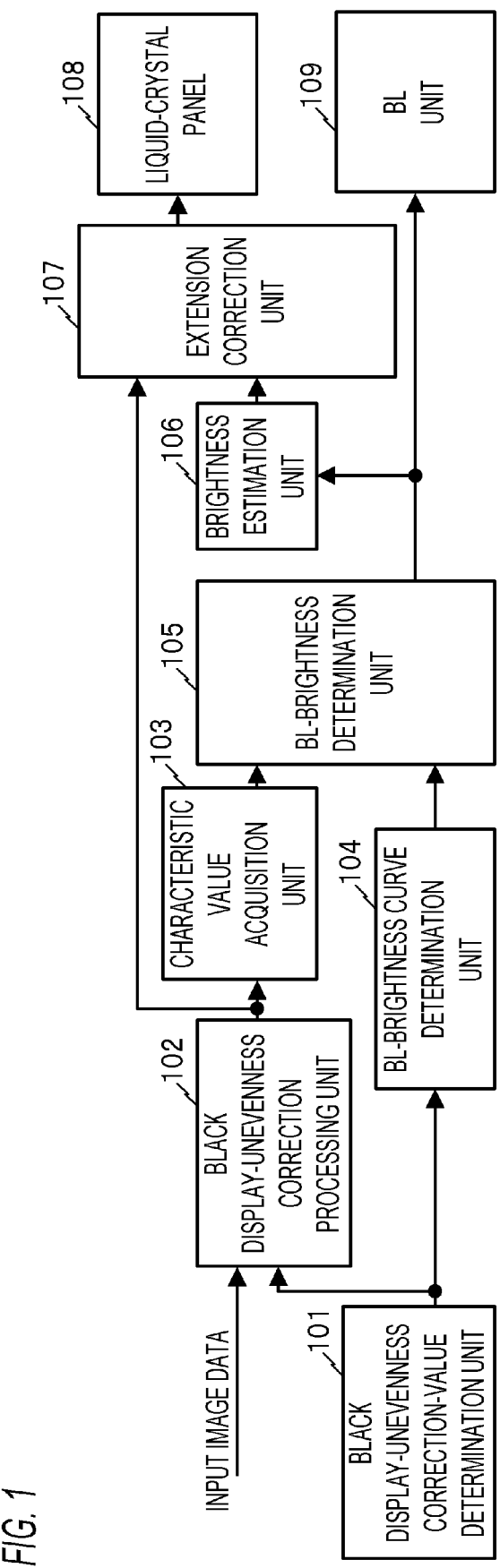
FIG. 1 is a block diagram showing an example of the functional configuration of an image display apparatus according to a first embodiment.

FIG. 1 is a block diagram showing an example of the functional configuration of the image display apparatus according to the embodiment. As shown in FIG. 1, the image display apparatus according to the embodiment has a black display-unevenness correction-value determination unit 101, a black display-unevenness correction processing unit 102, a characteristic value acquisition unit 103, a BL-brightness curve determination unit 104, a BL-brightness determination unit 105, a brightness estimation unit 106, an extension correction unit 107, a liquid-crystal panel 108, and a BL unit 109.

Figure 2:
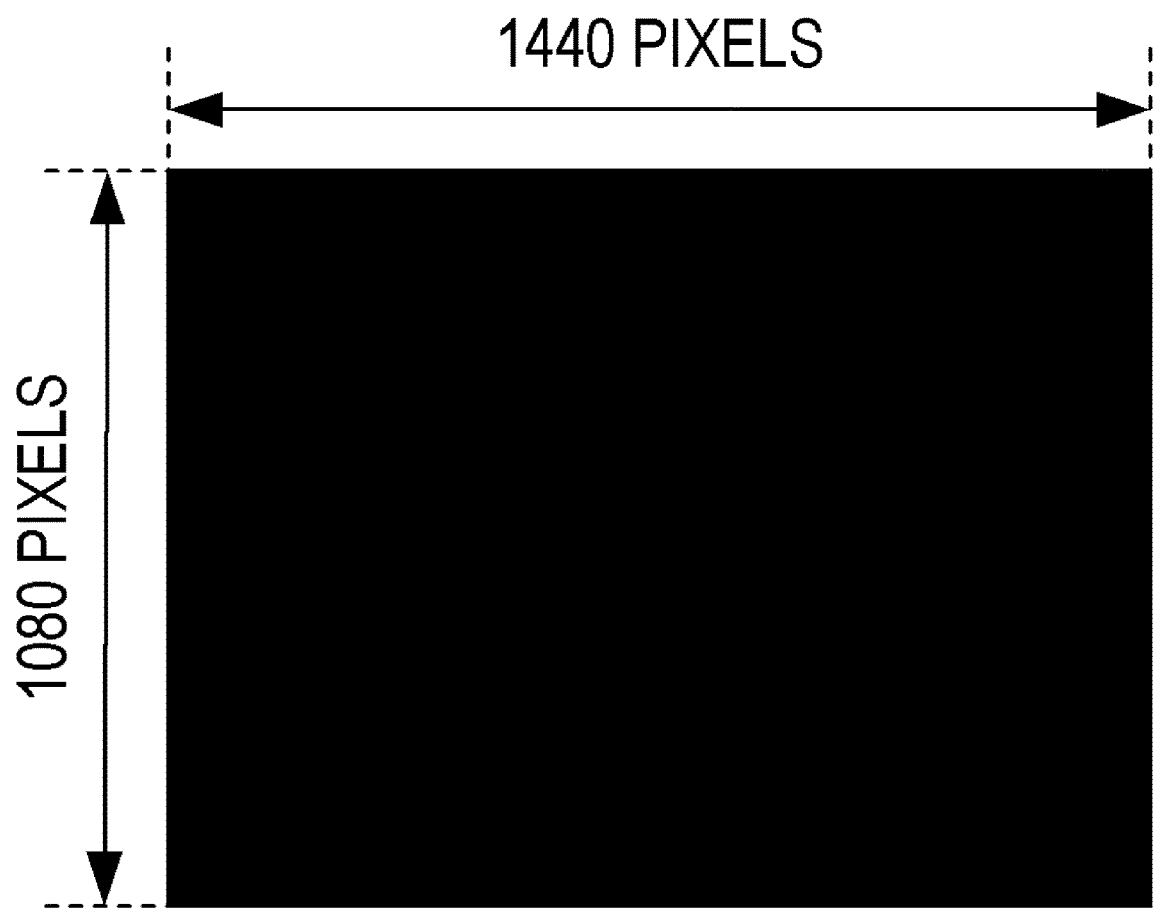
FIG. 2 is a diagram showing an example of input image data according to the first embodiment.

In the embodiment, it is assumed that input image data represents monochrome image data. In addition, it is assumed that image data has a gradation value (pixel value) of a 12-bit value (0 to 4095). Moreover, as shown in FIG. 2, it is assumed that input image data has 1440×1080 pixels in horizontal and vertical directions. In FIG. 2, all the pixels of the input image data have a gradation value of 0 (zero). That is, in FIG. 2, the input image data represents a black image entirely colored in black. Furthermore, in the embodiment, it is assumed that the liquid-crystal panel 108 has a contrast (contrast rate) of 1000:1, a gamma value of 1.0, and peak brightness of 200 cd/m$^2$. The contrast of the liquid-crystal panel 108 represents the contrast of a display image in a case where the light-emission brightness of each of the light sources is controlled at a reference value. The peak brightness of the liquid-crystal panel 108 represents the maximum value of a value at which display brightness (brightness of the screen) may be set. The reference value represents light-emission brightness required to display, for example, a white color.

Figure 3:
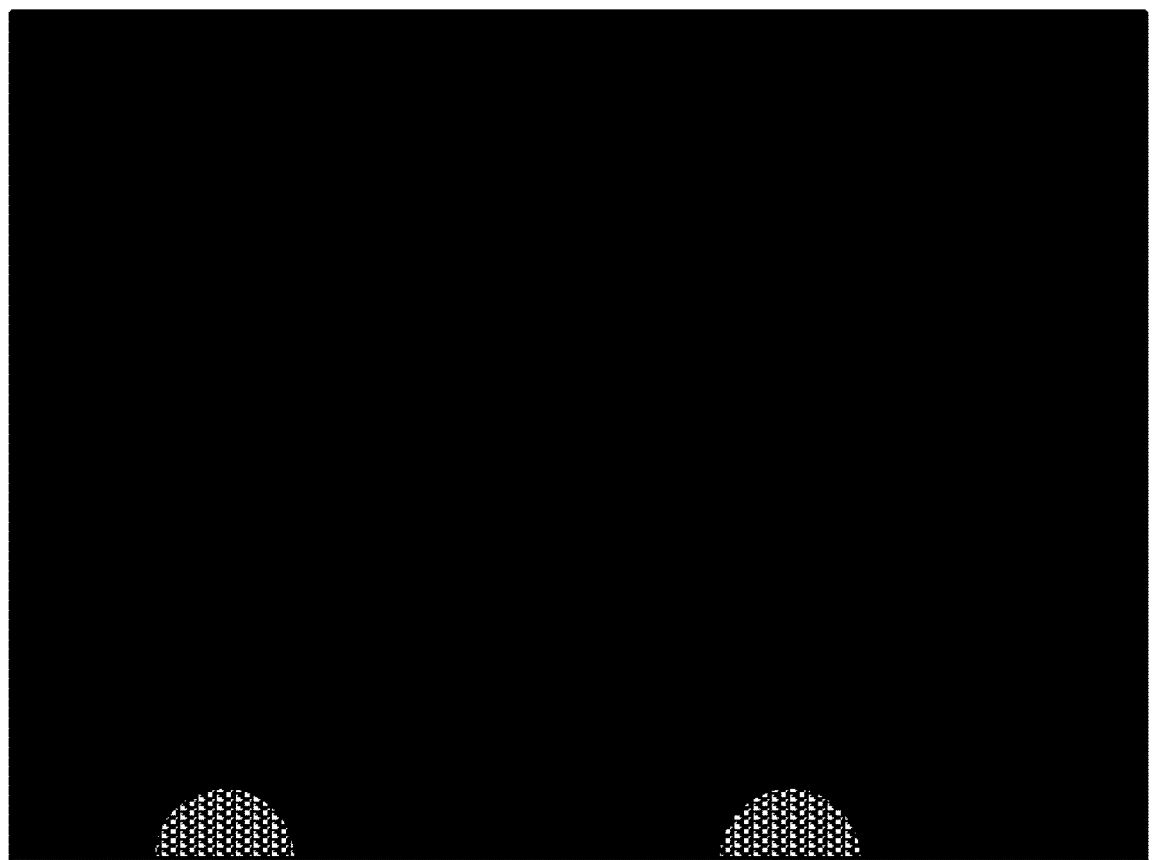
FIG. 3 is a diagram showing an example of black display-unevenness according to the first embodiment.

Furthermore, in the embodiment, it is assumed that black display-unevenness shown in FIG. 3 is visually recognized in a case where all the gradation values of image data used in the display unit are 0. It is assumed that the black display-unevenness of FIG. 3 is visually recognized in a case where all the gradation values of image data used in the display unit are less than 32, while the black display-unevenness of FIG. 3 is not visually recognized (or is hardly visually recognized) in a case where all the gradation values of image data used in the display unit are greater than or equal to 32. Therefore, in the embodiment, the black display-unevenness threshold is 32.

Note that input image data may be color image data.

Note that image data may have a gradation value greater or smaller than a 12-bit value.

Note that input image data may have a pixel number greater or smaller than 1440×1080 pixels in the horizontal and vertical directions.

Note that the liquid-crystal panel 108 may have a contrast higher or lower than 1000:1.

Note that the liquid-crystal panel 108 may have a gamma value greater or smaller than 1.0.

Note that the liquid-crystal panel 108 may have peak brightness higher or lower than 200 cd/m$^2$.

Note that the black display-unevenness threshold may be greater or smaller than 32. The black display-unevenness threshold can be determined according to, for example, the degree of black display-unevenness, the target value of the degree of reducing black display-unevenness, or the like.

The liquid-crystal panel 108 of FIG. 1 is a display unit having a plurality of liquid-crystal devices. The transmittance of the respective liquid-crystal devices is controlled according to image data input to the liquid-crystal panel 108.

The BL unit 109 is a light-emission unit having a plurality of light sources corresponding to a plurality of divided regions, respectively. The respective light sources have one or more light-emission devices. As the light-emission devices, light-emission diodes, organic EL devices, cold-cathode tubes, or the like can be used. The BL unit 109 applies light onto the back surface of the liquid-crystal panel 108. An image is displayed on the screen in a case where a part of light from the BL unit 109 passes through the liquid-crystal panel 108 (respective liquid-crystal devices).

The black display-unevenness correction-value determination unit 101 determines a black display-unevenness correction value as a correction value used in the black display-unevenness correction processing. In the embodiment, the target value of the contrast of a display image is set or changed. For example, the target value of a contrast is set or changed according to a user's operation. Further, in the embodiment, a black display-unevenness correction value is determined according to the target value of a contrast such that the black display-unevenness correction processing is performed to further increase a gradation value as the target value of the contrast is lower. In the embodiment, an offset value to be added to a gradation value is determined as the black display-unevenness correction value. Therefore, as the target value of a contrast is lower, a greater offset value is determined as the black display-unevenness correction value in the embodiment.

A description will be given in detail of a method for determining a black display-unevenness correction value.

As described above, the local dimming processing is performed in the embodiment. For example, in the local dimming processing, the light-emission brightness of light sources corresponding to divided regions in which image data is bright is not reduced from a reference value, while the light-emission brightness of light sources corresponding to divided regions in which the image data is dark is reduced to a value lower than the reference value. For example, a reducing amount of the light-emission brightness becomes greater as the brightness of image data is lower. Thus, the contrast of a display image can be increased to a value higher than the contrast of the liquid-crystal panel 108. For example, in a case where the light-emission brightness of light sources corresponding to divided regions in which image data is dark is reduced to a value half a reference value, the display brightness of a black color can be reduced by half and the contrast of a display image can be increased to a value twice as large as the contrast of the liquid-crystal panel 108.

In a case where the local dimming processing is performed, a change in display brightness occurs with a change in the light-emission brightness of each of the light sources. Therefore, in the embodiment, extension processing is performed by the extension correction unit 107 after the local dimming processing. The extension processing represents image processing (second correction processing) in which image data is corrected based on the light-emission brightness of each of the light sources such that a change in the display brightness with a change in the light-emission brightness of each of the light sources is reduced. Further, there is a likelihood that light from the light sources leaks into other divided regions. The leakage of the light also results in a change in display brightness. Such a change in display brightness can also be reduced by the extension processing. In a case where image data having been subjected to the extension processing is input to the liquid-crystal panel 108, the occurrence of black floating caused by the change in the light-emission brightness of the light sources, the leakage of the light from the light sources, or the like can be prevented. Further, colors other than a black color can be maintained at display brightness in a case in which the local dimming is not performed. In the embodiment, processing for multiplying the respective gradation values of image data by an extension rate is performed as the extension processing.

In the embodiment, a value obtained by dividing a black display-unevenness threshold by a maximum value (upper-limit extension rate) at which an extension rate may be set is determined as the black display-unevenness correction value. The relationship between a black display-unevenness threshold ofs, an upper-limit extension rate gain_max, and a black display-unevenness correction value mura can be represented by the following Equation 1. According to Equation 1, a value less than or equal to the black display-unevenness threshold ofs (less than or equal to a first threshold) is calculated as the black display-unevenness correction value mura.

mura=$ofs$/gain_max (Equation 1)

A minimum value (lower-limit light-emission brightness) of a value at which light-emission brightness may be set is determined according to the target value of the contrast of a display image, while an upper-limit extension rate is determined according to the lower-limit light-emission brightness. Therefore, the upper-limit extension rate is determined according to the target value of the contrast.

The black display-unevenness correction-value determination unit 101 acquires lower-limit light-emission brightness and an upper-limit extension rate gain_max from a set black display-unevenness threshold ofs and a target contrast (target value of the contrast). Then the black display-unevenness correction-value determination unit 101 calculates a black display-unevenness correction value mura using the black display-unevenness threshold ofs and the acquired upper-limit extension rate gain_max. For example, in a case where the black display-unevenness threshold is 32 and the upper-limit extension rate gain_max is 16, 2 (=32/16) is calculated as the black display-unevenness correction value mura. Then, the black display-unevenness correction-value determination unit 101 outputs the determined black display-unevenness correction value to the black display-unevenness correction processing unit 102 and the BL-brightness curve determination unit 104.

A description will be given of the relationship between a black display-unevenness threshold ofs, a target contrast (target value of a contrast), lower-limit light-emission brightness, and an upper-limit extension rate gain_max.

In a case where the black display-unevenness threshold ofs is added to the gradation value 0 of input image data, the transmittance of the liquid crystal is increased in a case where a black color is displayed. In the embodiment, it is assumed that the highest transmittance of the liquid crystal is 10%. Further, since the liquid-crystal panel has a contrast of 1000:1, the lowest transmittance of the liquid crystal is 0.01% in a case where a black color is displayed. In a case where the transmittance of the liquid crystal is proportional to a gradation value, the transmittance of the liquid crystal is 0.08% if the gradation value is equal to the black display-unevenness threshold ofs 32 and the brightness in a case where a black color is displayed is degraded by eight times. Therefore, lower-limit light-emission brightness is reduced by ⅛ times. In addition, since a target contrast is 2000:1, the lower-limit light-emission brightness is reduced by half even in a case where black display-unevenness is not corrected. Therefore, in the embodiment, in a case where the black display-unevenness threshold is 32, the lower-limit light-emission brightness is reduced by 1/16 (⅛×½) times and the upper-limit extension rate gain_max is increased by 16 times, i.e., the reciprocal of ¹/₁₆. As described above, the black display-unevenness correction-value determination unit 101 determines the lower-limit light-emission brightness, the upper-limit extension rate gain_max, and the black display-unevenness correction value mura with the settings of the black display-unevenness threshold ofs and the target contrast.

Note that a method for determining the black display-unevenness correction value is not limited to the above method. For example, in a case where correction-value information showing the corresponding relationship between the black display-unevenness correction value and the target contrast is prepared in advance, the black display-unevenness correction value corresponding to the set target contrast may be acquired from the correction-value information.

The black display-unevenness correction processing unit 102 acquires a black display-unevenness correction value from the black display-unevenness correction-value determination unit 101. Then, the black display-unevenness correction processing unit 102 applies the black display-unevenness correction processing using the acquired black display-unevenness correction value to input image data. As a result, first correction image data is generated. In the embodiment, a black display-unevenness correction value is added to the respective gradation values of input image data to generate first correction image data. The black display-unevenness correction processing unit 102 outputs the first correction image data to the characteristic value acquisition unit 103 and the extension correction unit 107.

Figure 6:
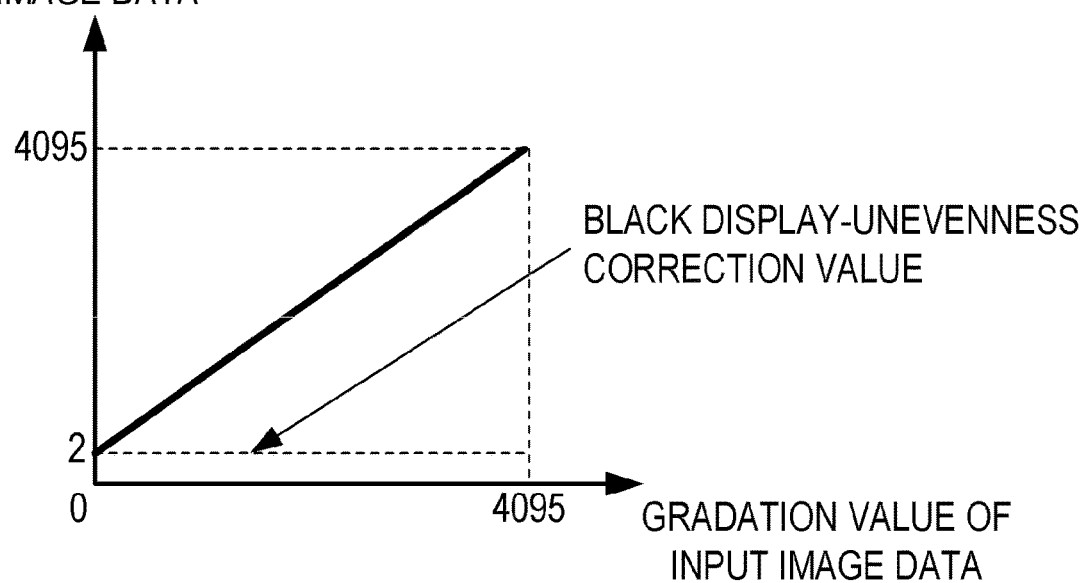
FIG. 6 is a diagram showing an example of black display-unevenness correction processing according to the first embodiment.

Note that the black display-unevenness correction processing is not limited to the above processing. For example, the gradation value of first correction image data may be determined from the gradation value of input image data using a table or a function showing the corresponding relationship between the gradation value of the input image data and the gradation value of the first correction image data. First correction image data may be generated such that the corresponding relationship between the gradation value of input image data and the gradation value of the first correction image data is one shown in FIG. 6. In FIG. 6, a horizontal axis represents the gradation value of input image data, and a vertical axis represents the gradation value of first correction image data. In the example of FIG. 6, the gradation value of the input image data increases from 0 to 4095, while the gradation value of the first correction image data linearly increases from the black display-unevenness correction value 2 to 4095. In the example of FIG. 6, an increasing amount of the gradation value of the input image data (the difference between the gradation value of the input image data and the gradation value of the first correction image data) by the black display-unevenness correction processing becomes smaller as the gradation value is greater. The corresponding relationship shown in FIG. 6 can be represented by, for example, the following Equation 2. In Equation 2, "Pin" represents the gradation value of the input image data, "Pout" represents the gradation value of the first correction image data, and "Pmax" represents the maximum value (upper-limit gradation value) of a value at which a gradation value may be set.

$$Pout=((Pmax-mura)/Pmax) \times Pin+mura \quad \text{(Equation 2)}$$

The characteristic value acquisition unit 103 acquires first correction image data from the black display-unevenness correction processing unit 102. Then, the characteristic value acquisition unit 103 acquires, for each of divided regions, a characteristic value (brightness characteristic value) on the brightness of the first correction image data in the divided region from the first correction image data. The characteristic value acquisition unit 103 outputs the characteristic values acquired for the respective divided regions to the BL-brightness determination unit 105.

Figure 4:
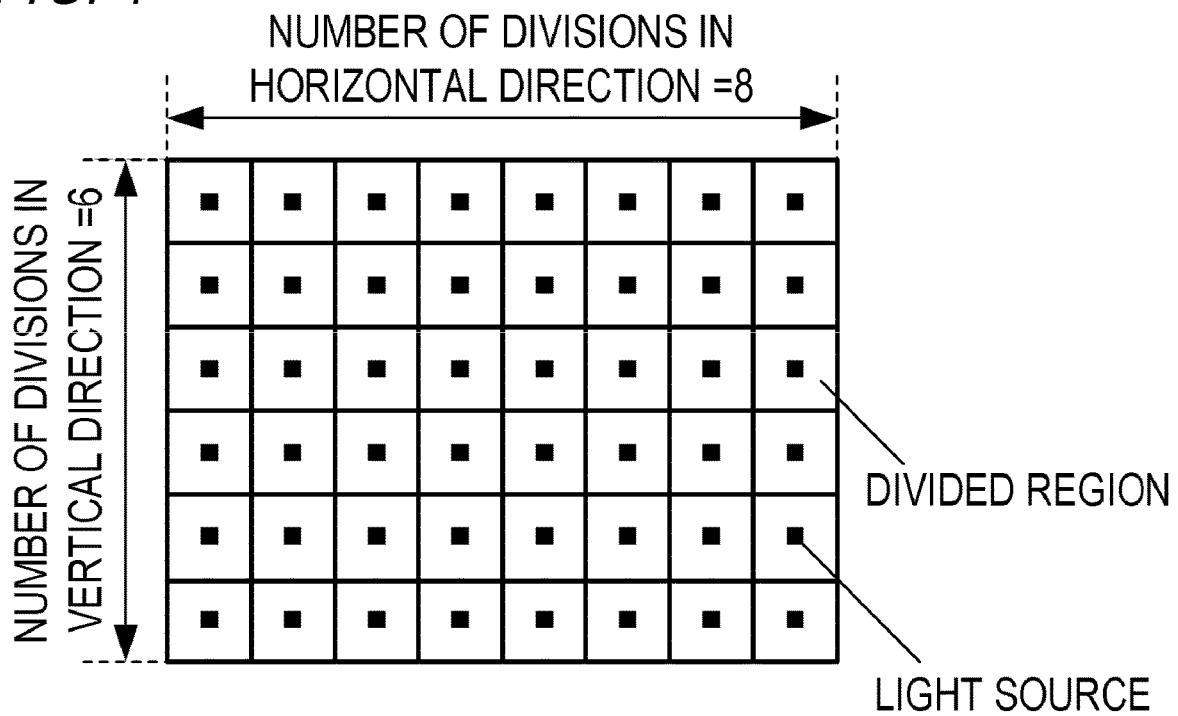
FIG. 4 is a diagram showing an example of divided regions according to the first embodiment.

In the embodiment, it is assumed that the screen region is constituted by 6×8 divided regions in the vertical and horizontal directions as shown in FIG. 4. Then, the characteristic value acquisition unit 103 acquires, as characteristic values for the divided regions, the maximum gradation values (maximum values of the gradation values) of first correction image data in the divided regions.

A description will be given of the reason why maximum gradation values are acquired as characteristic values. Characteristic values are used to determine the light-emission brightness of light sources. Therefore, in a case where gradation values smaller than maximum gradation values are used as characteristic values, there is a likelihood that the light-emission brightness of light sources is unnecessarily reduced and the display brightness of pixels having the maximum gradation values is reduced. Such a reduction in display brightness can be prevented by the extension processing. However, since gradation values have an upper-limit value and a lower-limit value, the reduction in display brightness cannot be substantially prevented by the extension processing if a reducing amount of the display brightness is too large. For this reason, it is preferable to acquire maximum gradation values as characteristic values rather than acquiring values smaller than the maximum gradation values as the characteristic values.

Note that characteristic values are not limited to maximum gradation values. As characteristic values for divided regions, the representative value or the histogram of the pixel values of image data in the divided regions may be acquired. As characteristic values for divided regions, the representative value or the histogram of the brightness values of image data in the divided regions may be acquired. The representative value is a maximum value, a minimum value, an intermediate value, an average value, a mode, or the like.

The BL-brightness curve determination unit 104 acquires a black display-unevenness correction value from the black display-unevenness correction-value determination unit 101. Then, the BL-brightness curve determination unit 104 determines (generates) a BL-brightness curve according to the acquired black display-unevenness correction value. The BL-brightness curve determination unit 104 outputs the determined BL-brightness curve to the BL-brightness determination unit 105. The BL-brightness curve represents a function or a table showing the corresponding relationship between characteristic values and light-emission brightness. Since a black display-unevenness correction value is determined according to a target contrast, a BL-brightness curve can also be determined according to the target contrast.

A description will be given in detail of a method for determining a BL-brightness curve.

First, a description will be given of an example of a case in which the black display-unevenness correction processing is not performed.

Figure 5:
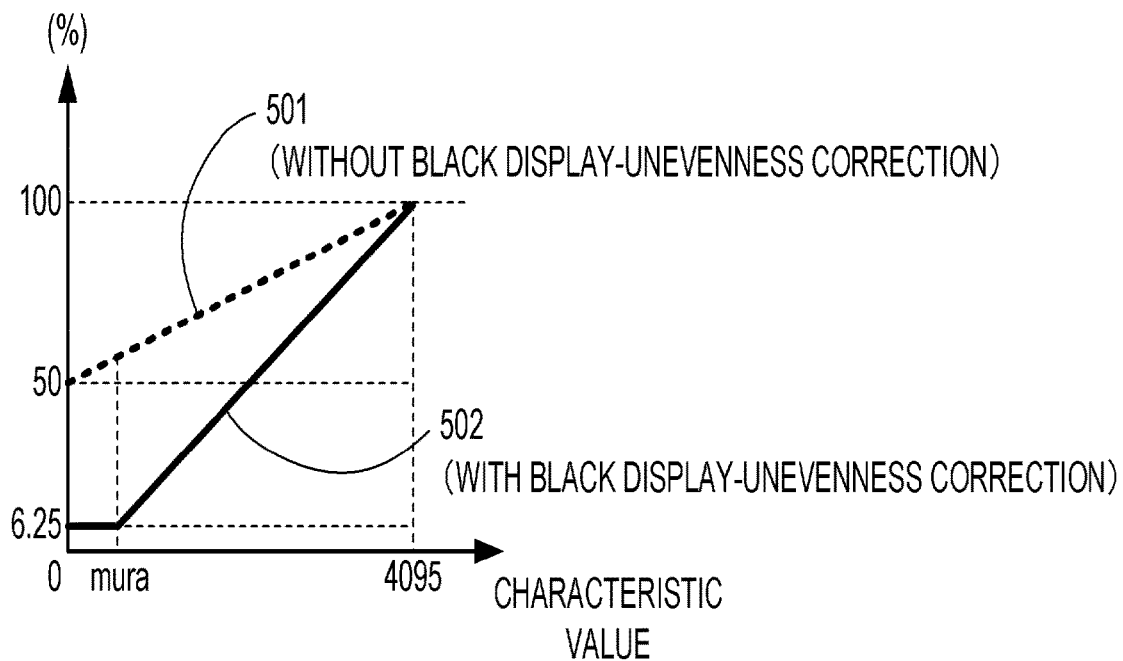
FIG. 5 is a diagram showing an example of a BL-brightness curve according to the first embodiment.

Here, it is assumed that a target contrast of 2000:1 twice as large as the contrast (1000:1) of the liquid-crystal panel 108 is set. In this case, a BL-brightness curve is determined such that the light-emission brightness of light sources corresponding to divided regions having a maximum gradation value of 0 is controlled at 50% (value half a reference value) and the light-emission brightness of light sources corresponding to divided regions having a maximum gradation value of 4095 is controlled at 100% (reference value). For example, a BL-brightness curve showing a corresponding relationship 501 of FIG. 5 is determined. FIG. 5 is a diagram showing an example of the corresponding relationship between a characteristic value and light-emission brightness. In FIG. 5, a horizontal axis represents the characteristic value (maximum gradation value), and the vertical axis represents the light-emission brightness. In the corresponding relationship 501, the maximum gradation value increases from 0 to 4095, while the light-emission brightness linearly increases from 50 to 100. Since the liquid-crystal panel 108 has a contrast of 1000:1 and a value at which the light-emission brightness may be set is greater than or equal to 50% and less than or equal to 100%, a display image has a contrast of 2000:1.

Next, a description will be given of an example of a case in which the black display-unevenness correction processing is performed.

Since the gradation value of input image data is increased by the black display-unevenness correction processing, the transmittance of the liquid-crystal panel 108 in a case where the black display-unevenness correction processing is performed is controlled at a value higher than that in a case where the black display-unevenness correction processing is not performed. Therefore, in a case where a BL-brightness curve showing the corresponding relationship 501 of FIG. 5 is used to perform the black display-unevenness correction processing, the contrast of a display image is reduced to a value lower than that in a case where the black display-unevenness correction processing is not performed. In the embodiment, since the transmittance of the black color of the liquid-crystal panel 108 is increased by 8 times by the black display-unevenness correction processing, the contrast of a display image is degraded by 8 times.

Therefore, in the embodiment, a BL-brightness curve is determined such that the contrast of a display image is increased and an increase in display brightness by the black display-unevenness correction processing is reduced. For example, a BL-brightness curve is determined using a smaller value as lower-limit light-emission brightness as an increasing amount (black display-unevenness correction value mura) of a lower-limit gradation value by the black display-unevenness correction processing is greater. The lower-limit gradation value is the minimum value of a value at which a gradation value may be set. In the embodiment, the lower-limit gradation value of input image data is 0. In the embodiment, a BL-brightness curve is determined such that light-emission brightness is reduced by an increasing amount of the transmittance of the liquid-crystal panel 108. For example, in a case where the transmittance of the liquid-crystal panel 108 is increased by 8 times by the black display-unevenness correction processing, a BL-brightness curve is determined such that lower-limit light-emission brightness is reduced by 1/8 times compared with a case in which the black display-unevenness correction processing is not performed. In addition, since the reducing amount of the light-emission brightness of light sources in a case where the black display-unevenness correction is not performed is multiplied, the lower-limit light-emission brightness is reduced by 1/16 (=1/8×1/2). In a case where it is assumed that the display brightness of the black color in a case where the local dimming processing is not performed is 100%, the display brightness is increased to 800% by the black display-unevenness correction processing. On the other hand, in the embodiment, since the light-emission brightness of the black color is reduced by 1/16 times, the display brightness is reduced to 50% (=800×1/16) and equal to the brightness of the black color of a target contrast. In addition, in the embodiment, a value at which the gradation value of first correction image data may be set is a value greater than or equal to mura and less than or equal to 4095. Therefore, in the embodiment, a BL-brightness curve is determined such that the light-emission brightness of light sources corresponding to divided regions having a maximum gradation value of mura is controlled at 6.25% (=1/16) and the light-emission brightness of light sources corresponding to divided regions having a maximum gradation value of 4095 is controlled at 100%. For example, a BL-brightness curve showing a corresponding relationship 502 of FIG. 5 is determined. In the corresponding relationship 502, a maximum gradation value increases from mura to 4095, while light-emission brightness linearly increases from 6.25% to 100%. There is no need to assign light-emission brightness to the maximum gradation value less than mura. However, in the corresponding relationship 502, the light-emission brightness 6.25% is assigned to the maximum gradation value less than mura considering a case in which the maximum gradation value less than mura is acquired by any chance. The corresponding relationship 502 in a range greater than or equal to the mura gradation can be represented by the following Equation 3. In Equation 3, "bl" represents the light-emission brightness, and "st" represents the maximum gradation value.

$$bl=(100-6.25)/(4095-\text{mura})\times(st-\text{mura})+6.25=93.75/(4095-\text{mura})\times(st-\text{mura})+6.25 \quad \text{(Equation 3)}$$

By the above method, a BL-brightness curve considering the black display-unevenness correction processing is determined. Thus, a reduction in the contrast of a display image caused in a case where the black display-unevenness correction processing is performed can be prevented.

The BL-brightness determination unit 105 acquires the maximum gradation values of respective divided regions from the characteristic value acquisition unit 103 and a BL-brightness curve from the BL-brightness curve determination unit 104. The BL-brightness determination unit 105 converts, for each of the divided regions, the maximum gradation value of the divided region into light-emission brightness using the BL-brightness curve. Further, the BL-brightness determination unit 105 controls, for each of the divided regions, the light-emission brightness of light sources corresponding to the divided region at the light-emission brightness determined for the divided region (light-emission brightness obtained by converting the maximum gradation value). In addition, the BL-brightness determination unit 105 outputs light-emission brightness information showing the light-emission brightness of each of the light sources to the brightness estimation unit 106.

The brightness estimation unit 106 acquires light-emission brightness information from the BL-brightness determination unit 105 and estimates, for each of a plurality of positions (estimated positions) inside the screen, BL-brightness at the position using the acquired light-emission brightness information. The BL brightness represents the brightness of light from the BL unit 109. An estimated value of the BL brightness represents, for example, brightness in a case where light emitted from the BL unit 109 reaches the liquid-crystal panel 108. Note that the central positions of respective divided regions are used as estimated positions in the embodiment.

Note that the number and positions of estimated position are not particularly limited. For example, the positions of the respective liquid-crystal devices may be used as estimated positions.

Light emitted from light sources decays as it goes away from the light sources. In the embodiment, light sources are arranged at the centers of divided regions as shown in FIG. 4. Therefore, light emitted from light sources corresponding to divided regions decays as it goes away from the centers of the divided regions.

In addition, light emitted from light sources may leak into other divided regions.

Therefore, in the embodiment, the BL brightness is estimated considering the above decay and leakage of light. The BL brightness at estimated positions can be estimated by adding together the brightness of light from a plurality of light sources at the estimated positions.

The brightness estimation unit 106 stores in advance diffusion information showing the diffusion of light (light-sources light) emitted from light sources. The diffusion information shows, for example, the corresponding relationship between distances from light sources and the arrival rates of light-sources light. The arrival rates represent the ratios of the brightness of light-sources light at positions away from light sources by distances corresponding to arrival rates to the brightness of the light-sources light at the positions of the light sources. The brightness estimation unit 106 calculates, for each of the light sources, brightness at the estimated position of light from the light source by multiplying the light-emission brightness of the light source by an arrival rate corresponding to a distance from the light source to the estimated position. Then, the brightness estimation unit 106 calculates the sum of the brightness of each of the light-sources light calculated for an estimated position as the BL brightness at the estimated position. The brightness estimation unit 106 outputs the BL brightness at respective estimated positions to the extension correction unit 107.

Note that a plurality of diffusion information corresponding to a plurality of light sources, respectively, may be prepared or one diffusion information common to a plurality of light sources may be prepared. In a case where a plurality of diffusion information is prepared, the diffusion information is only required to be information showing arrival rates at respective estimated positions.

The extension correction unit 107 acquires first correction image data from the black display-unevenness correction processing unit 102 and the BL brightness at respective estimated positions from the brightness estimation unit 106. Then, the extension correction unit 107 applies extension processing using the BL brightness at the respective estimated positions to the first correction image data to generate second correction image data. The extension correction unit 107 outputs the generated second correction image data to the liquid-crystal panel 108. As a result, the transmittance of the liquid-crystal panel 108 is controlled at transmittance corresponding to the second correction image data. In other words, it can be said that the black display-unevenness correction processing unit 102 and the extension correction unit 107 control the transmittance of the liquid-crystal panel 108 based on second correction image data generated from input image data.

In the embodiment, the extension correction unit 107 calculates the extension rates of respective pixels (respective pixel positions) using the BL brightness at respective estimated positions. For example, an extension rate gain at a pixel position at which the BL brightness is blDis can be calculated by the following Equation 4. In Equation 4, "Lt" represents a preset reference BL value. The reference BL value Lt is the BL brightness obtained, for example, in a case where the light-emission brightness of each of light sources is controlled at a reference value.

$$gain = Lt/blDis \qquad \text{(Equation 4)}$$

In the embodiment, only the BL brightness of a part of the pixel positions (central positions of divided regions) is obtained by the brightness estimation unit 106. The extension rates of pixel positions at which the BL brightness is not obtained are determined by interpolation processing (interpolation or extrapolation) using a plurality of obtained extension rates.

Then, the extension correction unit 107 multiplies, for each of pixels, the gradation value of the first correction image data of the pixel by the extension rate of the pixel. Thus, the gradation values of the respective pixels of second correction image data are calculated. It appears from Equation 4 that a gain value gain to increase a gradation value is calculated in a case where the BL brightness bLDis is low and a gain value gain to reduce the gradation value is calculated in a case where the BL brightness blDis is high.

A description will be given of a specific example of the processing of the image display apparatus according to the embodiment. Here, a description will be given of an example of a case in which all the gradation values of input image data are 0 (FIG. 2), a target contrast is 2000:1, a black display-unevenness threshold ofs is 32, and an upper-limit extension rate gain_max is 16.

First, the black display-unevenness correction-value determination unit 101 determines the black display-unevenness correction value 2 (=ofs/gain_max=32/16).

Next, the black display-unevenness correction processing unit 102 applies the black display-unevenness correction processing using the black display-unevenness correction value 2 to input image data to generate first correction image data. Here, the black display-unevenness correction value 2 is added to the respective gradation values of the input image data to generate the first correction image data. Since all the gradation values of the input image data are 0, the first correction image data in which all the gradation values are 2 is generated.

Then, the characteristic value acquisition unit 103 acquires the maximum gradation values of the first correction image data in respective divided regions as characteristic values. As described above, all the gradation values of the first correction image data are 0. Therefore, as shown in FIG. 7, the maximum gradation values 2 are acquired as the maximum gradation values of the first correction image data in the respective divided regions.

Next, the BL-brightness curve determination unit 104 determines a BL-brightness curve according to the black display-unevenness correction values 2. Here, it is assumed that a BL-brightness curve showing the corresponding relationship 502 of FIG. 5 is determined.

Then, the BL-brightness determination unit 105 determines the light-emission brightness of each of light sources based on the BL-brightness curve showing the corresponding relationship 502 and the maximum gradation values 2 of the respective divided regions. In the corresponding relationship 502, the maximum gradation values 2 are associated with the light-emission brightness 6.25%. Therefore, here, as shown in FIG. 8, 6.25% is obtained as the light-emission brightness of each of light sources, and the light-emission brightness of each of the light sources is controlled at 6.25%.

Next, the brightness estimation unit 106 calculates BL brightness at respective estimated positions (brightness of light from the BL unit 109) based on the light-emission brightness 6.25% of the respective light sources. Here, an attention is paid to a horizontal direction for simplicity. FIG.

Figure 9:
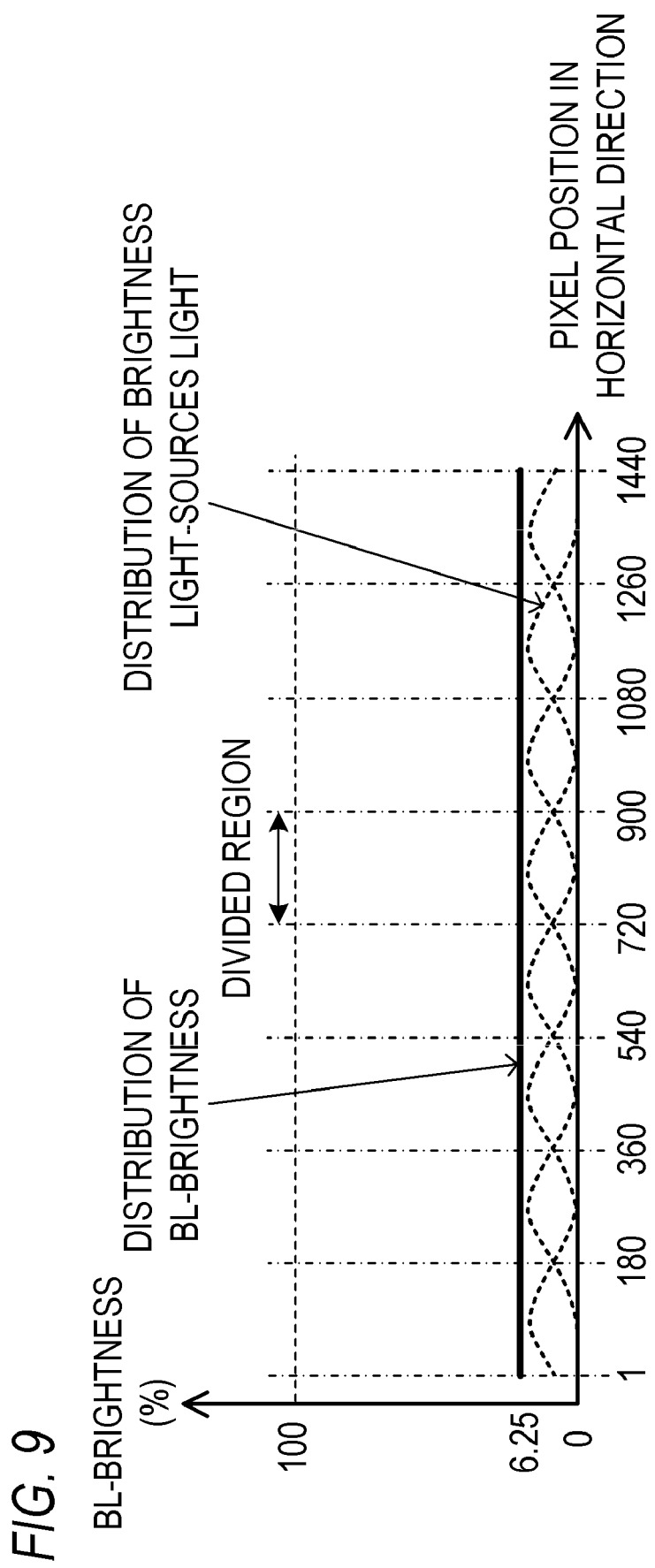
FIG. 9 is a diagram showing an example of the distribution of BL brightness according to the first embodiment.

9 is a diagram showing an example of the corresponding relationship between pixel positions in the horizontal direction and BL-brightness. In FIG. 9, dashed lines show the distribution of the brightness of light emitted from light sources. In the embodiment, since the sum of the brightness of a plurality of light-sources light is regarded as BL brightness, the distribution of the BL brightness is one indicated by the solid line of FIG. 9. Therefore, the same values are obtained as the BL brightness of the respective estimated positions.

Then, the extension correction unit 107 calculates the extension rates of respective pixels based on the BL brightness of the respective estimated positions. Here, since the light-emission brightness of each of the light sources is uniform, the BL brightness becomes constant regardless of the pixel positions as shown in FIG. 9. In addition, in a case where the light-emission brightness of all the light sources is reduced by the same rate, the ratio of the BL brightness to a reference BL value agrees with the ratio of the light-emission brightness of the light sources to a reference value. In the embodiment, since a light-emission brightness bl is 6.25%, the BL brightness blDis is a value 6.25% of a reference BL value Lt. Accordingly, as shown in the following Equation 5, 16 is obtained as the extension rate gain of the respective pixels.

$$\text{gain}=16(=1/0.0625) \qquad \text{(Equation 5)}$$

Next, the extension correction unit 107 multiplies the respective gradation values of the first correction image data by the extension rate 16 to generate second correction image data. Since the gradation value of the first correction image data is 2 as described above, 32 (=2×16) is obtained as the gradation value of the second correction image data. Then, in a case where the extension correction unit 107 outputs the second correction image data to the liquid-crystal panel 108, the transmittance of the liquid-crystal panel 108 is controlled at a value corresponding to the second correction image data.

Here, since the gradation value 32 of the second correction image data is the same value as the black display-unevenness threshold, a display image in which black display-unevenness is inconspicuous can be obtained. In addition, if it is assumed that the BL brightness in a case where the local dimming processing is not performed is 100%, the BL brightness is reduced to 6.25% in the embodiment. In other words, the BL brightness is reduced by 93.75%. The description "case in which the local dimming is not performed" refers to a "case in which the light-emission brightness of each of the light sources is controlled at the reference value." Further, if it is assumed that the display brightness of a black color in a case where the local dimming processing is not performed is 100%, the display brightness of the black color becomes 50% (=100%÷700% (corresponding to black floating due to the black display-unevenness threshold)×0.0625) in the embodiment. As described above, in the embodiment, the value of the display brightness of a black color can be reduced by half compared with a case in which the local dimming processing is not performed. Therefore, even in a case where the black display-unevenness correction processing is performed, the contrast of the display apparatus can be increased to the target contrast 2000:1 twice as large as the contrast (1000:1) of the liquid-crystal panel 108.

As described above, according to the embodiment, a reduction in the contrast of a display image caused in a case where black display-unevenness is reduced can be prevented.

Next, a description will be given of another effect of the embodiment. According to the embodiment, the effect of reducing a halo phenomenon can be obtained during the black display-unevenness correction processing. Here, the halo phenomenon represents a phenomenon that occurs in a case where light emitted from the light sources of regions in which an image is bright leaks into ambient regions and that increases the display brightness of regions in which the image is dark. Hereinafter, a description will be given of an example of a case in which input image (image represented by input image data) is one shown in FIG. 10. The input image of FIG. 10 has a rectangular region having a gradation value of 4095, and regions other than the rectangular region have a gradation value of 0. Hereinafter, an attention will be paid to a cross-section position shown in FIG. 10 for simplicity.

First, the black display-unevenness correction-value determination unit 101 determines a black display-unevenness correction value. Here, it is assumed that the black display-unevenness correction value 4 is determined.

Figure 10:
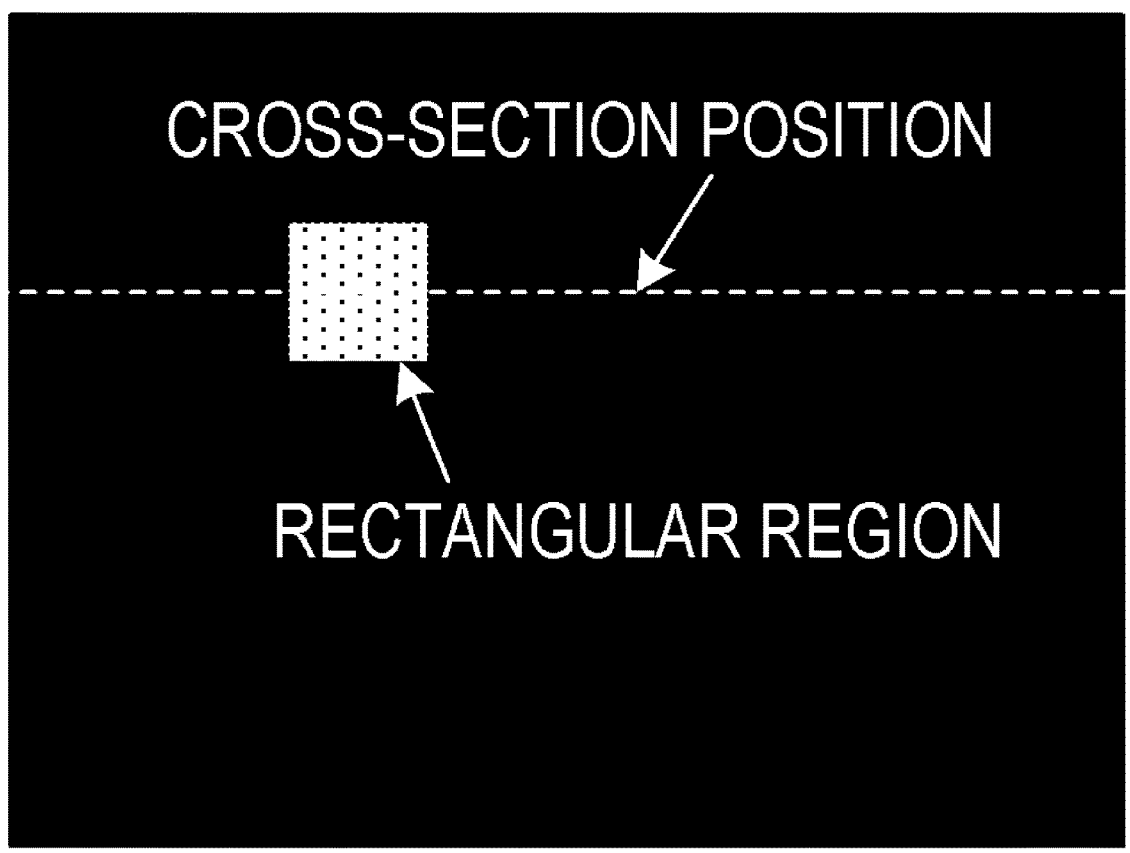
FIG. 10 is a diagram showing an example of input image data according to the first embodiment.
Figure 11:
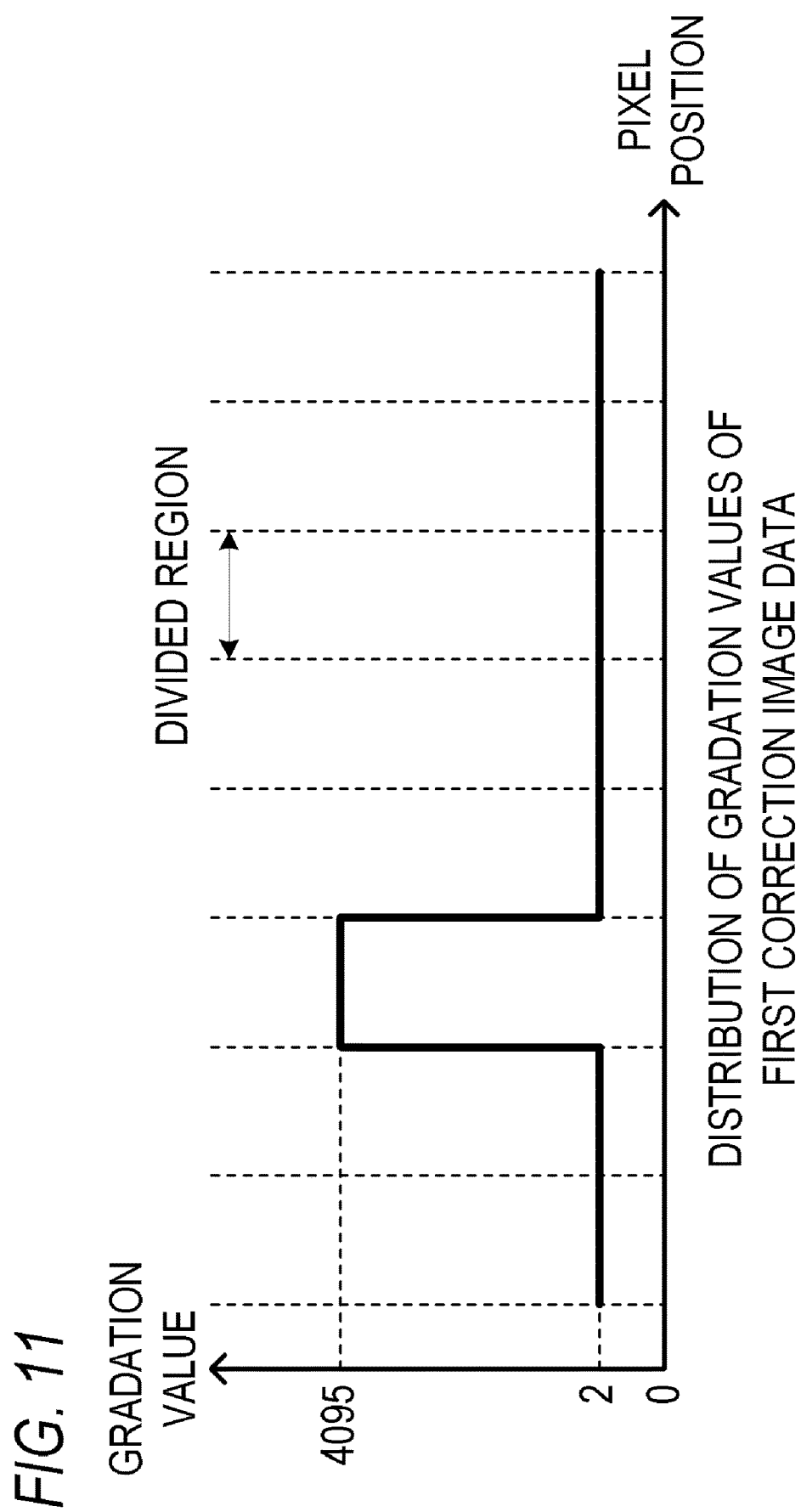
FIG. 11 is a diagram showing an example of the distribution of the gradation values of first correction image data according to the first embodiment.

Next, the black display-unevenness correction processing unit 102 applies the black display-unevenness correction processing to the input image data to generate first correction image data. The corresponding relationship between the gradation values and the pixel positions of the generated first correction image data is shown in FIG. 11. Here, the black display-unevenness correction value 2 is added to the respective gradation values of the input image data of FIG. 10 to generate the first correction image data. Therefore, the gradation value of the first correction image data in the rectangular region is 4095, and the gradation value of the first correction image data in the regions other than the rectangular region is 2.

Then, the characteristic value acquisition unit 103 acquires the maximum gradation values of the first correction image data in the respective divided regions as characteristic values. The distribution of the maximum gradation values acquired by the characteristic value acquisition unit 103 is the same as the distribution of the gradation values shown in FIG. 11.

Next, the BL-brightness curve determination unit 104 determines a BL-brightness curve according to the black display-unevenness correction value 4. Here, it is assumed that the BL-brightness curve showing the corresponding relationship 502 of FIG. 5 is determined.

Then, the BL-brightness determination unit 105 determines the light-emission brightness of respective light sources based on the BL-brightness curve showing the corresponding relationship 502 and the maximum gradation values of the respective divided regions. In the corresponding relationship 502, the light-emission brightness 6.25% is associated with the maximum gradation value 2, and the light-emission brightness 100% is associated with the maximum gradation value 4095. Therefore, here, 100% is obtained as the light-emission brightness of light sources corresponding to the rectangular region, and 6.25% is obtained as the light-emission brightness of the other light sources. After that, the light-emission brightness of each of the light sources is controlled at the determined light-emission brightness.

Next, the brightness estimation unit 106 calculates, based on the light-emission brightness of each of the light sources, BL brightness (brightness of light from the BL unit 109) at respective estimated positions. Here, the corresponding relationship between the pixel positions and the BL brightness is one shown in FIG. 12. It appears from FIG. 12 that light from the light sources corresponding to the rectangular region gives a great impact on three divided regions ahead of the rectangular region. In addition, it appears that the BL brightness is higher in the rectangular region and the peripheral regions and becomes lower in regions away from the rectangular region.

Figure 12:
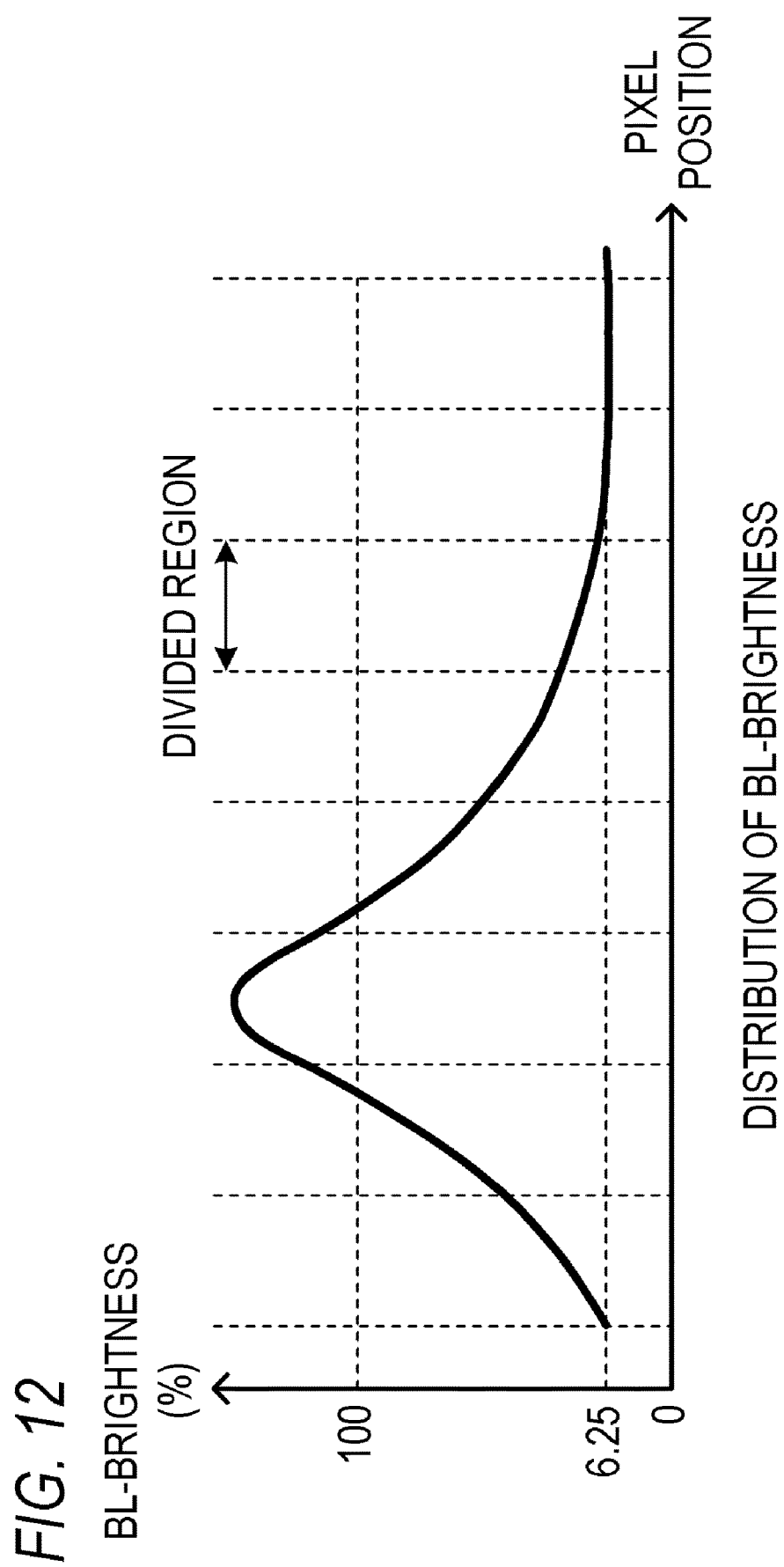
FIG. 12 is a diagram showing an example of the distribution of BL brightness according to the first embodiment.

Further, in regions in which the BL brightness is 100%, it is required to secure 100% of the BL brightness in all the pixels of target regions. However, in the distribution of the brightness of the light output from the light sources, the brightness is the highest in a central region and becomes lower toward an end region. Therefore, as shown in FIG. 12, the BL brightness goes beyond 100% in the central region. This indicates that brighter lighting is locally made than the BL brightness in a case where the local dimming processing is not performed since the BL brightness in a case where the local dimming processing is not performed is defined as 100%.

Figure 13:
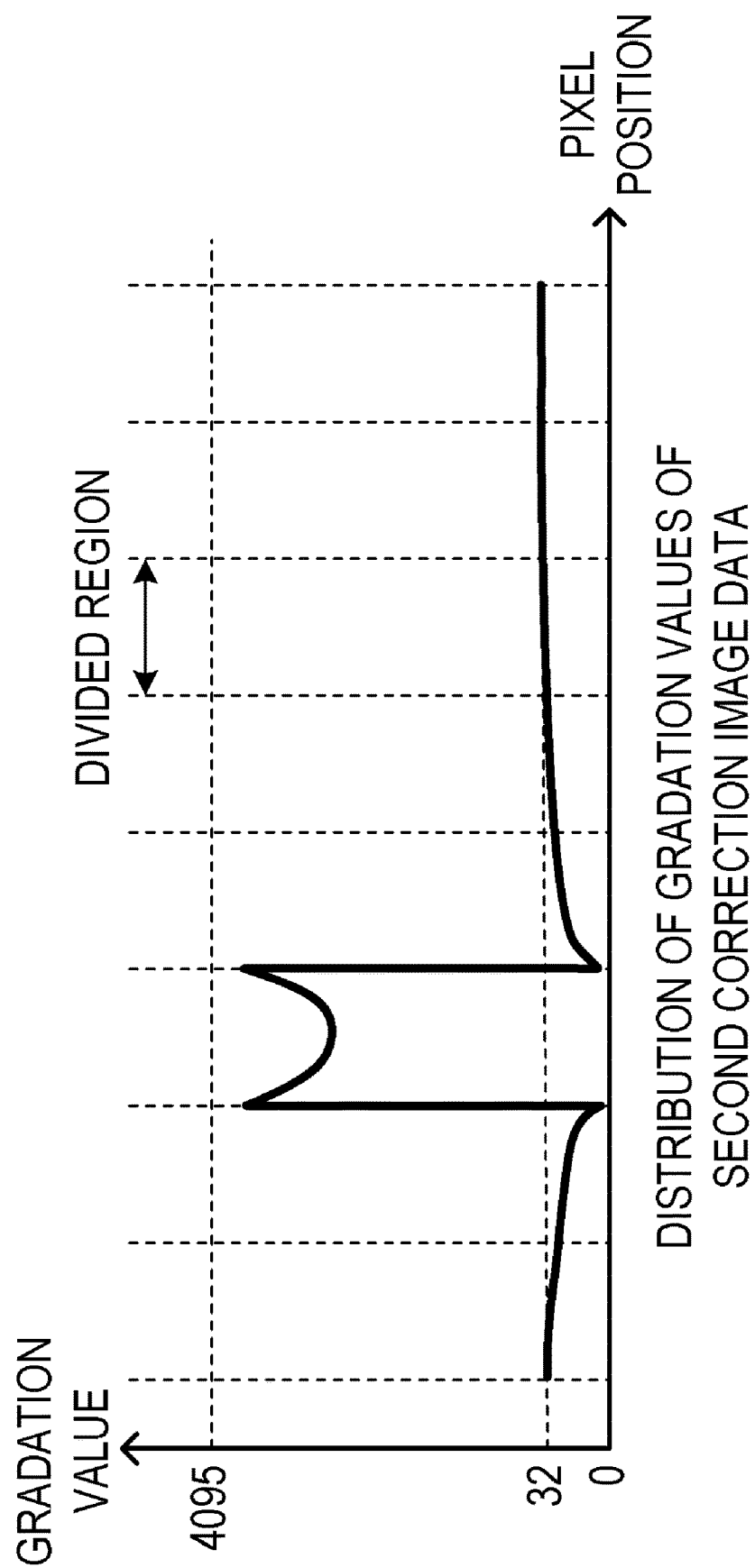
FIG. 13 is a diagram showing an example of the distribution of the gradation values of second correction image data according to the first embodiment.

Then, the extension correction unit 107 calculates the extension rates of respective pixels based on the BL brightness of the respective estimated positions. Next, the extension correction unit 107 multiplies the respective gradation values of the first correction image data by the extension rates to generate second correction image data. After that, the extension correction unit 107 outputs the generated second correction image data to the liquid-crystal panel 108. The corresponding relationship between the gradation values of the generated second correction image data and the pixel positions is shown in FIG. 13. Here, based on the distribution of the BL brightness shown in FIG. 12, the extension rates of pixel positions on the periphery of the rectangular region are set at values smaller than 1. Further, the extension rates of respective pixel positions in regions other than the rectangular region are set such that the extension rates are increased to values greater than 1 as they move away from the rectangular region. Accordingly, in regions far away from the rectangular region, values substantially equal to the black display-unevenness correction value are obtained as the gradation values of the second correction image data. Further, in regions on the periphery of the rectangular region, values smaller than the black display-unevenness threshold are obtained as the gradation value of the second correction image data.

Figure 14:
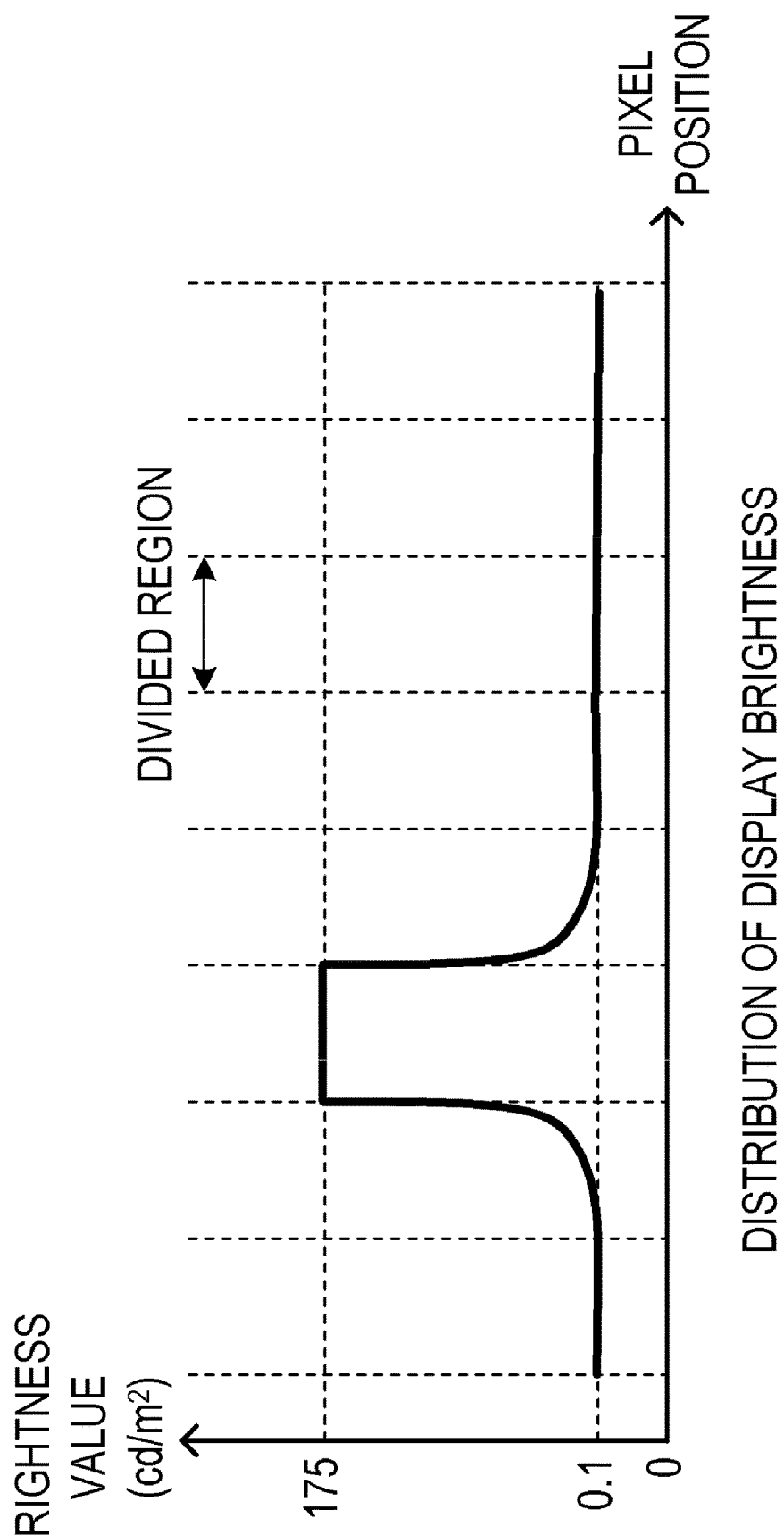
FIG. 14 is a diagram showing an example of the distribution of display brightness according to the first embodiment.

Since the brightness of the rectangular image is extremely high on the periphery of the rectangular region, black display-unevenness is inconspicuous even if gradation values smaller than the black display-unevenness threshold are used. In addition, the halo phenomenon occurs on the periphery of the rectangular region. Further, since the transmittance of liquid-crystal devices is higher as the gradation value of a black color is greater, the halo phenomenon is more conspicuous as the gradation value of the black color is greater. Accordingly, from the viewpoint of reducing a sense of disturbance feeling for a user, it is more important to reduce the halo phenomenon than reducing black display-unevenness on the periphery of the rectangular region. In the embodiment, in regions on the periphery of the rectangular region, values smaller than the black display-unevenness threshold are obtained as the gradation values of the second correction image data. As a result, a reduction in the halo can be prevented. FIG. 14 shows an example of the corresponding relationship between display brightness and pixel positions. The display brightness of FIG. 14 represents values estimated from the distribution of the BL brightness of FIG. 12 and the gradation values of FIG. 13. It appears from FIG. 14 that the display brightness is steeply reduced from the rectangular region to the other regions and thus the halo phenomenon is reduced.

On the other hand, black display-unevenness is conspicuous in regions away from the rectangular region. In the embodiment, the gradation values of the second correction image data get closer to the black display-unevenness correction value as the regions are away from the rectangular region. Therefore, the black display-unevenness of the regions away from the rectangular region can be reduced. This is understood also from FIG. 14.

As described above, in the embodiment, the black display-unevenness correction processing is performed before the extension processing, and the local dimming processing is performed considering a change in gradation value by the black display-unevenness correction processing. Thus, black display-unevenness can be reduced in regions in which the black display-unevenness is conspicuous, and the halo phenomenon can be reduced in regions in which the halo phenomenon is conspicuous.

Black display-unevenness can be reduced even in a case where the black display-unevenness correction processing is performed after the extension processing. However, the above effects of the embodiment are not obtained in a case where the black display-unevenness correction processing is performed after the extension processing and the local dimming processing is performed without considering a change in gradation value by the black display-unevenness correction processing. An example of this will be described below. In the following description as well, it is assumed that the input image shown in FIG. 10 is used and an attention is paid to the cross-section position shown in FIG. 10.

Figure 15:
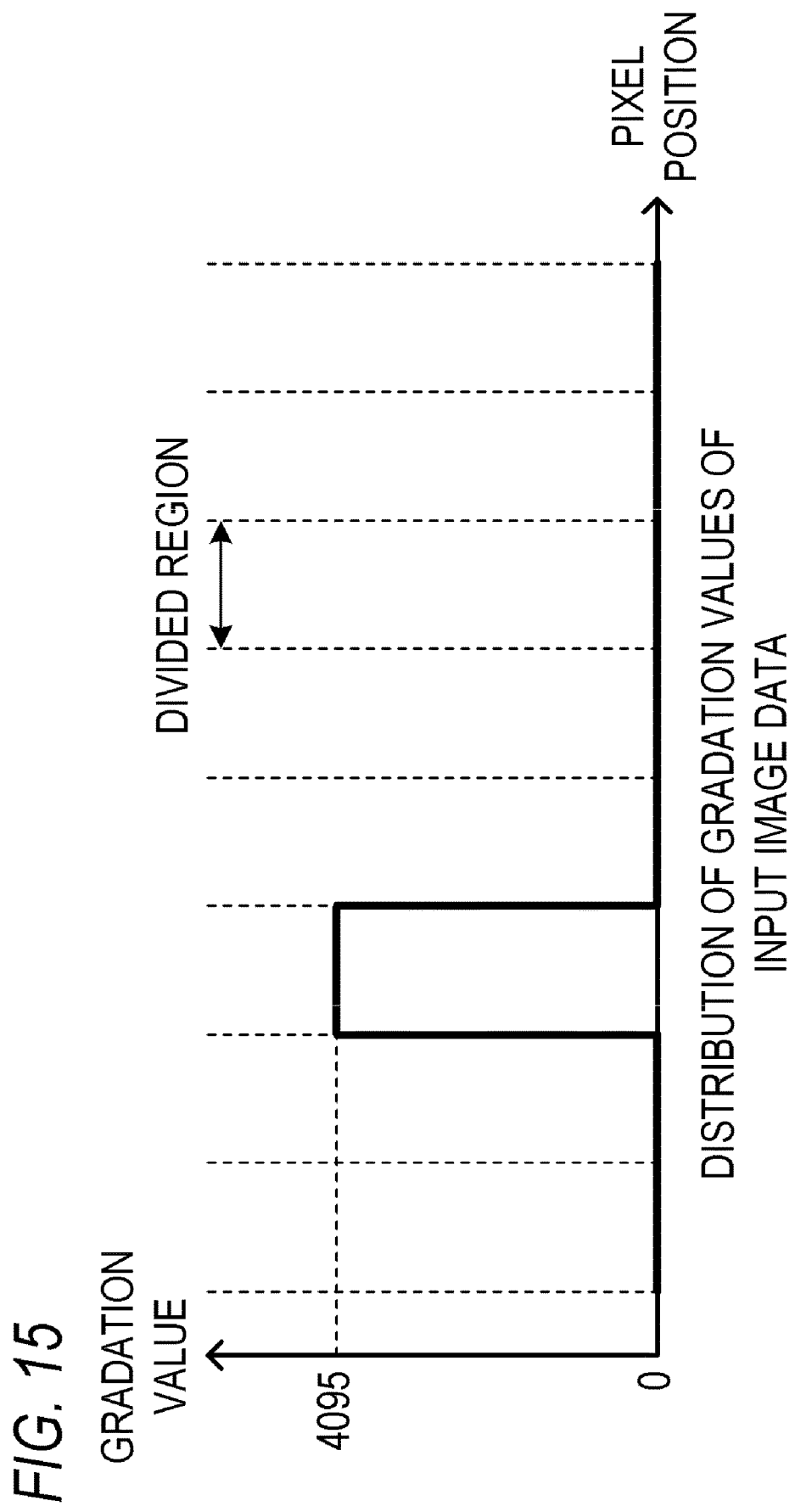
FIG. 15 is a diagram showing an example of the distribution of the gradation values of input image data according to Comparative Example.

First, the maximum gradation values of input image data in respective divided regions are acquired as characteristic values. The corresponding relationship between the gradation values of the input image data of FIG. 10 and pixel positions is shown in FIG. 15. As shown in FIG. 15, the gradation value of the input image data in the rectangular region is 4095, and the gradation values of the input image data in regions other than the rectangular region are 0. The distribution of the maximum gradation values of the input image data in the respective divided regions is the same as the distribution of the gradation values shown in FIG. 15.

Next, the light-emission brightness of respective light sources is determined based on a BL-brightness curve showing the corresponding relationship 502 of FIG. 5 and the maximum brightness values of the respective divided regions. In the corresponding relationship 502, the light-emission brightness 6.25% is associated with the maximum gradation value 0, and the light-emission brightness 100% is associated with the maximum gradation value 4095. Therefore, here, 100% is obtained as the light-emission brightness of light sources corresponding to the rectangular region, and 6.25% is obtained as the light-emission brightness of the other light sources. After that, the light-emission brightness of each of the light sources is controlled at the determined light-emission brightness.

Figure 16:
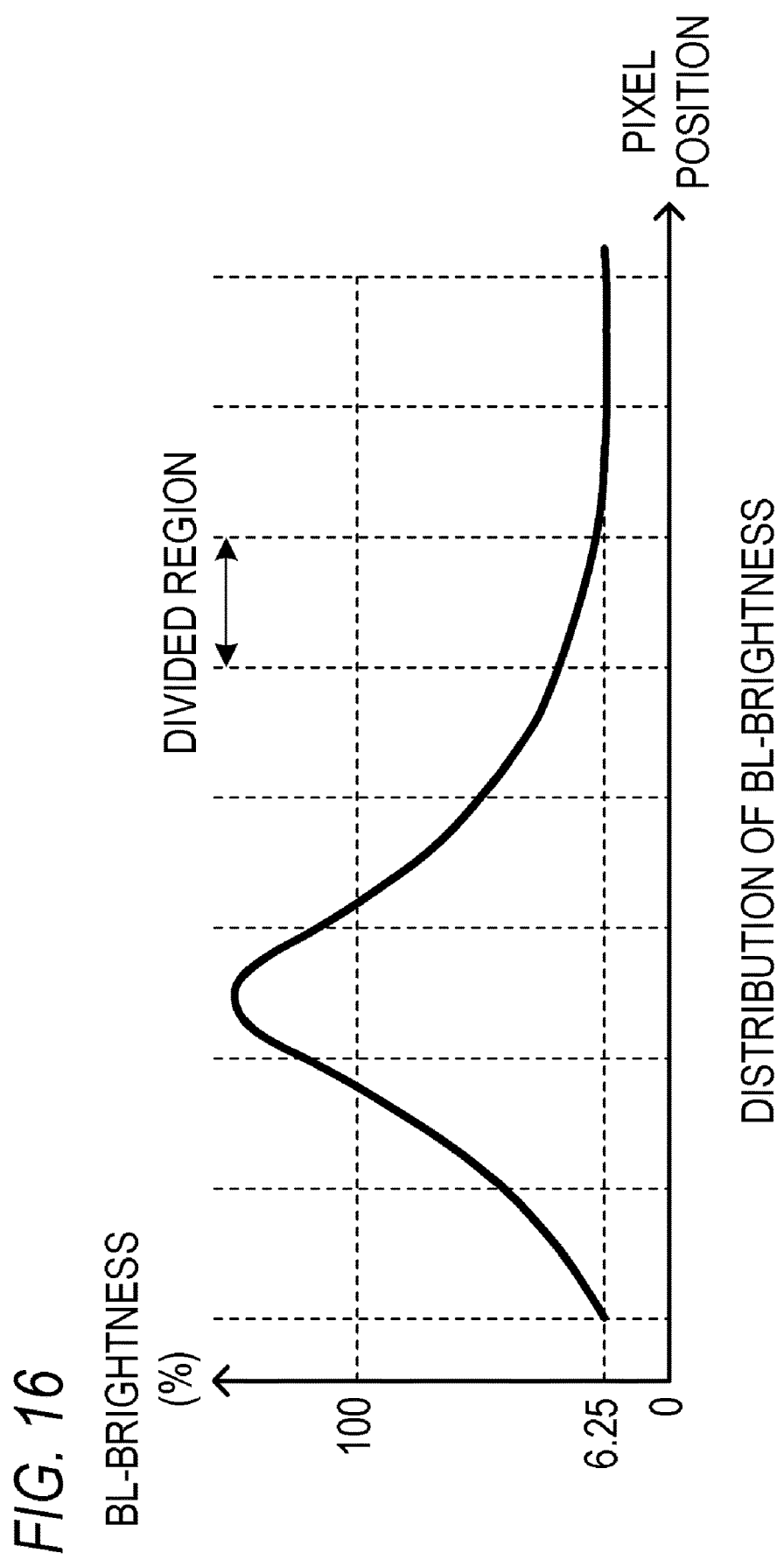
FIG. 16 is a diagram showing an example of the distribution of BL brightness according to the Comparative Example.

Then, BL brightness (brightness of light from the BL unit 109) at respective estimated positions is calculated based on the light-emission brightness of each of the light sources. Here, the corresponding relationship between the pixel positions and the BL brightness is one shown in FIG. 16. It appears from FIG. 16 that the BL brightness is higher in the rectangular region and the peripheral regions and lower in regions away from the rectangular region.

Figure 17:
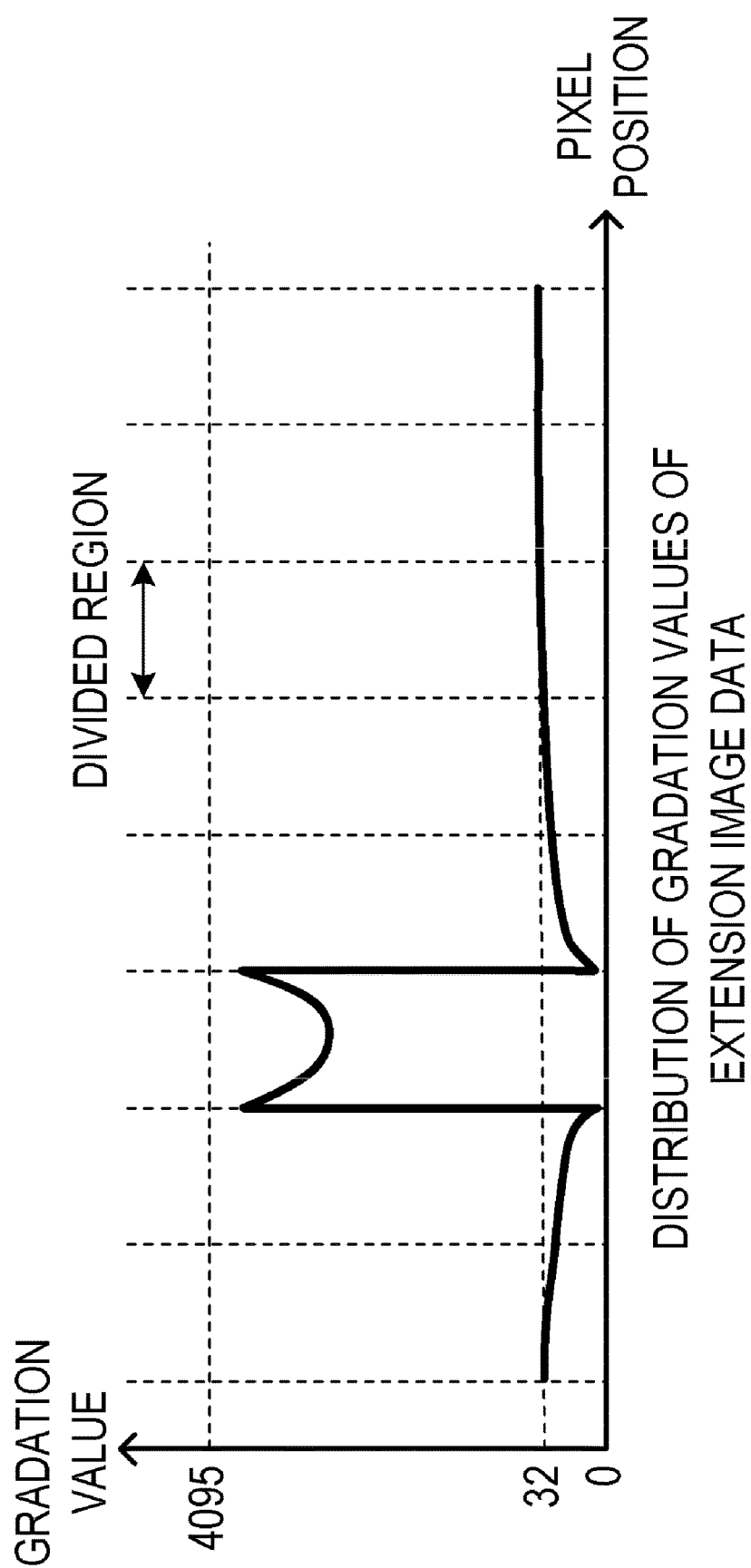
FIG. 17 is a diagram showing an example of the distribution of the gradation values of extension image data according to the Comparative Example.

Next, the extension rates of respective pixels are calculated based on the BL brightness of the respective estimated positions. Then, the respective gradation values of the input image data are multiplied by the extension rates to generate extension image data. The corresponding relationship between the gradation values of the generated extension image data and the pixel positions is shown in FIG. 17. Since the gradation values of the input image data are 0 (lower-limit gradation value) in regions other than the rectangular region, the gradation values are not changed by the extension processing. Therefore, in the regions other than the rectangular region, 0 is obtained as the gradation values of second correction image data.

Figure 18:
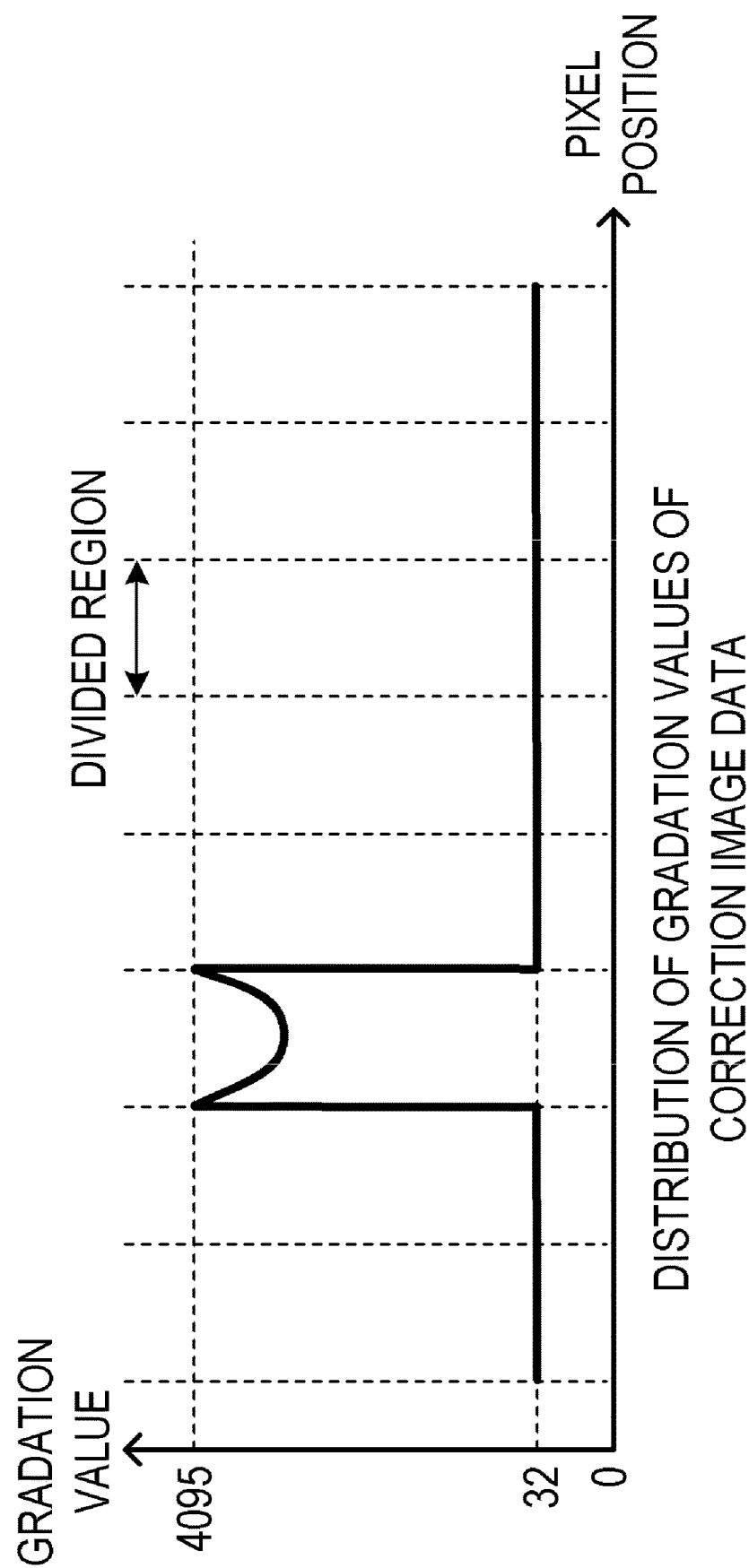
FIG. 18 is a diagram showing an example of the distribution of the gradation values of correction image data according to the Comparative Example.

Then, the black display-unevenness correction processing is applied to the extension image data to generate correction image data. After that, the correction image data is output to the liquid-crystal panel. Here, in order to reduce black display-unevenness, processing for adding the black display-unevenness threshold 32 to the respective gradation values is performed. Therefore, the corresponding relationship between the gradation values of the generated correction image data and the pixel positions is one shown in FIG. 18.

Figure 19:
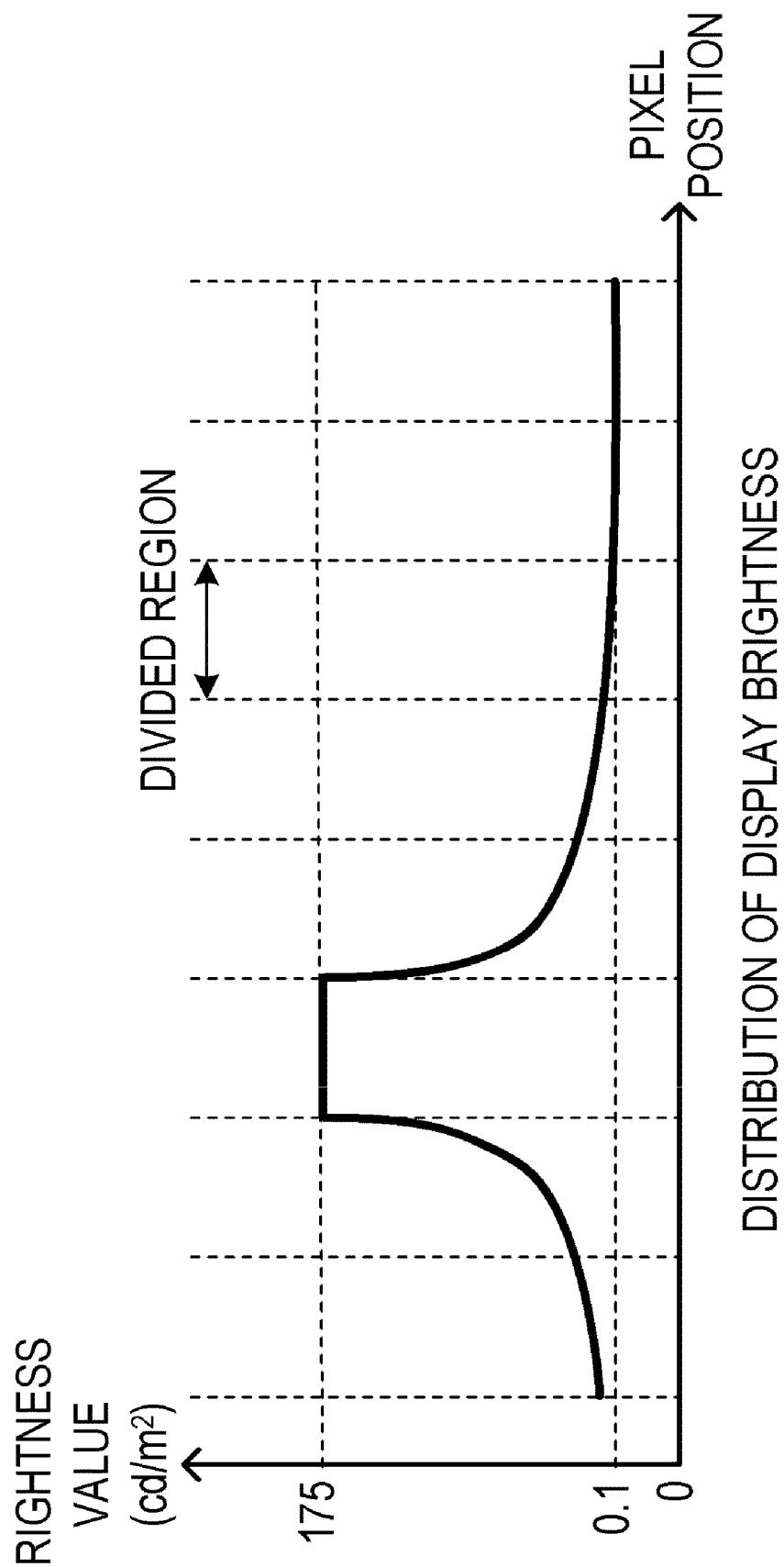
FIG. 19 is a diagram showing an example of the distribution of display brightness according to the Comparative Example.

FIG. 19 shows an example of the corresponding relationship between display brightness and pixel positions. The display brightness of FIG. 19 represents values estimated by the distribution of the BL brightness of FIG. 16 and the gradation values of FIG. 18. It appears from FIG. 19 that the display brightness is gradually reduced from the rectangular region to other divided regions and the halo phenomenon is conspicuous. In addition, it appears from FIG. 19 that the brightness of regions away from the rectangular region is higher than that of FIG. 14. Therefore, the above method results in a reduction in contrast with the black display-unevenness correction processing.

In view of the above, in order to accurately reduce a sense of disturbance feeling for a user, it is required to perform the black display-unevenness correction processing before the extension processing and perform the local dimming processing considering a change in gradation value by the black display-unevenness correction processing. Specifically, in order to reduce the halo phenomenon in regions in which the halo phenomenon is conspicuous and reduce black display-unevenness in regions in which the black display-unevenness is conspicuous, it is required to perform the black display-unevenness correction processing before the extension processing and perform the local dimming processing considering a change in gradation value by the black display-unevenness correction processing.

Note that although the embodiment describes an example in which the light-emission brightness of respective light sources is controlled based on first correction image data, it may be controlled based on input image data.

For example, like the characteristic values of input image data are acquired by the characteristic value acquisition unit 103, the black display-unevenness correction processing may be performed at the subsequent stage of the characteristic value acquisition unit 103. Further, a BL-brightness curve may be determined considering the fact that the characteristic values of input image data are acquired and gradation values are changed by the black display-unevenness correction processing. Alternatively, in a case where light-emission brightness is determined from a BL-brightness curve, acquired characteristic values may be corrected considering a change in characteristic value by the black display-unevenness correction processing. For example, a black display-unevenness correction value may be added to acquired characteristic values. Further, light-emission brightness corresponding to corrected characteristic values may be acquired from a BL-brightness curve.

Second Embodiment

Hereinafter, a description will be given of an image display apparatus and a method for controlling the same according to a second embodiment of the present invention. Note that configurations and processing different from those of the first embodiment will be described and configurations and processing the same as those of the first embodiment will be omitted.

The first embodiment describes an example in which the black display-unevenness correction processing is applied to input image data and the light-emission brightness of respective light sources is controlled considering a change in gradation value by the black display-unevenness correction processing. However, by the black display-unevenness correction processing, the number of gradation values available in image data is reduced. For example, in a case where a black display-unevenness threshold is 32 and the gradation value of image data is a 12-bit value, gradation values corresponding to 7.8% (32/4095×100) are lost by the black display-unevenness correction processing.

Therefore, in the embodiment, the black display-unevenness correction processing is performed only in a case where input image data is image data in which black display-unevenness is conspicuous. Black display-unevenness is conspicuous as a gradation value is lower and conspicuous as a region having a low gradation value is greater. Therefore, image data in which black display-unevenness is conspicuous, i.e., image data in which black display-unevenness occurs can be called "low-gradation image data." According to the above configuration of the embodiment, a reduction in gradation does not occur and thus a higher-quality display image can be obtained in a case where input image data is not low-gradation image data. Since black display-unevenness is inconspicuous in a case where input image data is not low-gradation image data, it is not required to perform the black display-unevenness correction processing. Further, in a case where input image data is low-gradation image data, the same effects as those of the first embodiment can be obtained. For example, a reduction in the contrast of a display image caused in a case where black display-unevenness is reduced can be prevented.

Figure 20:
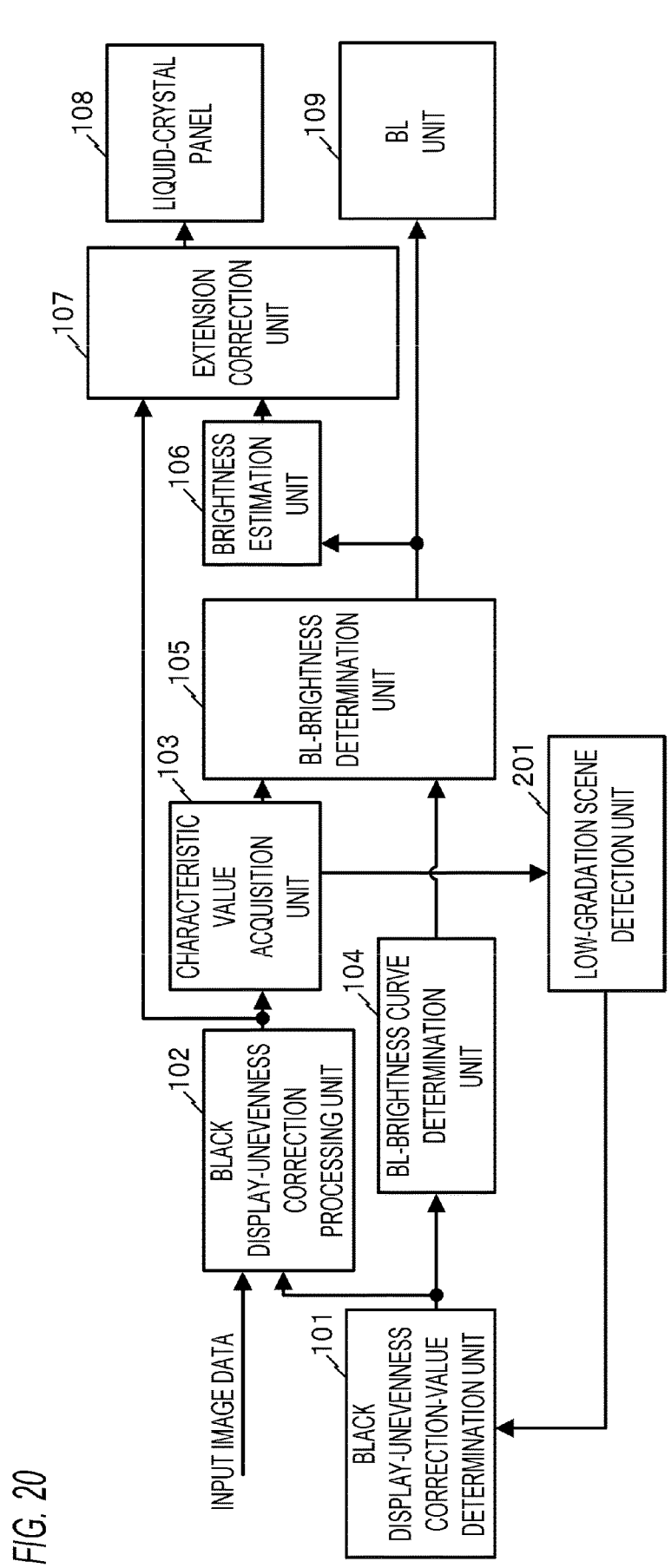
FIG. 20 is a block diagram showing an example of the functional configuration of an image display apparatus according to a second embodiment.

In the embodiment, a description will be given of an example in which moving-image data is input to the image display apparatus. Specifically, a description will be given of an example in which the input image data of frames is input to the image display apparatus for each of the frames. FIG. 20 is a block diagram showing an example of the functional configuration of the image display apparatus according to the embodiment. In FIG. 20, a low-gradation scene detection unit 201 is further provided besides the functional units of the first embodiment (FIG. 1).

Note that functional units the same as those of the first embodiment will be denoted by symbols the same as those of the first embodiment and their descriptions will be omitted.

Note that in FIG. 20 the respective functional units perform their processing for each of frames as a matter of course.

The low-gradation scene detection unit 201 determines whether input image data is low-gradation image data based on the input image data or target image data serving as first correction image data. In the embodiment, a determination is made for each of frames as to whether the input image data of the frame is low-gradation image data based on the target image data of the frame. Specifically, the low-gradation scene detection unit 201 acquires the maximum gradation values (characteristic values) of respective divided regions from a characteristic value acquisition unit 103 and determines whether the input image data is low-gradation image data based on the acquired characteristic values. A determination result is output to a black display-unevenness correction-value determination unit 101. The determination of image data and the output of a determination result are performed for each of the frames.

Figure 21:
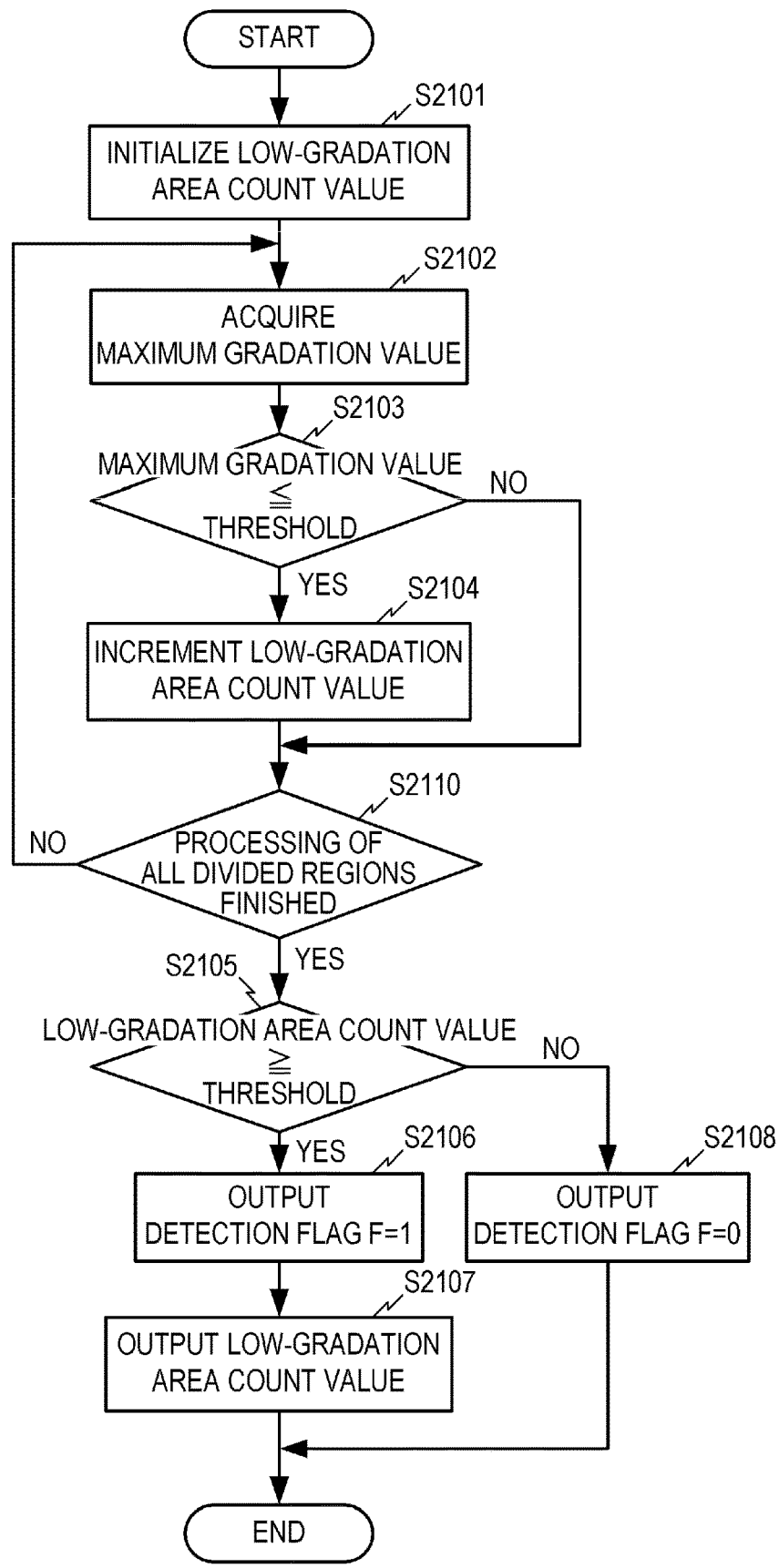
FIG. 21 is a diagram showing an example of the processing flow of a low-gradation scene detection unit according to a second embodiment.

A description will be given of an example of the processing of the low-gradation scene detection unit 201 with reference to FIG. 21. FIG. 21 is a flowchart showing an example of the flow of the processing of the low-gradation scene detection unit 201.

First, in S2101, the low-gradation scene detection unit 201 initializes a low-gradation area count value to zero. In addition, the low-gradation scene detection unit 201 selects one of a plurality of divided regions as a notice area.

Next, in S2102, the low-gradation scene detection unit 201 acquires the maximum gradation value (characteristic value) of the notice area.

Then, in S2103, the low-gradation scene detection unit 201 determines whether the maximum gradation value of the notice area is less than or equal to a preset threshold (less than or equal to a third threshold). It can also be said that the processing represents "processing for determining whether the notice area is a low-gradation region (low-gradation area)." The low-gradation region represents a region in which the gradation value (maximum gradation value in the embodiment) of target image data is less than or equal to the third threshold. In the embodiment, a black display-unevenness correction value determined according to the method of the first embodiment is used as the third threshold. Note that the third threshold may be greater or smaller than the black display-unevenness correction value determined according to the method of the first embodiment.

In a case where the maximum gradation value is less than or equal to the third threshold (the notice area is the low-gradation region), the processing proceeds to S2104. In S2104, the low-gradation scene detection unit 201 increments the low-gradation area count value by 1. After that, the processing proceeds to S2110.

In a case where the maximum gradation value is greater than the third threshold (the notice area is not the low-gradation region), the processing proceeds to S2110 without the update of the low-gradation area count value.

In S2110, the low-gradation scene detection unit 201 determines whether all the divided regions have been selected as notice areas. In a case where there is any divided region not selected as a notice area, the divided region is selected as a notice area and the processing returns to S2102. In a case where all the divided regions are selected as notice areas, the processing proceeds to S2105. As described above, in the embodiment, the processing of S2101 to S2104 is applied to each of the plurality of divided regions.

In S2105, the low-gradation scene detection unit 201 determines whether the low-gradation area count value is greater than or equal to a preset threshold (fourth threshold). It can also be said that the processing represents "processing for determining whether the number of the low-gradation areas is greater than or equal to the fourth threshold." In the embodiment, 38 (=48×0.8), i.e., 80% of the number of the divided regions is used as the fourth threshold. Note that the fourth threshold may be greater or smaller than the value corresponding to 80% of the number of the divided regions.

In a case where the low-gradation area count value (the number of low-gradation areas) is greater than or equal to the fourth threshold, it is determined that input image data is the low-gradation image data and the processing proceeds to S2106.

In a case where the low-gradation area count value is less than the fourth threshold, it is determined that the input image data is not the low-gradation image data and the processing proceeds to S2108.

In S2106, the low-gradation scene detection unit 201 outputs a detection flag F=1 to a black display-unevenness correction-value determination unit 101. Then, in S2107, the low-gradation scene detection unit 201 outputs the low-gradation area count value to the black display-unevenness correction-value determination unit 101.

In S2108, the low-gradation scene detection unit 201 outputs a detection flag F=0 to the black display-unevenness correction-value determination unit 101.

In a case where the input image data is the image data of FIG. 2, the black display-unevenness correction value is 4. Therefore, 4 is acquired as the maximum brightness value of the respective divided regions, and all the divided regions are detected as low-gradation areas. Therefore, 48 (>the fourth threshold 38) is obtained as a final low-gradation area count value. As a result, it is determined that the input image data is low-gradation image data, and the detection flag F=1 and the low-gradation area count value 48 are output.

The black display-unevenness correction-value determination unit 101 acquires, for each of the frames, a detection flag F from the low-gradation scene detection unit 201. In the embodiment, a low-gradation area count value may be acquired from the low-gradation scene detection unit 201. Further, a black display-unevenness correction value is determined and output in the same way as that of the first embodiment in a case where the detection flag F=1 is acquired, and 0 is output as a black display-unevenness correction value in a case where the detection flag F=0 is acquired. As a result, in a case where it is determined that input image data is low-gradation image data, first correction image data is generated in which the gradation value of the input image data is increased. Further, in a case where it is determined that input image data is not low-gradation image data, first correction image data the same as the input image data is generated.

As described above, according to the embodiment, the black display-unevenness correction processing is performed only in a case where it is determined that input image data is low-gradation image data. Thus, in a case where input image data is not low-gradation image data, a higher-quality display image can be obtained without a reduction in gradation. Further, in a case where input image data is low-gradation image data, the same effects as those of the first embodiment can be obtained.

Note that a method for determining whether input image data is low-gradation image data is not limited to the above method. For example, a determination is made as to whether input image data is low-gradation image data based on the number of gradation values less than or equal to a threshold.

Note that a method for determining (method for setting) a black display-unevenness correction value is not limited to the above method.

Figure 22:
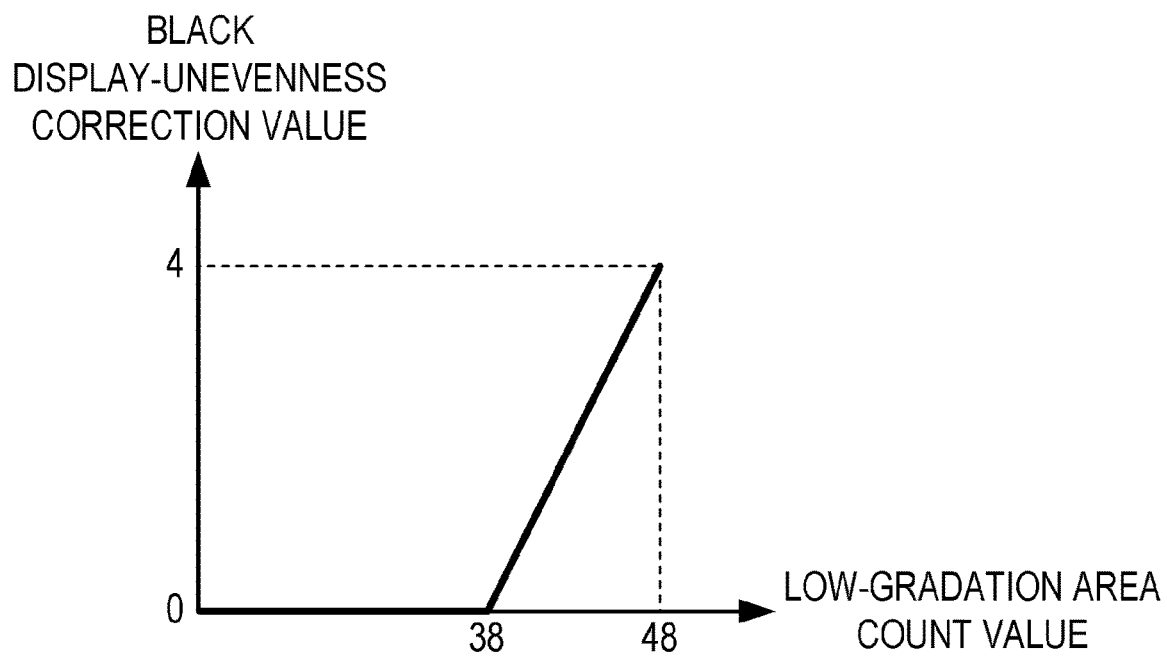
FIG. 22 is a diagram showing an example of a method for determining a black display-unevenness correction value according to the second embodiment.

For example, as an increasing amount of the gradation value of input image data by the black display-unevenness correction processing, a black display-unevenness correction value may be determined such that a greater black display-unevenness correction value is obtained as the number of low-gradation areas is greater. Specifically, a black display-unevenness correction value may be determined as shown in FIG. 22. FIG. 22 shows an example of the corresponding relationship between a low-gradation area count value and a black display-unevenness correction value. In the example of FIG. 22, 0 is used as the black display-unevenness correction value in a case where the low-gradation area account value is less than the fourth threshold 38. Further, the black display-unevenness correction value is determined such that the black display-unevenness correction value linearly increases from 0 to 4 (value determined according to the method of the first embodiment) with an increase in the low-gradation area count value in a case where the low-gradation area account value is greater than or equal to the fourth threshold 38.

In addition, a black display-unevenness correction value may be determined such that an increasing amount of the gradation value of input image data by the black display-unevenness correction processing gets gradually closer to a detection flag F or a value corresponding to a low-gradation area account value. For example, a change amount of the black display-unevenness correction value between frames may be limited to a value less than or equal to a threshold. Thus, a sudden change in contrast or black display-unevenness caused in a case where is black display-unevenness correction value is suddenly changed can be prevented.

Third Embodiment

Hereinafter, a description will be given of an image display apparatus and a method for controlling the same according to a third embodiment of the present invention. Note that configurations and processing different from those of the first and second embodiments will be described and configurations and processing the same as those of the first and second embodiments will be omitted.

The first and second embodiments describe an example in which all the gradation values of image data are increased by the black display-unevenness correction processing. In the black display-unevenness correction processing, however, it is only required to increase at least the gradation value of a region in which black display-unevenness is conspicuous. The embodiment will describe an example in which only a part of the gradation values of image data is increased by the black display-unevenness correction processing. In addition, the embodiment will describe an example in which the halo phenomenon can be more reduced.

Figure 23:
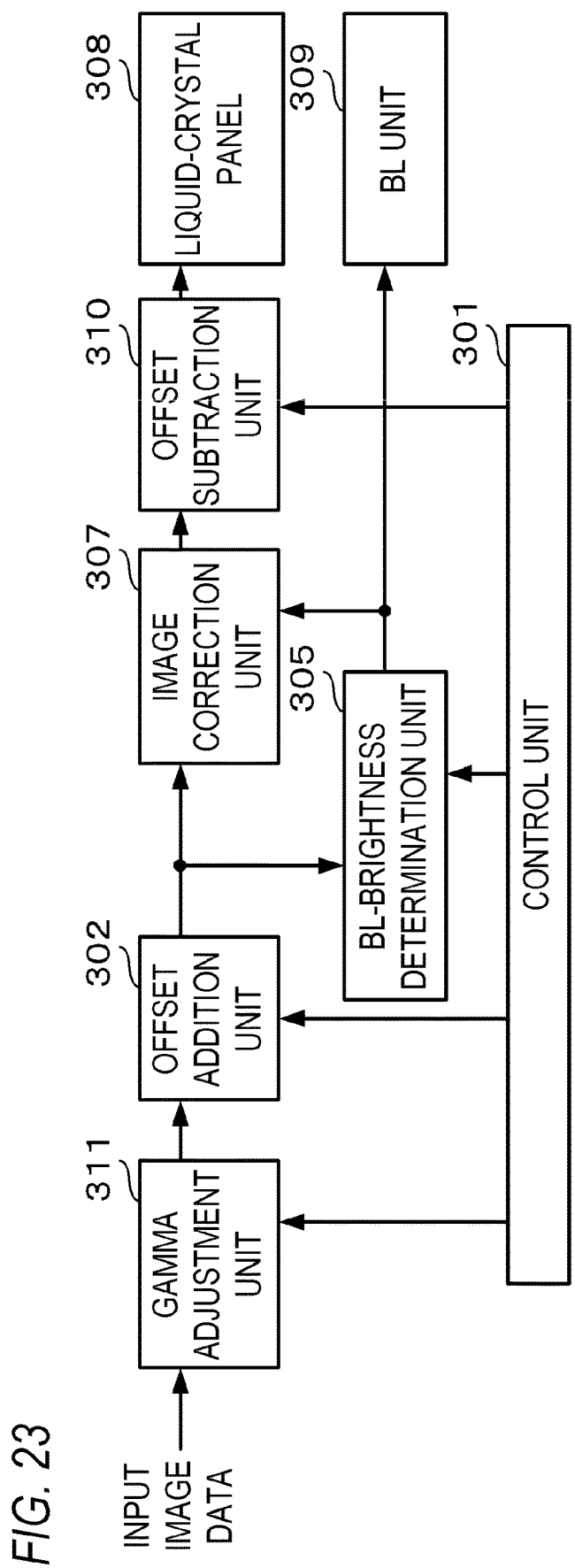
FIG. 23 is a block diagram showing an example of the functional configuration of an image display apparatus according to a third embodiment.

FIG. 23 is a block diagram showing an example of the functional configuration of the image display apparatus according to the embodiment. As shown in FIG. 23, the image display apparatus according to the embodiment has a control unit 301, an offset addition unit 302, a BL-brightness determination unit 305, an image correction unit 307, an offset subtraction unit 310, a BL unit 309, a liquid-crystal panel 308, and a gamma adjustment unit 311.

The BL unit 309 is the same as the BL unit 109 of FIG. 1.

The liquid-crystal panel 308 is the same as the liquid-crystal panel 108 of FIG. 1. Although omitted in the first and second embodiments, the display brightness of a pixel is, for example, proportional to a value obtained by multiplying the transmittance of a liquid-crystal device corresponding to the pixel by BL brightness at the position of the pixel. Therefore, in a case where BL brightness at the position of a pixel is constant, the display brightness of the pixel is proportional to the transmittance of a liquid-crystal device corresponding to the pixel. In addition, in a case where the transmittance of a liquid-crystal device corresponding to a pixel is constant, the display brightness of the pixel is proportional to BL brightness at the position of the pixel.

The BL-brightness determination unit 305 determines the light-emission brightness of each of the light sources of the BL unit 309 based on image data (first correction image data) input to the BL-brightness determination unit 305. Then, the BL-brightness determination unit 305 controls the light-emission brightness of each of the light sources at the determined light-emission brightness. In the embodiment, it is determined that the light-emission brightness of light sources is lower in regions in which the brightness of image data is low than regions in which the brightness of the image data is high. For example, the light-emission brightness of light sources corresponding to divided regions in which image data is bright is not reduced from a reference value, while the light-emission brightness of light sources corresponding to divided regions in which the image data is dark is reduced to a value smaller than the reference value. Specifically, with a reduction in the brightness of image data in divided regions, the light-emission brightness of light sources corresponding to the divided regions is determined such that the light-emission brightness linearly reduces from a reference value to lower-limit light-emission brightness. However, the lower-limit light-emission brightness is controlled according to a target contrast. In addition, the BL-brightness determination unit 305 outputs light-emission brightness information showing the light-emission brightness of each of the light sources to the image correction unit 307.

Since the contrast of a display image represents the ratio of the maximum value (upper-limit display brightness) of a value at which display brightness may be set to the minimum value (lower-limit display brightness) thereof, the contrast is determined based on the lower-limit display brightness in a case where the upper-limit display brightness is constant. Further, the lower-limit display brightness is proportional to the brightness of BL-light leaking from the liquid-crystal panel 308 in a case where the transmittance of the liquid-crystal panel 308 is set at lower-limit transmittance. The lower-limit transmittance represents the minimum value of a value at which the transmittance may be set, and the BL-light represents light emitted from the BL unit 309. Therefore, the lower-limit display brightness is determined based on the lower-limit light-emission brightness. Accordingly, the contrast of a display image is determined based on the lower-limit light-emission brightness.

The image correction unit 307 acquires light-emission brightness information from the BL-brightness determination unit 305. The image correction unit 307 applies extension processing based on the light-emission brightness information to image data (first correction image data) input to the image correction unit 307. Then, the image correction unit 307 outputs image data (second correction image data) having been subjected to the extension processing to the offset subtraction unit 310. In the embodiment, for each of divided regions, the respective gradation values of the first correction image data in the divided region are multiplied by a coefficient corresponding to light-emission brightness corresponding to the divided region. For example, in a case where the light-emission brightness of light sources corresponding to divided regions is BG times as large as a reference value, the respective gradation values of first correction image data in the divided regions are multiplied by 1/BG. Thus, second correction image data is generated.

Figure 24A:
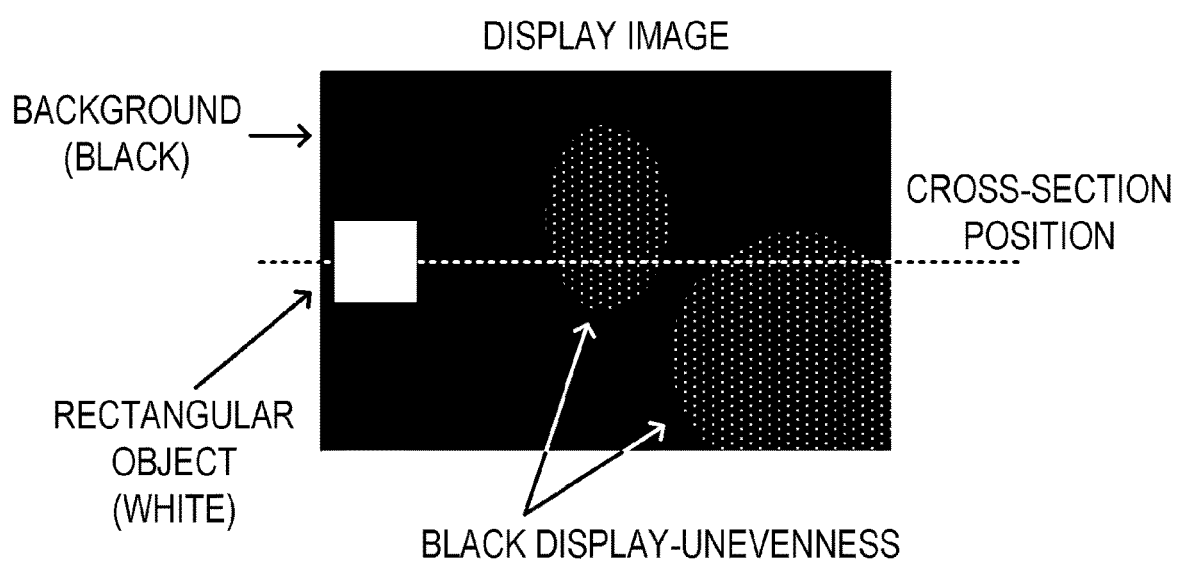
FIG. 24A is a diagram showing an example of black display-unevenness according to the third embodiment.
Figure 24B:
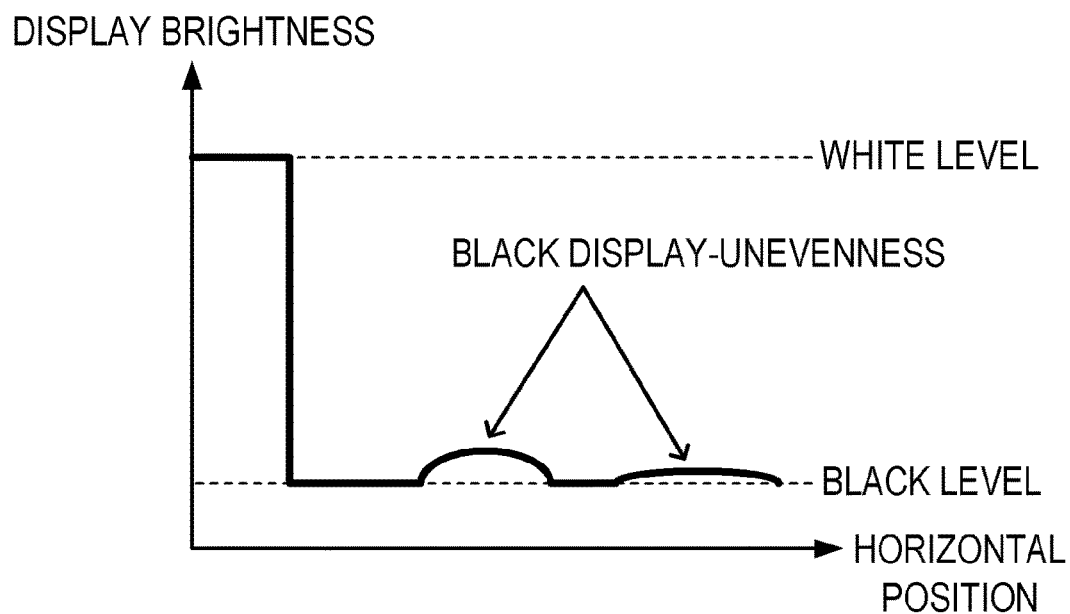
FIG. 24B is a diagram showing an example of the black display-unevenness according to the third embodiment.

Here, a description will be given of the unevenness of a display image. FIGS. 24A and 24B show an example of black display-unevenness. FIG. 24A shows an example of a display image in a case where image data in which a white rectangular object exists on a black background is used in the liquid-crystal panel 308. Dotted regions in the background (black background) are background regions in which black display-unevenness occurs. FIG. 24B shows an example of the distribution of display brightness at the cross-section position of FIG. 24A. It appears from FIG.

24B that the background regions in which the black display-unevenness occurs are higher in the display brightness than the other background regions.

Figure 25:
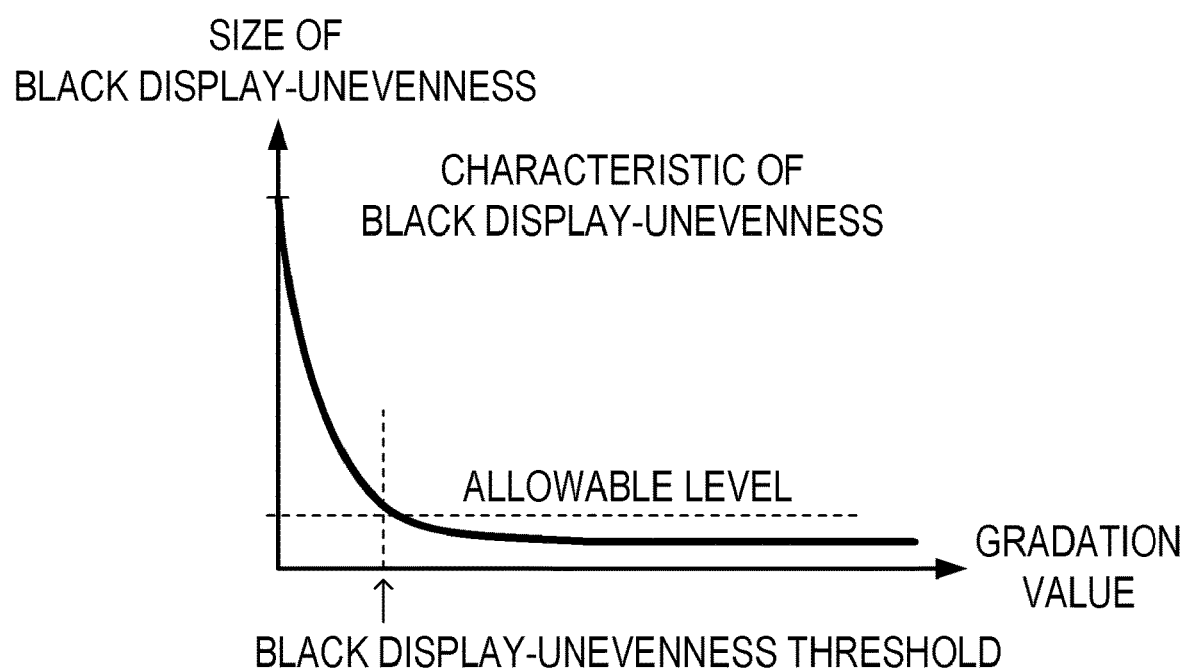
FIG. 25 is a diagram showing an example of the characteristics of the black display-unevenness according to the third embodiment.

The black display-unevenness is most conspicuous in a case where a gradation value used in the liquid-crystal panel 308 is 0, and is rapidly reduced in a case where the gradation value used in the liquid-crystal panel 308 is increased. Therefore, the black display-unevenness can be made inconspicuous in a case where the gradation value used in the liquid-crystal panel 308 is limited to a value greater than or equal to a predetermined value (black display-unevenness threshold OFS). FIG. 25 shows an example of the characteristics (corresponding relationship between a gradation value used in the liquid-crystal panel 308 and the size of black display-unevenness) of the black display-unevenness. In FIG. 25, an allowable level represents the maximum value of the size of allowable black display-unevenness. It can also be said that the allowable level is the "maximum value of the size of inconspicuous black display-unevenness." In order to control the size of black display-unevenness at a level less than or equal to the allowable level, it is only required to use in the liquid-crystal panel 308, as the gradation value (lower-limit gradation value) of a black color, a gradation value greater than or equal to a gradation value (black display-unevenness threshold OFS) at which the size of the black display-unevenness reaches the allowable level.

Note that a method for determining the allowable level and the black display-unevenness threshold OFS may be determined in any way. For example, such values can be determined based on the results of the subjective evaluation of a plurality of persons.

As described above, in the embodiment, only a part of the gradation values of image data is increased by the black display-unevenness correction processing. However, the black display-unevenness correction processing results in a change in the gradation characteristics (corresponding relationship between a gradation value and display brightness) of image data. For example, by the black display-unevenness correction processing, the gradation characteristics is changed from linear characteristics in which display brightness linearly increases with an increase in gradation value to non-linear characteristics in which display brightness non-linearly increases with an increase in gradation values.

The gamma adjustment unit 311 converts the gradation characteristics of input image data such that the gradation characteristics of first correction image data get close to predetermined gradation characteristics (desired gradation characteristics). For example, the gradation characteristics of the input image data are converted such that the shape of the gradation characteristics of the first correction image data gets close to the shape of the gradation characteristics of the input image data. Thus, gamma adjustment image data is generated. In the embodiment, the gradation characteristics are converted using a lookup table (LUT) showing the corresponding relationship between a gradation value before conversion and a gradation value after the conversion. Hereinafter, the LUT used for the conversion of the gradation characteristics will be described as a "gamma adjustment table." The gamma adjustment unit 311 outputs the generated gamma adjustment image data (input image data in which the gradation characteristics are converted) to the offset addition unit 302.

Note that the gamma adjustment unit 311 is not required in a case where a change in gradation characteristics by the black display-unevenness correction processing is allowed.

Note that in the embodiment, the pixel value of input image data is one obtained by combining RGB values (R-value, G-value, and B-value) together. The R-value represents the gradation value of a red color, the G-value represents the gradation value of a green color, and the B-value represents the gradation value of a blue color. In addition, in the embodiment, it is assumed that the R-value, the G-value, and the B-value represent 8-bit values (values greater than or equal to 0 and less than or equal to 255) and (R-value, G-value, and B-value)=(0, 0, 0) represent the RGB-values of a black color and (R-value, G-value, B-value)=(255, 255, 255) represent the RGB-values of a white color. Further, in the embodiment, it is assumed that there is a proportional relationship between a gradation value and display brightness.

The offset addition unit 302 generates first correction image data by applying the black display-unevenness correction processing to image data (gamma adjustment image data) input to the offset addition unit 302. In the embodiment, a gradation value less than a preset low-gradation threshold (second threshold) among the plurality of gradation values of the gamma adjustment image data is increased by the black display-unevenness correction processing. Specifically, an offset value (offset addition value) is added to a gradation value less than the low-gradation threshold. In the embodiment, the offset addition unit 302 corrects the gradation value of the gamma adjustment image data using a three-dimensional lookup table (3DLUT) having 27 lattice points corresponding to all the combinations of three R-values, three G-values, and three B-values. Hereinafter, the 3DLUT used by the offset addition unit 302 will be described as an "offset addition LUT." The offset addition unit 302 outputs the generated first correction image data to the BL-brightness determination unit 305 and the image correction unit 307.

Figure 26:
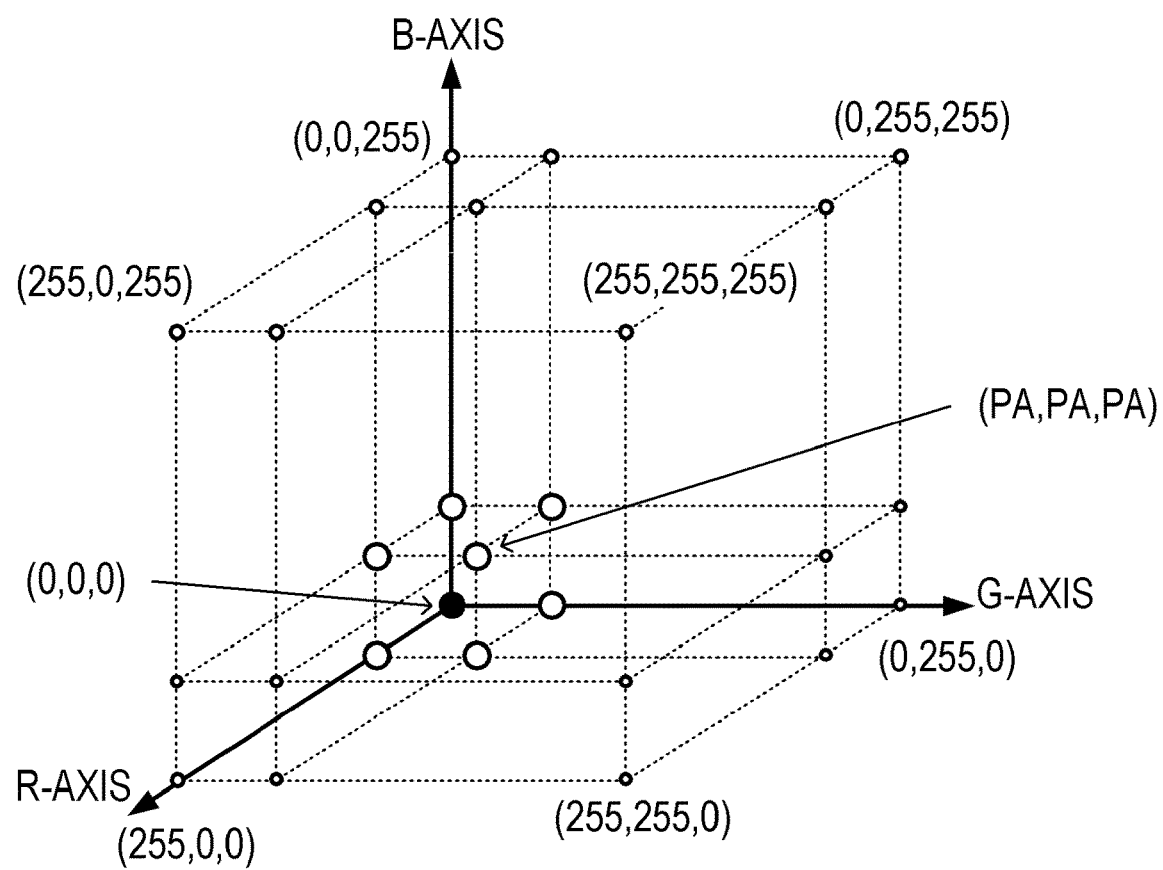
FIG. 26 is a diagram showing an offset addition LUT according to the third embodiment.

FIG. 26 is a diagram showing an example of the offset addition LUT. In FIG. 26, an R-axis represents the R-values of gamma adjustment image data, a G-axis represents the G-values of the gamma adjustment image data, and a B-axis represents the B-values of the gamma adjustment image data. As shown in FIG. 26, 0, PA (low-gradation threshold), and 255 are used as the above three R-values in the lattice points of the offset addition LUT. Similarly, 0, PA, and 255 are used as the G-values and the B-values. In FIG. 26, a lattice point corresponding to the RGB-values (0, 0, 0) of a black color is shown by a black circle. In addition, seven lattice points in which each of the R-values, the G-values, and the B-values is 0 or the PA are shown by white circles. Further, 19 lattice points in which any of the R-values, the G-values, and the B-values is 255 are shown by white circles. A black display-unevenness correction value OFSA is allocated to the lattice point corresponding to the black color as an output value, and 0 is allocated to the other lattice points as an output value.

The offset addition unit 302 compares the RGB-values (target RGB-values) of the gain adjustment image data with the coordinates (RGB-values) of the lattice points of the offset addition LUT and detects eight lattice points among the 27 lattice points. In the embodiment, the eight lattice points on the periphery of the target RGB-values are detected in RGB color space (space having the R-axis, the G-axis, and the B-axis). In other words, among cubes formed in the RGB color space and having eight lattice points as apexes, the eight lattice points forming a minimum cube including the target RGB-values is detected. Then, the offset addition unit 302 performs weighing addition on eight output values allocated to the detected eight lattice points with greater weights as the differences between the coordinates of the lattice points and the target RGB-values (distances inside the RGB color space) are smaller. Thus, offset addition values to be added to the target RGB values are calculated. Specifically, weighing addition using a weight according to a distance in the R-axis direction is performed to calculate an offset addition value to be added to an R-value, and weighing addition using a weight according to a distance in the G-axis direction is performed to calculate an offset addition value to be added to a G-value. Then, weighing addition using a weight according to a distance in the B-axis direction is performed to calculate an offset addition value to be added to a B-value. The offset addition unit 302 adds the calculated offset addition values to the target RGB-values. The offset addition unit 302 performs this processing on the respective gradation values of the gain adjustment image data. Thus, first correction image data is generated.

According to the above weighing addition, the OFSA is calculated as an offset addition value in a case where the gradation values (R-value, G-value, and B-value) of target RGB values are 0, and a value closer to 0 is calculated as an offset addition value as the gradation values of target RGB-values are greater. Further, 0 is calculated as an offset addition value in a case where the gradation values of target RGB-values are greater than or equal to the low-gradation threshold PA. Therefore, gradation values greater than or equal to the low-gradation threshold PA are free from the influence of the black display-unevenness correction processing (offset addition processing).

Figure 27:
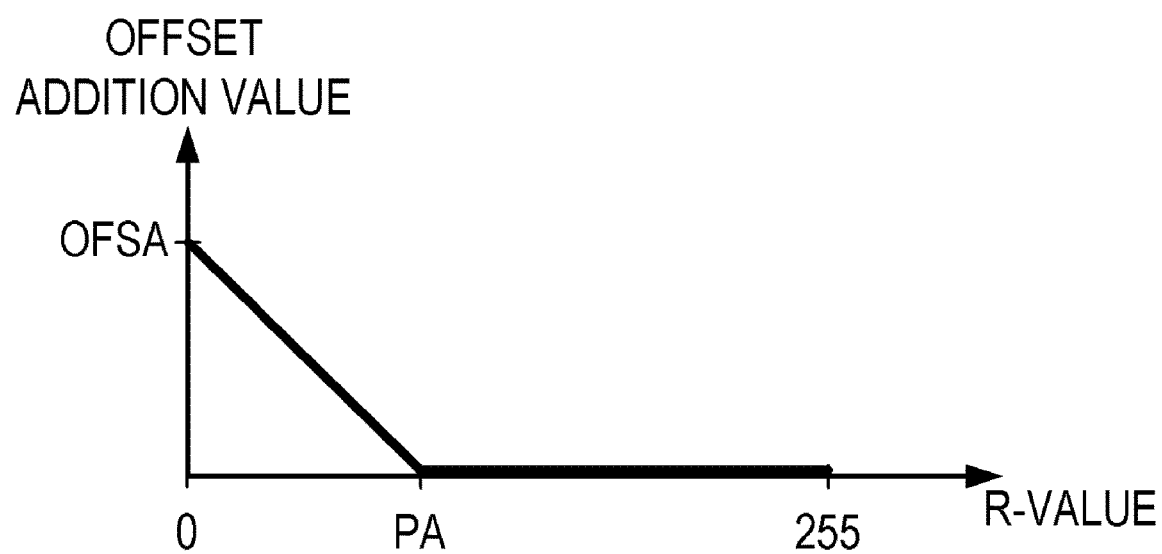
FIG. 27 is a diagram showing an example of a method for determining an offset addition value according to the third embodiment.

FIG. 27 is a diagram showing an example of the corresponding relationship between a gradation value and an offset addition value. Specifically, FIG. 27 shows the corresponding relationship between an R-value and an offset addition value to be added to the R-value in a case where a G-value and a B-value are 0. It appears from FIG. 27 that the offset addition value reduces from to the OFSA to 0 in a case where the R-value increases from 0 to the PA. Further, it appears that 0 is obtained as the offset addition value in the range of the R-value greater than or equal to the PA.

Note that the low-gradation threshold PA may be any value. The low-gradation threshold PA is preferably a value within the range of gradation values required to correct black display-unevenness and preferably a value in which the difference between a gradation value before conversion and a gradation value after the conversion is small. For example, a value twice as large as the black display-unevenness correction value OFSA may be preferably used as the low-gradation threshold PA.

Note that the number of the lattice points may be greater or smaller than 27. The offset addition LUT is only required to have at least eight lattice points corresponding to all the combinations of two R-values, two G-values, and two B-values.

Note that the black display-unevenness correction processing is not limited to the above method. For example, an offset addition value common to an R-value, a G-value, and a B-value may be calculated for each pixel by weighing addition using a weight according to a three-dimensional distance. For each pixel, an offset addition value to be added to the R-value, the G-value, and the B-value of the pixel may be calculated using a one-dimensional lookup table having lattice points corresponding to one type of gradation values (such as R-values, G-values, B-values, and brightness values (Y-values)). Like the first embodiment, the black display-unevenness correction value OFSA may be added to all the gradation values. However, according to the above method in which three offset addition values corresponding to an R-value, a G-value, and a B-value are calculated using the 3DLUT, a reduction in the chroma of pixels by the addition of the offset addition values can be reduced.

The offset subtraction unit 310 applies gradation-value reduction processing to image data (second correction image data) input to the offset subtraction unit 310 to generate third correction image data. The gradation-value reduction processing represents image processing (third correction processing) in which a gradation value less than the black display-unevenness threshold OFS is reduced. In the embodiment, an offset value (offset subtraction value) is subtracted from a gradation value less than the black display-unevenness threshold OFS. It can also be said that the "offset subtraction value is a reducing amount of the gradation value by the third correction processing." Specifically, the offset subtraction unit 310 corrects the gradation value of second correction image data using a 3DLUT having 64 lattice points corresponding to all the combinations of four R-values, four G-values, and four B-values. Hereinafter, the 3DLUT used by the offset subtraction unit 310 will be described as an "offset subtraction LUT." The offset subtraction unit 310 outputs the generated third correction image data to the liquid-crystal panel 308. As a result, the transmittance of the liquid-crystal panel 308 is controlled at transmittance corresponding to the third correction image data. In other words, it can also be said that the offset addition unit 302, the image correction unit 307, and the offset subtraction unit 310 control the transmittance of the liquid-crystal panel 308 based on the third correction image data generated from the input image data.

Figure 28:
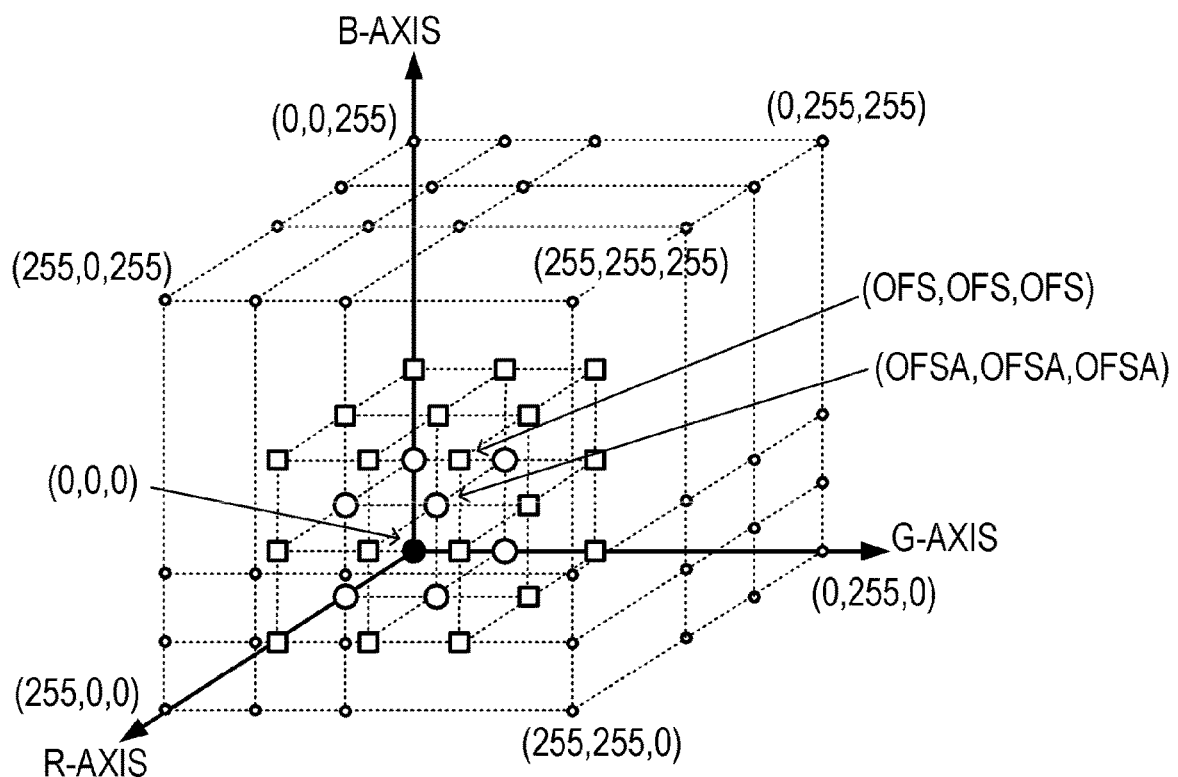
FIG. 28 is a diagram showing an example of an offset subtraction LUT according to the third embodiment.

FIG. 28 is a diagram showing an example of the offset subtraction LUT. In FIG. 28, an R-axis represents the R-values of second correction image data, a G-axis represents the G-values of the second correction image data, and a B-axis represents the B-values of the secondary correction image data. As shown in FIG. 28, 0, OFSA (black display-unevenness correction value), OFS (black display-unevenness threshold), and 255 are used as the above four R-values in the lattice points of the offset subtraction LUT. Similarly, 0, the OFSA, the OFS, and 255 are also used as the G-values and the B-values. In FIG. 28, a lattice point (first lattice point) corresponding to the RGB-values (0, 0, 0) of a black color is shown by a black circle. Seven lattice points (second lattice points) in which each of the R-values, the G-values, and the B-values is 0 or the OFSA are shown by white circles. 19 lattice points (third lattice points) in which any of the R-values, the G-values, and the B-values is the OFS and the other gradation values are 0, the OFSA, or the OFS are shown by white squares. Further, 37 lattice points (fourth lattice points) in which any of the R-values, the G-values, and the B-values is 255 are shown by small white circles. The black display-unevenness correction value OFSA is allocated to the second lattice points as an output value, and 0 is allocated to the other lattice points as an output value.

The offset subtraction unit 310 compares the RGB-values (target RGB-values) of the second correction image data with the coordinates (RGB-values) of the lattice points of the offset subtraction LUT and detects eight lattice points among the 64 lattice points. A method for detecting the eight lattice points is the same as that of the offset addition unit 302. Then, the offset subtraction unit 310 performs weighing addition on eight output values allocated to the detected eight lattice points. Thus, offset subtraction values to be subtracted from the target RGB-values are calculated. A method for performing the weighing addition is the same as that of the offset addition unit 302. The offset subtraction unit 310 subtracts the calculated offset subtraction values from the target RGB-values. The offset subtraction unit 310 performs this processing on the respective gradation values of the second correction image data. Thus, third correction image data is generated.

According to the above weighing addition, the black display-unevenness correction value OFSA is calculated as an offset subtraction value in a case where the gradation values (R-value, G-value, and B-value) of target RGB values are the same as the black display-unevenness correction value OFSA. In a case where the gradation values of the target RGB-values are smaller than the black display-unevenness correction value OFSA, a value closer to 0 is calculated as an offset subtraction value as the gradation values of the target RGB-values are smaller. In a case where the gradation values of the target RGB-values are greater than the black display-unevenness correction value OFSA, a value closer to 0 is calculated as an offset subtraction value as the gradation values of the target RGB-values are greater. Then, 0 is calculated as an offset addition value in a case where the gradation values of the target RGB-values are greater than or equal to the black display-unevenness threshold OFS. Therefore, gradation values greater than or equal to the black display-unevenness threshold OFS are free from the influence of the gradation-value reduction processing (offset subtraction processing).

Figure 29:
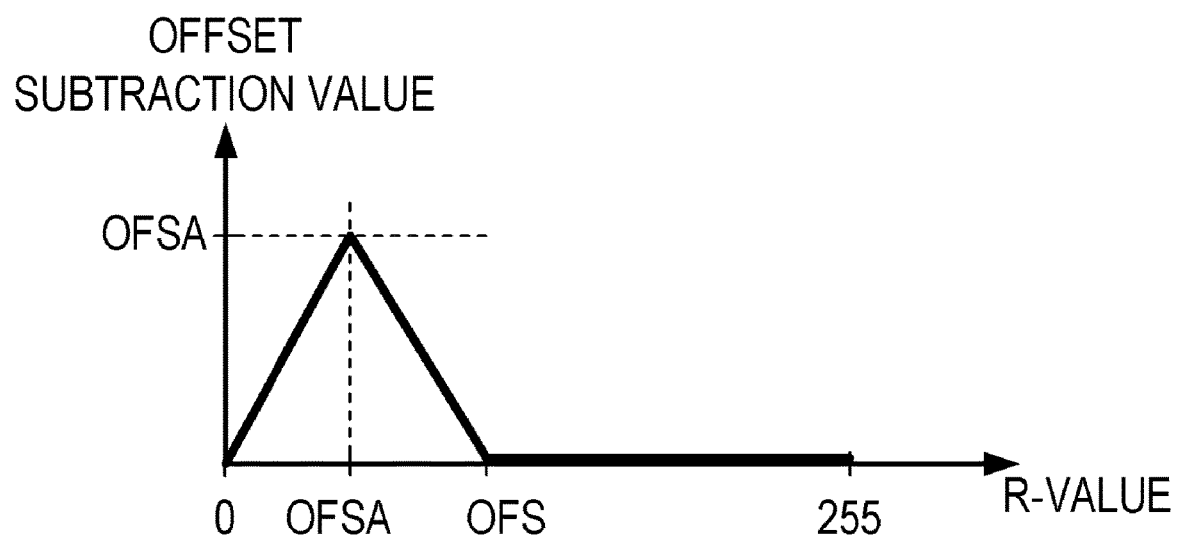
FIG. 29 is a diagram showing an example of a method for determining an offset subtraction value according to the third embodiment.

FIG. 29 is a diagram showing an example of the corresponding relationship between a gradation value and an offset subtraction value. Specifically, FIG. 29 shows the corresponding relationship between an R-value and an offset subtraction value to be subtracted from the R-value in a case where a G-value and a B-value are 0. It appears from FIG. 29 that the offset subtraction value reduces from to 0 to the OFSA in a case where the R-value increases from 0 to the OFSA. In addition, it appears that the offset subtraction value reduces from the OFSA to 0 in a case where the R-value increases from the OFSA to OFS. Further, it appears that 0 is obtained as the offset subtraction value in the range of the R-value greater than or equal to the OFS.

Note that the black display-unevenness correction value OFSA corresponds to an increasing amount of a lower-limit gradation value by the black display-unevenness correction processing. Therefore, in the embodiment, a reducing amount of the gradation value of second correction image data by the gradation-value reduction processing becomes greater as the gradation value of the second correction image data get closer to an increasing amount of a lower-limit gradation value by the black display-unevenness correction processing.

Note that the number of the lattice points may be greater or smaller than 64. The offset subtraction LUT is only required to have at least 27 lattice points corresponding to all the combinations of three R-values, three G-values, and three B-values. The offset subtraction LUT is only required to have at least 125 lattice points corresponding to all the combinations of five R-values, five G-values, and five B-values. A reducing amount (offset subtraction value) of a gradation value by the gradation-value reduction processing can be more finely set as the number of the lattice points of the first to third lattice points is greater. By the adjustment of the number and arrangement of the lattice points, the degree of reducing the halo phenomenon, the shapes of regions in which the halo phenomenon occurs, or the like can be adjusted.

Note that the gradation-value reduction processing is not limited to the above method. For example, an offset subtraction value common to an R-value, a G-value, and a B-value may be calculated for each pixel by weighing addition using a weight according to a three-dimensional distance. For each pixel, an offset subtraction value to be subtracted from the R-value, the G-value, and the B-value of the pixel may be calculated using a one-dimensional lookup table having lattice points corresponding to one type of gradation values (such as R-values, G-values, B-values, and brightness values (Y-values)). The OFSA may be subtracted from all the gradation values less than or equal to the OFS. However, according to the above method in which three offset subtraction values corresponding to an R-value, a G-value, and a B-value are calculated using the 3DLUT, a reduction in the chroma of pixels by the subtraction of the offset addition values can be reduced. The OFSA may be used as an offset subtraction vale in a case where a gradation value is less than the OFS.

Note that although the embodiment describes an example in which the OFSA is allocated as an output value of the second lattice point, the embodiment is not limited to this example. Based on the black display-unevenness correction value OFSA, an R output value as an output value for an R-value, a G output value as an output value for a G-value, and a B output value as an output value for a B-value may be individually determined. By the adjustment of the balance of the three output values, white balance for displaying a black color can be adjusted. Similarly, as the output values of the lattice points corresponding to the RGB values (0, 0, 0), an R output value, a G output value, and a B output value may be individually determined and used instead of 0. In this case as well, by the adjustment of the balance of the three output values, white balance for displaying a black color can be adjusted.

The control unit 301 generates lower-limit light-emission brightness, a black display-unevenness correction value OFSA, and a gamma adjustment table as the parameters of image processing based on a black display-unevenness threshold OFS, a target contrast, or the like. Then, the control unit 301 outputs the lower-limit light-emission brightness to the BL-brightness determination unit 305, the black display-unevenness correction value OFSA to the offset addition unit 302 and the offset subtraction unit 310, and the gamma adjustment table to the gamma adjustment unit 311.

First, a description will be given of a method for determining the lower-limit light-emission brightness.

In a case where it is assumed that the transmittance of the liquid-crystal devices in a case where the upper-limit gradation value 255 is input to the liquid-crystal panel 308 is represented by TW and the reference value of light-emission brightness is represented by LS, display brightness can be represented by TW×LS. In addition, in a case where it is assumed that the transmittance of the liquid-crystal devices in a case where the black display-unevenness threshold OFS is input to the liquid-crystal panel 308 is represented by TB and lower-limit light-emission brightness is represented by LB, display brightness can be represented by TB×LB. Further, in the embodiment, respective processing is performed such that the ratio of the display brightness TW×LS to the display brightness TB×LB agrees with a target contrast. Therefore, the target contrast C can be represented by the following Equation 6. Further, since the TW, the LS, the TB, and the C are known values, the lower-limit light-emission brightness LB can be calculated using the following Equation 7.

$$C=(TW\times LS)/(TB\times LB) \hspace{2cm} \text{(Equation 6)}$$

$$LB=(TW\times LS)/(TB\times C) \hspace{2cm} \text{(Equation 7)}$$

Next, a description will be given of a method for determining the black display-unevenness correction value OFSA.

At displaying a black color, the BL-brightness determination unit 305 controls light-emission brightness at the lower-limit light-emission brightness LB. Then, the image correction unit 307 increases the transmittance of pixels by LS/LB times. Here, in order to reduce the size of black display-unevenness to a level less than or equal to an allowable level, a gradation value greater than or equal to the black display-unevenness threshold OFS is required as a gradation value to be input to the liquid-crystal panel 308 at displaying the black color. Accordingly, a gradation value to be input to the image correction unit 307 is required to be a value greater than or equal to OFS×LB/LS. Accordingly, OFS×LB/LS is calculated and, a value greater than or equal to the calculated value can be used as the black display-unevenness correction value OFSA. In the embodiment, the black display-unevenness correction value OFSA is determined such that the black display-unevenness threshold OFS is used as a gradation value to be input to the liquid-crystal panel 308 at displaying the black color. Specifically, the black display-unevenness correction value OFSA is calculated using the following Equation 8.

$$OFSA = OFS \times LB/LS \quad \text{(Equation 8)}$$

Next, a description will be given of a method for generating the gamma adjustment table.

In the embodiment, it is assumed that predetermined gradation characteristics (desired gradation characteristics; target value of the gradation characteristics of first correction image data) are linear characteristics. Further, the offset addition value of the offset addition unit 302 is calculated by the linear interpolation between lattices. Therefore, the gamma adjustment table may be determined based on the low-gradation threshold PA of the offset addition LUT.

First, it is assumed that the desired gradation characteristics are those represented by the following Equation 9. In Equation 9, "IN" represents a gradation value, and "Lexp" represents display brightness.

$$Lexp = (IN/255 + 1/C)/(1 + 1/C) \quad \text{(Equation 9)}$$

Further, display brightness LPA in a case where the gradation value PA is input to the offset addition unit 302 can be represented by the following Equation 10.

$$LPA = ((PA \times LS/LB)/255 + TB/TW)/(1 + TB/TW) \times LB/LS \quad \text{(Equation 10)}$$

From Equations 9 and 10, a gradation value GP realizing the display brightness LPA in the desired gradation characteristics can be represented by the following Equation 10.

$$GP = (PA/255 + 1/C) \times (1 + 1/C)/(1 + TB/TW) - 1/C \quad \text{(Equation 11)}$$

Further, using the gradation values PA and GP, a table in which an output value is 0 in a case where an input value is 0, the output value is the PA in a case where the input value is the GP, and the output value is 255 in a case where the input value is 255 can be determined as the gamma adjustment table. Here, the input value is a gradation value before conversion, and the output value is a gradation value after the conversion. FIG. 30 shows an example of the gamma adjustment table. It appears from FIG. 30 that the output value increases from 0 to the PA in a case where the input value increases from 0 to the GP. In addition, it appears that the output value increases from the PA to 255 in a case where the input value increases from the GP to 255.

Figure 31A:
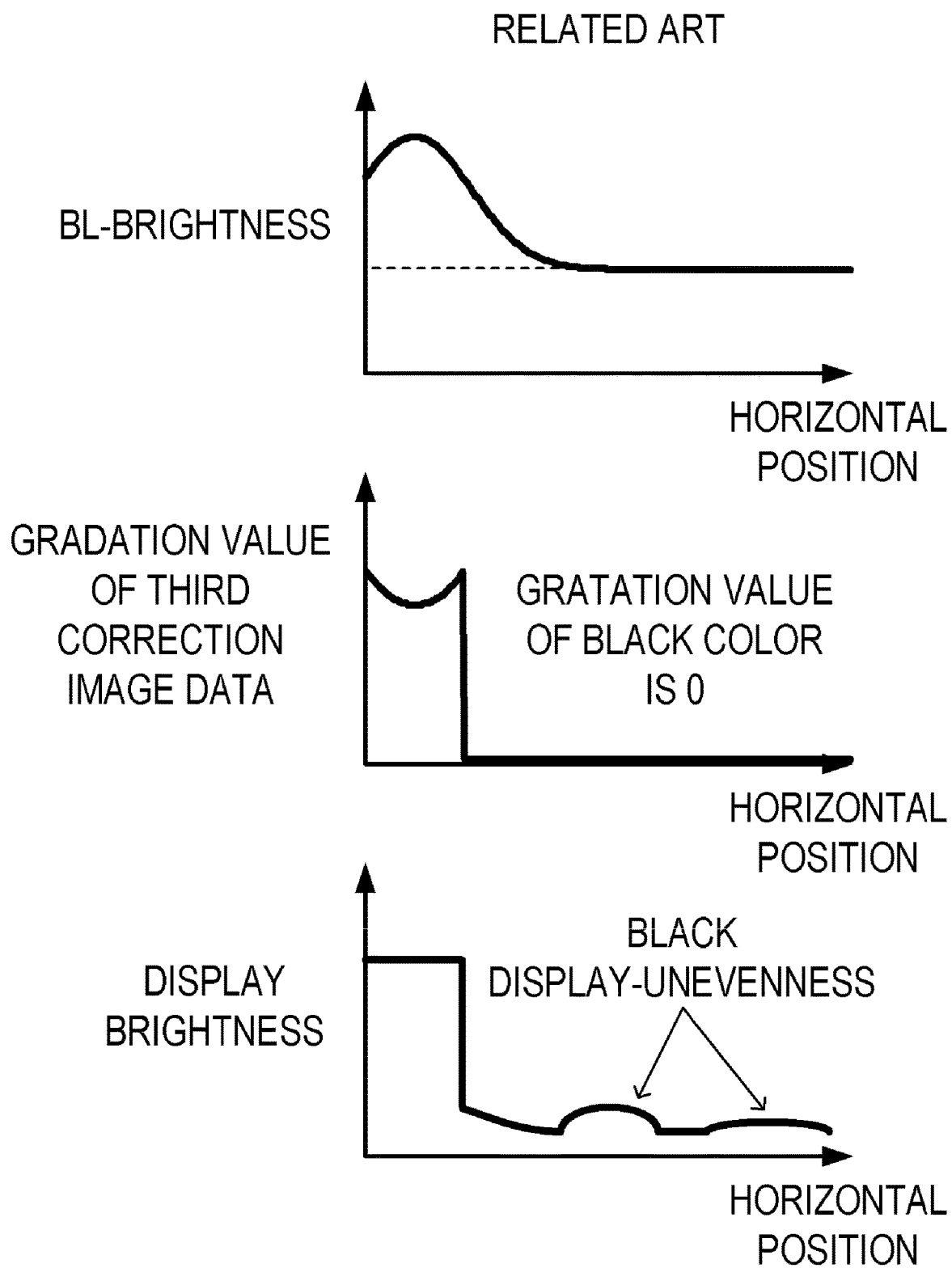
FIG. 31A is a diagram for describing an example of effects according to the third embodiment.
Figure 31B:
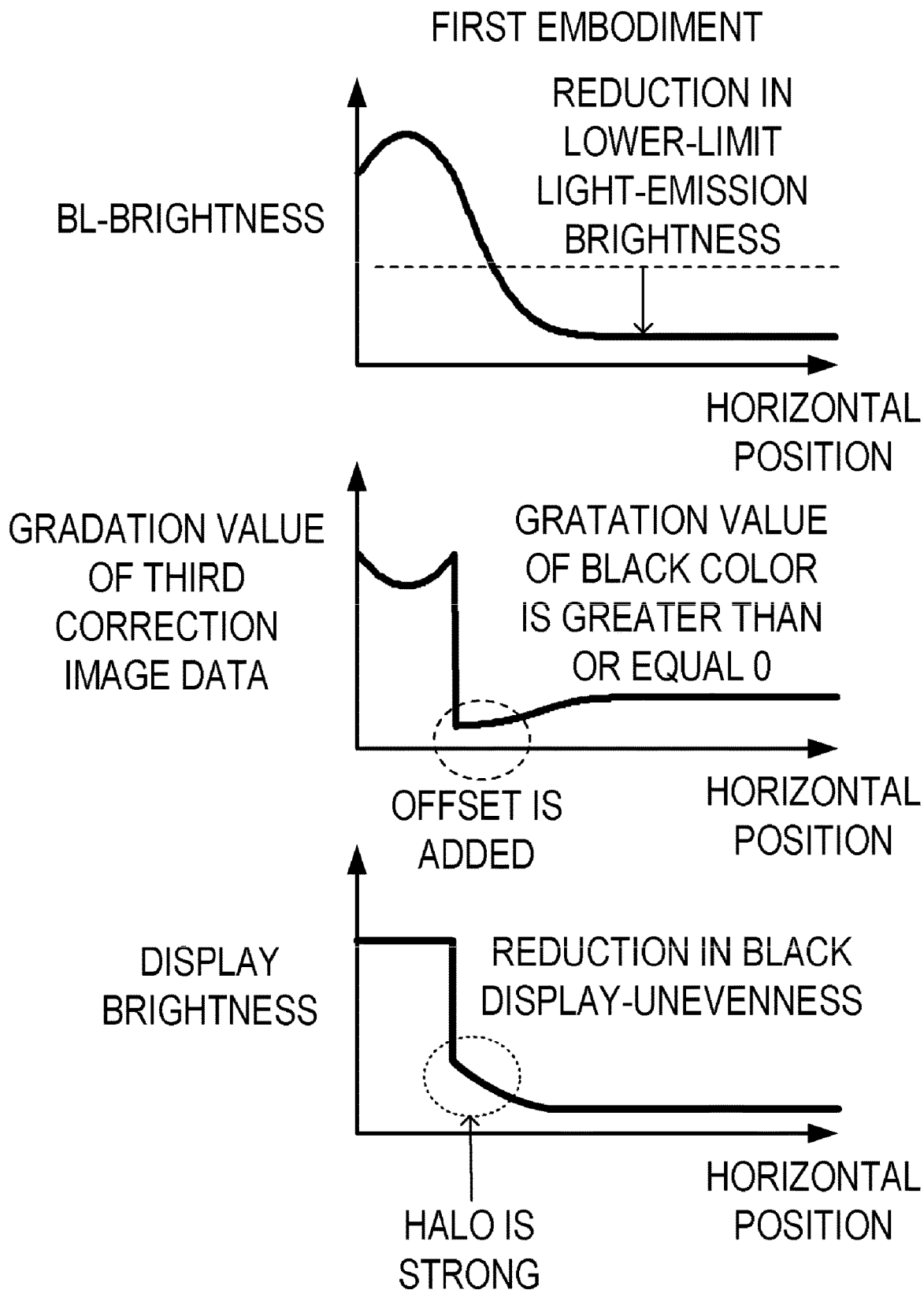
FIG. 31B is a diagram for describing an example of the effects according to the third embodiment.
Figure 31C:
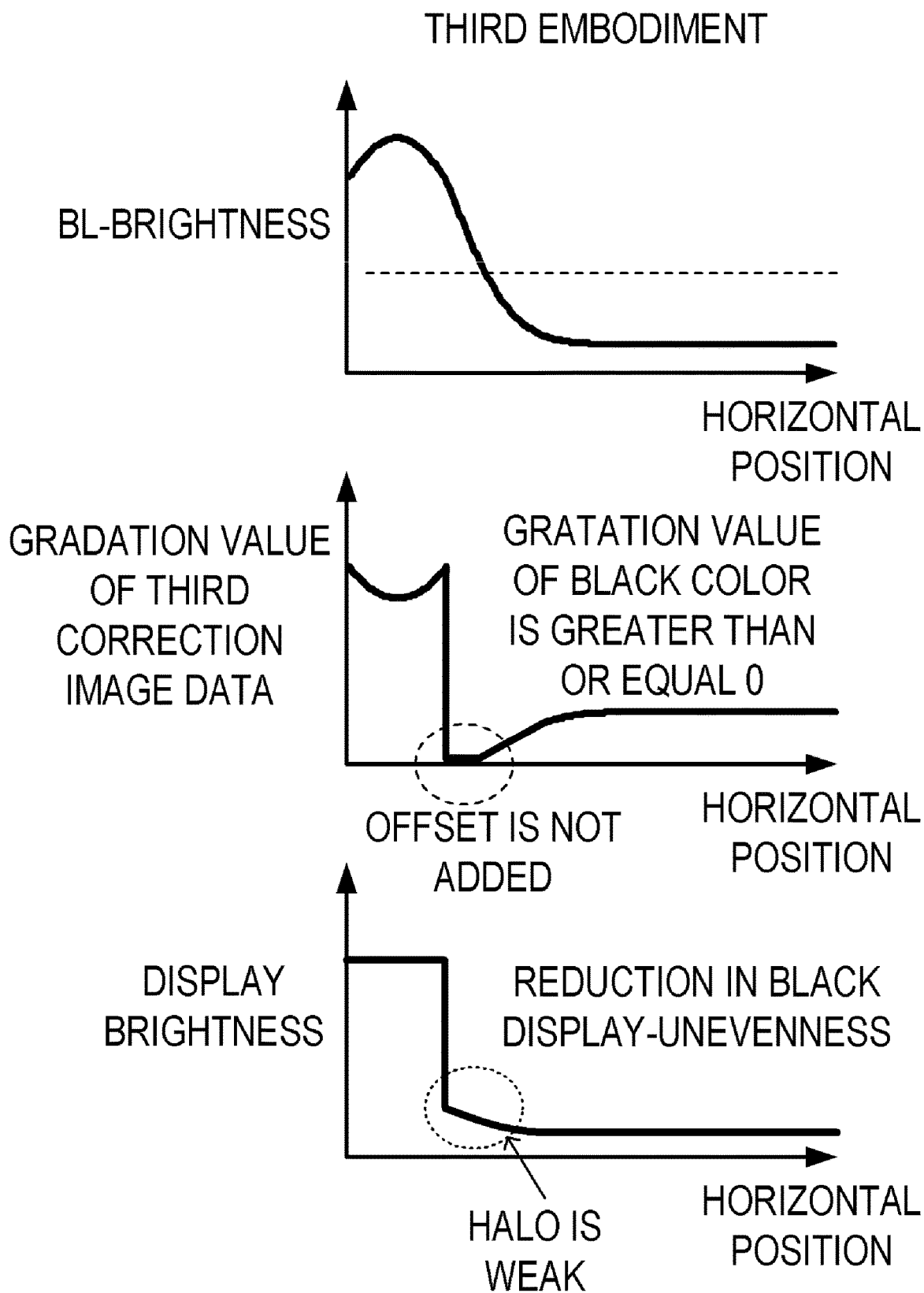
FIG. 31C is a diagram for describing an example of the effects according to the third embodiment.

Next, a description will be given of the effects of the embodiment with reference to FIGS. 31A to 31C. FIGS. 31A to 31C show an example of a case in which input image data is the image data shown in FIG. 24A.

FIG. 31A shows the operation of a related art. Since 0 is input to a liquid-crystal panel as the gradation value of a black color in the related art, conspicuous black display-unevenness occurs in a display image.

FIG. 31B shows an operation according to the first embodiment. Since lower-limit light-emission brightness is reduced and an offset value is added to the input image data in the first embodiment, black display-unevenness can be reduced. However, since the gradation value of a black color is increased to a value greater than 0, the halo phenomenon increases in a region in which light-emission brightness is not substantially reduced.

FIG. 31C shows an operation according to the third embodiment (the embodiment). In the embodiment, besides a reduction in lower-limit light-emission brightness and the addition of an offset value to input image data, an offset value is subtracted from image data (gradation value less than or equal to a black display-unevenness threshold) having been subjected to the extension processing. As a result, in a region in which light-emission brightness is not substantially reduced, the addition of the offset value is cancelled and the gradation value becomes 0 or a small value. As a result, an increase in the halo phenomenon can be prevented, besides a reduction in black display-unevenness.

Note that in a case where a gradation value greater than an upper-limit gradation value is obtained by the image processing (black display-unevenness correction processing, extension processing, and gradation-value reduction processing) in the first to third embodiments, the gradation value is limited to the upper-limit gradation value. In a case where a gradation value smaller than a lower-limit gradation value is obtained by the image processing, the gradation value is limited to the lower-limit gradation value. Processing for limiting a gradation value to an upper-limit gradation value or a lower-limit gradation value may be performed immediately before image data is input to the liquid-crystal panel or may be performed every time the image processing is performed.

Note that the first to third embodiments are only examples and configurations obtained by appropriately modifying or changing the configurations of the first to third embodiments within the range of the scope of the present invention are also included in the present invention. Configurations obtained by appropriately combining the configurations of the first to third embodiments together are also included in the present invention. For example, fourth and fifth embodiments are combined together such that a reduced image is generated and an average brightness value Yav is calculated using pixels existing for every n-pixels among the pixels of the reduced image.

Note that in order to obtain a display image having the same aspect ratio as that of input image data, addition processing for adding an addition image (black strip-shaped image) to the periphery of an image may be performed such that image data has a predetermined aspect ratio. For example, in a case where input image data has an aspect ratio of 16:9 and a screen has an aspect ratio of 4:3, addition processing for adding an addition image to the upper and lower areas of the screen may be performed. In a case where the addition processing is performed before the black display-unevenness correction processing, the display brightness of an addition image can match the display brightness of the black color of input image data by the addition of the addition image having a gradation value of 0. In addition, in a case where the addition processing is performed between the black display-unevenness correction processing and the extension processing, it is only required to add an addition image having a gradation value equal to a black display-unevenness correction value (gradation value obtained by applying the black display-unevenness correction processing to a lower-limit gradation value). Thus, the display brightness of an addition image can match the display brightness of the black color of input image data. In a case where it is desired to set the display brightness of an addition image at a value lower than the display brightness of the black color of input image data, it is only required to add an addition image having a gradation value smaller than a black display-unevenness correction value.

Fourth Embodiment

Hereinafter, a description will be given of an image display apparatus and a method for controlling the same according to a fourth embodiment of the present invention. Note that configurations and processing different from those of the first, second, and third embodiments will be described and configurations and processing the same as those of the first, second, and third embodiments will be omitted. The first and second embodiments describe an example in which all the gradation values of image data are increased by the black display-unevenness correction processing. The third embodiment describes an example in which the halo phenomenon can be more reduced compared with the first and second embodiments.

In order to increase the correction degree of black display-unevenness correction while maintaining a contrast, it is required to reduce the light-emission brightness (light-emission degree) of a BL unit to a value lower than the light-emission brightness of the BL (backlight) unit in a state in which the local dimming processing is not performed. However, due to the limitation items of the driver or other functions of the BL unit, a value available as the lower-limit light-emission brightness of the BL unit may be limited. Therefore, in a case where maximum display brightness (maximum value of brightness displayed on the image display apparatus) set by a user or the like is low, the light-emission degree of the BL unit cannot be greatly reduced since the light-emission brightness of the BL unit is originally low. Meanwhile, a human hardly detects black display-unevenness as the brightness of a black color is lower but easily detects the same as the brightness of the black color is higher.

In view of this, the embodiment will describe an example in which the ratio of lower-limit light-emission brightness (lower-limit light-emission rate) to the light-emission brightness of the BL unit in a case where the local dimming processing is not performed is made smaller as set maximum display brightness is higher to increase the correction degree of black display-unevenness correction. Thus, at display brightness at which black display-unevenness is conspicuous, the black display-unevenness can be greatly reduced in a state in which lower-limit light-emission brightness does not fall short of a minimum value available as the lower-limit light-emission brightness of the BL unit.

Figure 32:
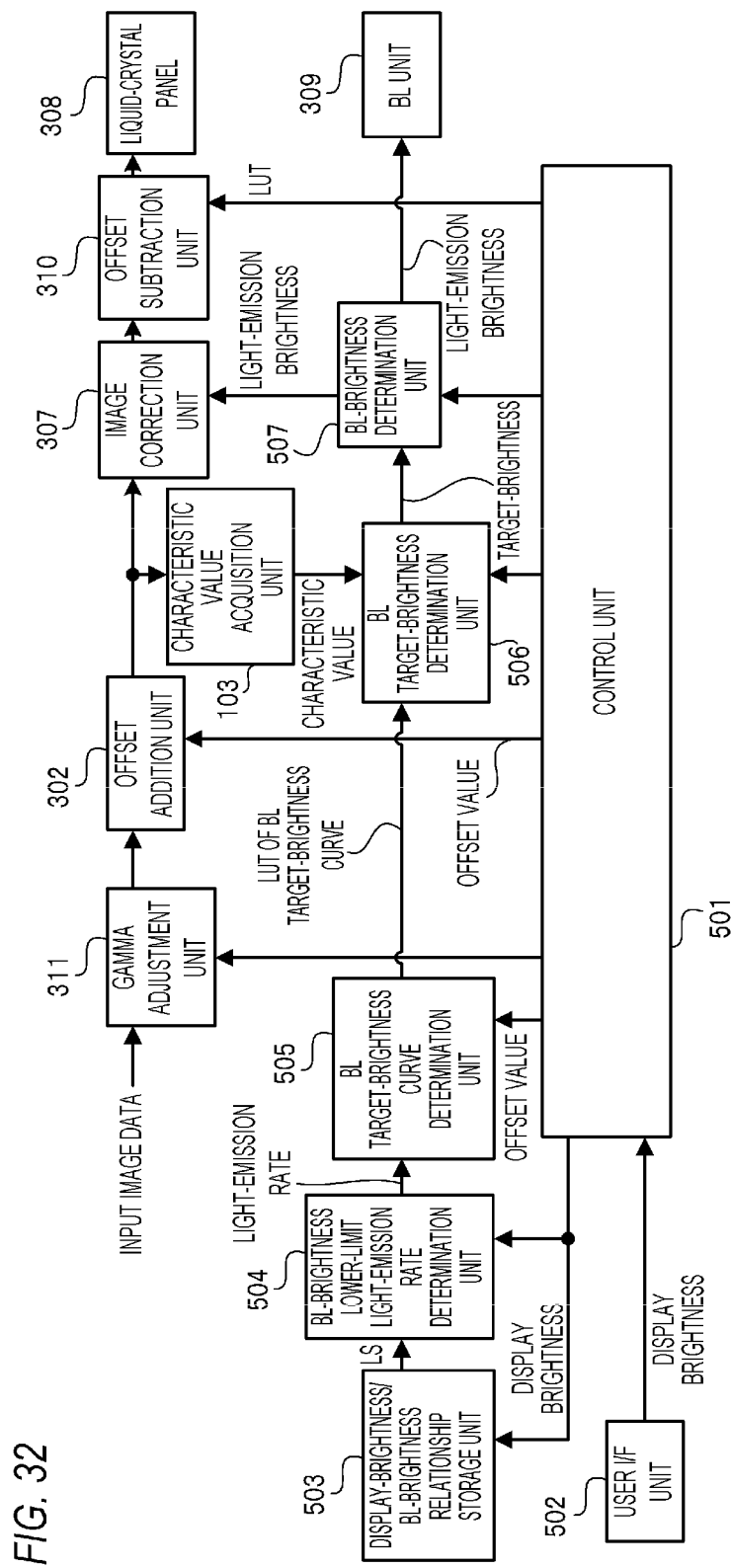
FIG. 32 is a block diagram showing an example of the functional configuration of an image display apparatus according to a fourth embodiment.

FIG. 32 is a block diagram showing an example of the functional configuration of the image display apparatus according to the embodiment. As shown in FIG. 32, the image display apparatus according to the embodiment has a control unit 501, a user I/F unit 502, a display-brightness/BL-brightness relationship storage unit 503, a BL-brightness lower-limit light-emission rate determination unit 504, a BL target-brightness curve determination unit 505, a gamma adjustment unit 311, an offset addition unit 302, a BL target-brightness determination unit 506, a BL-brightness determination unit 507, an image correction unit 307, an offset subtraction unit 310, a BL unit 309, and a liquid-crystal panel 308. The functional blocks described in the first to third embodiments will be omitted.

The control unit 501 generates a black display-unevenness correction value OFSA and an offset gamma adjustment table as the parameters of image processing based on a target contrast or the like. Then, the control unit 501 sets the black display-unevenness correction value OFSA to the offset addition unit 302, the offset subtraction unit 310, and the BL target-brightness curve determination unit 505. The control unit 501 sets the gamma adjustment table to the gamma adjustment unit 311. In addition, the control unit 501 acquires information on display brightness (the value of the display brightness) input by a user from the user I/F unit 502 and sets the display brightness input by the user to the display-brightness/BL-brightness relationship storage unit 503 and the BL-brightness lower-limit light-emission rate determination unit 504.

In the embodiment, a fixed value is used as the black display-unevenness correction value OFSA. Since a lower-limit light-emission rate at the local dimming processing is changed according to user-setting brightness (display brightness input by the user) in the embodiment, the upper-limit extension rate of a signal is also changed according to the user-setting brightness. Since the lower-limit light-emission rate is more reduced as the user-setting brightness is higher, the upper-limit extension rate is more increased as the user-setting brightness is higher. In a case where a contrast C is a fixed value, an upper-limit extension rate gain_max can be calculated by the following Equation 12. In Equation 12, LSmax represents the light-emission brightness of the BL unit 309 corresponding to the user-setting brightness and represents the light-emission brightness of the BL unit 309 in a case in which the local dimming processing is not performed. LBmin represents a minimum value available as the lower-limit light-emission brightness.

$$\text{gain\_max} = LB\text{min}/LS\text{max} \qquad \text{(Equation 12)}$$

Further, the relationship between the OFS, the OFSA, and the gain_max is represented by Equation 1 (mura and ofs in Equation 1 correspond to the OFSA and the OFS, respectively). Accordingly, in a case where the black display-unevenness correction value OFSA is determined such that the black display-unevenness threshold OFS is used as a gradation value to be input to the liquid-crystal panel 308 at displaying a black color, the black display-unevenness correction value OFSA can be calculated using the following Equation 13. The control unit 501 sets the OFSA thus calculated to the offset addition unit 302, the offset subtraction unit 310, and the BL target-brightness curve determination unit 505.

$$OFSA = OFS/\text{gain\_max} = OFS \times LB\text{min}/LS\text{max} \qquad \text{(Equation 13)}$$

The user I/F unit 502 is an interface that accepts an input from the user. The interface includes a button provided in the image display apparatus and a graphic image (image such as a menu) to be displayed on the screen of the image display apparatus in a case where the button is pressed. In the embodiment, information on display brightness input by the user is accepted.

Figure 33:
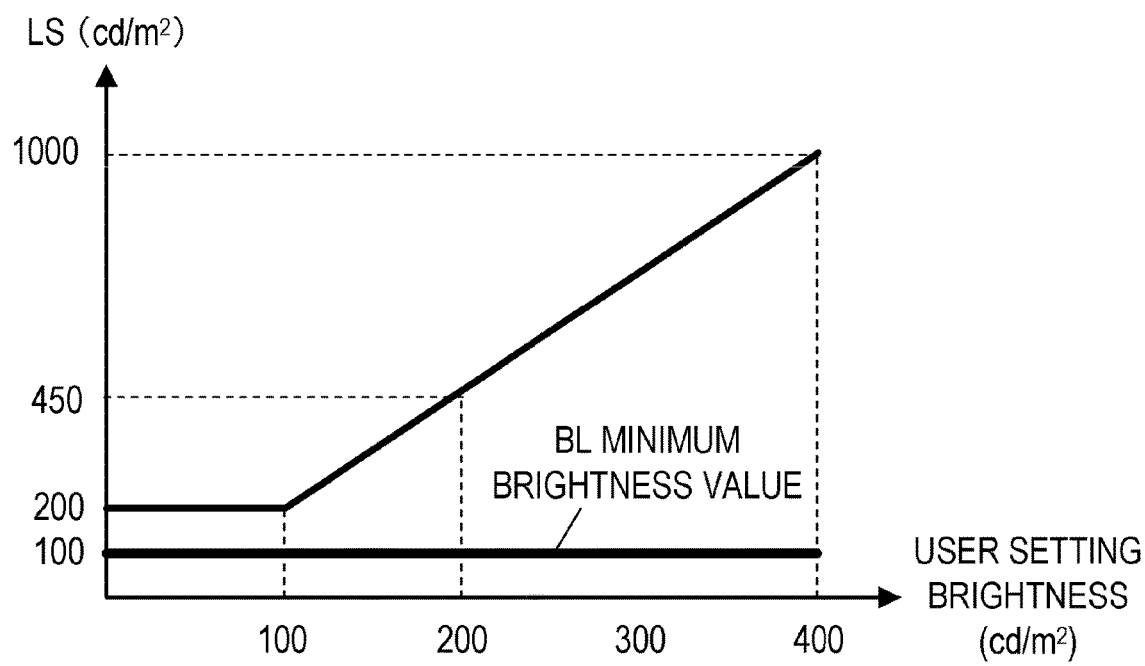
FIG. 33 is a diagram showing an example of the relationship between user-setting brightness and light-emission brightness LS according to the fourth embodiment.

The display-brightness/BL-brightness relationship storage unit 503 determines the light-emission brightness LS of respective divided regions from set display brightness (user-setting brightness) and outputs the light-emission brightness LS of the respective divided regions. The light-emission brightness LS represents the light-emission brightness of the backlight according to the display brightness (user-setting brightness) in a case where the local dimming processing is not performed. FIG. 33 is a graph showing the relationship between the user-setting brightness and the LS. In the graph of FIG. 33, a horizontal axis represents the user-setting brightness, and a vertical axis represents the LS. In the embodiment, it is assumed that display brightness of up to 400 cd/m² may be set and the light-emission brightness of the BL unit 309 in a case where the display brightness of 400 cd/m² is set is 1000 cd/m². The graph of FIG. 33 is stored in the display-brightness/BL-brightness relationship storage unit 503 as a lookup table (LUT), and a value of the LS is read from the LUT and output to the BL-brightness lower-limit light-emission rate determination unit 504 in a case where the display brightness is set by the control unit 501. Note that although the value of the LS is determined using the LUT in the embodiment, it may be determined using an equation. In addition, it is assumed that a minimum value available as lower-limit light-emission brightness is 100 cd/m². The BL minimum brightness value of FIG. 33 is a minimum value available as lower-limit light-emission brightness.

The BL-brightness lower-limit light-emission rate determination unit 504 determines a lower-limit light-emission rate (LRmin) from a value of the LS received from the display-brightness/BL-brightness relationship storage unit 503 and a BL minimum brightness value LBmin (100 cd/m² in the embodiment) stored in advance. The LRmin is determined using the following Equation 14.

$$LRmin = LBmin/LS \qquad \text{(Equation 14)}$$

Since the light-emission brightness LS becomes greater as the user-setting brightness is higher, a value of the LRmin becomes smaller as the user-setting brightness is greater. For example, in a case where the user-setting brightness is 200 cd/m², the graph of the display-brightness/BL-brightness relationship of FIG. 33 shows that the light-emission brightness LS is 450 cd/m². Since FIG. 33 shows LBmin=100 cd/m², the lower-limit light-emission rate LRmin in a case where the user-setting brightness is 200 cd/m² is 0.22 (=100/450). On the other hand, since the graph of FIG. 33 shows LS=1000 cd/m² and LBmin=100 cd/m² in a case where the user-setting brightness is 400 cd/m², the lower-limit light-emission rate LRmin is 0.1 (≈=100/1000). Since the lower-limit light-emission rate becomes smaller as the user-setting brightness is higher, the extension rate of a signal becomes greater as the user-setting brightness is higher. Therefore, since a signal value to be input to the liquid-crystal panel 308 becomes greater as the user-setting brightness is higher, the correction degree of black display-unevenness correction becomes greater as the user-setting brightness is higher. The BL-brightness lower-limit light-emission rate determination unit 504 outputs the value of the LRmin thus determined to the BL target-brightness curve determination unit 505.

Figure 34:
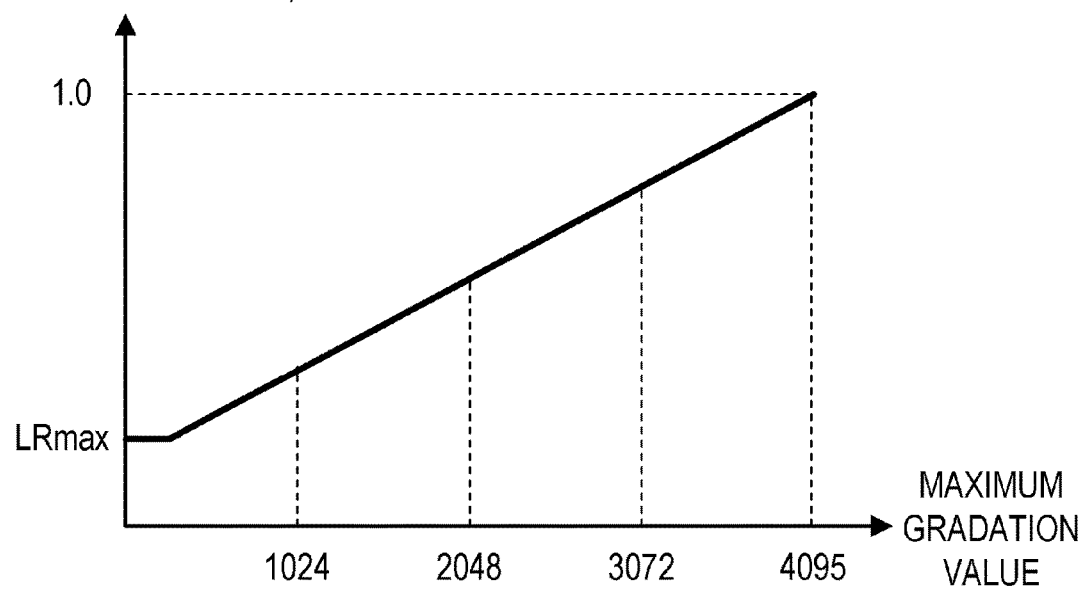
FIG. 34 is a diagram showing an example of a BL target-brightness curve according to the fourth embodiment.

The BL target-brightness curve determination unit 505 generates a table in which the light-emission brightness of the BL unit 309 is calculated from a maximum gradation value for each region acquired by the characteristic value acquisition unit 103 and which is used by the BL target-brightness determination unit 506 at the subsequent stage. The BL target-brightness curve determination unit 505 generates a table based on the value of the LRmin and the OFSA received from the control unit 501. In the embodiment, it is assumed that light-emission brightness in a case where the local dimming processing is not performed is reference brightness (one time). Further, a table is generated in which the ratio of light-emission brightness to the reference brightness is determined as a target brightness rate according to a maximum gradation value. The gradation value 0 of input image data becomes the same value as the OFSA due to the offset addition processing. Therefore, a table is generated in which a minimum target brightness rate is obtained between the gradation value 0 and the gradation value OFSA, the target brightness rate gets close to one time as the gradation value increases from the gradation value OFSA, and the target brightness rate becomes one time at the upper-limit gradation value of input image data. An example of the table is shown in FIG. 34. In FIG. 34, a horizontal axis represents a maximum gradation value, and a vertical axis represents a target brightness rate (light-emission rate). In the embodiment, it is assumed that an input signal is a 12-bit value. Therefore, an upper-limit gradation value (maximum value of a value at which a maximum gradation value may be set) is 4095. In addition, a minimum target brightness rate is LRmin. The BL target-brightness curve determination unit 505 outputs the table (LUT of a BL target-brightness curve) thus determined to the BL target-brightness determination unit 506.

The BL target-brightness determination unit 506 determines the target-brightness rate of the BL unit 309 for each of divided regions using the BL target-brightness curve (LUT) received from the BL target-brightness curve determination unit 505. The BL target-brightness determination unit 506 acquires the characteristic values (maximum gradation values in the embodiment) of the divided regions acquired by the characteristic value acquisition unit 103 and refers to the table generated by the BL target-brightness curve determination unit 505 with the maximum gradation values as inputs. An output read from the table is determined as a target brightness rate for each of the divided regions. Since the LUT shown in FIG. 34 is used in the embodiment, the LRmin is determined as a target brightness rate in a case where the maximum gradation value is the OFSA and one time is determined as a target brightness rate in a case where the maximum gradation value is 4095. The BL target-brightness determination unit 506 outputs the target brightness rate for each of the regions thus determined to the BL-brightness determination unit 507.

The BL-brightness determination unit 507 determines the actual light-emission brightness values of respective light sources from received target brightness rates for the respective divided regions and outputs the determined light-emission brightness values to the BL unit 309 and the image correction unit 307. In the embodiment, from the relationship of FIG. 33, a light-emission brightness value of 1000 cd/m² is determined for regions having a target brightness rate of one time in a case where the user-setting brightness is 400 cd/m². In a case where the target brightness rate is the LRmin (=0.1), a light-emission brightness value of 100 cd/m² is determined. Similarly, in a case where the user-setting brightness is 200 cd/m², a light-emission brightness value of 450 cd/m² is determined for regions having a target brightness rate of one time and a light-emission brightness value of 100 cd/m² is determined for regions having a target brightness rate of the LRmin (=0.22). The BL-brightness determination unit 507 outputs the light-emission brightness values thus determined to the image correction unit 307 and the BL unit 309.

According to the embodiment, a lower-limit light-emission rate is made smaller as set display brightness is higher, whereby the degree of black display-unevenness correction is more increased as the set display brightness is higher. Therefore, even in a case where the minimum value of a value at which lower-limit light-emission brightness may be set is limited, a sense of disturbance feeling due to black display-unevenness can be appropriately reduced. For example, in a case where the user strongly has a sense of disturbance feeling, the disturbance feeling due to black display-unevenness can be greatly reduced.

Note that although the processing for adding the OFSA is performed in the embodiment, conversion processing using a LUT for converting the gradation value 0 of an input signal into the OFSA may be performed. In addition, although a fixed value is used as the OFSA in the embodiment, the OFSA may be adjusted according to the target value of a contrast.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-033005, filed on Feb. 23, 2015, and Japanese Patent Application No. 2015-135997, filed on Jul. 7, 2015, which are hereby incorporated by reference herein in their entirety.

REFERENCE SIGNS

101: black display-unevenness correction-value determination unit
102: black display-unevenness correction processing unit
103: characteristic value acquisition unit
104: BL-brightness curve determination unit
105, 305, 506: BL-brightness determination unit
106: brightness estimation unit
107: extension correction unit
108, 308: liquid-crystal panel
109, 309: BL unit
301, 501: control unit
302: offset addition unit
307: image correction unit
502: user I/F unit
503: display-brightness/BL-brightness relationship storage unit
504: BL minimum light-emission rate determination unit
505: BL target-brightness curve determination unit
506: BL target-brightness determination unit
507: BL-brightness determination unit

The invention claimed is:

1. An image display apparatus comprising:
a display panel configured to display an image by transmitting light;
a plurality of light sources configured to apply light to the display panel;
at least one processor and/or at least one circuit that performs operations of the following units:
a first correction unit configured to generate a first image by increasing a gradation value of an input image that is smaller than a first gradation value;
a light-emission control unit configured to individually control light-emission brightness of each of the light sources based on brightness of each part of the first image corresponding to each of the light sources;
a second correction unit configured to generate a second image by correcting a gradation value of a pixel of the first image according to brightness of light applied to a region of the display panel corresponding to the pixel; and
a third correction unit configured to generate a third image by reducing a gradation value of the second image that is smaller than a second gradation value, wherein
transmittance of the display panel is controlled based on the third image.

2. The image display apparatus according to claim 1, wherein
the third correction unit converts the gradation value of the second image that is smaller than the second gradation value, into a gradation value representing a black color.

3. The image display apparatus according to claim 1, wherein
the at least one processor and/or the at least one circuit further performs operations of the following units:
an estimation unit configured to estimate distribution of the brightness of the light applied to the display panel using the light-emission brightness of each of the light sources, and
the second correction unit corrects a gradation value of a pixel of the first image based on the brightness estimated by the estimation unit for a region of the display panel corresponding to the pixel.

4. The image display apparatus according to claim 1, wherein
the at least one processor and/or the at least one circuit further performs operations of the following units:
a brightness setting unit configured to set a maximum value of display brightness capable of being displayed by the image display apparatus, and
a ratio of a minimum value of light-emission brightness capable of being controlled by the light-emission control unit to a maximum value of the light-emission brightness capable of being controlled by the light-emission control unit is smaller as the maximum value of the display brightness is higher.

5. The image display apparatus according to claim 1, wherein
a ratio of a minimum value of light-emission brightness capable of being controlled by the light-emission control unit controller to a maximum value of the light-emission brightness capable of being controlled by the light-emission control unit is smaller as the first gradation value is greater.

6. The image display apparatus according to claim 1, wherein
the first correction unit generates the first image such that a gradation value of the first image is greater than or equal to a value corresponding to a target contrast set by a user input.

7. A method for controlling an image display apparatus having
a display panel configured to display an image by transmitting light, and
a plurality of light sources configured to apply light to the display panel,
the method comprising:
a first correction step of generating a first image by increasing a gradation value of an input image that is smaller than a first gradation value;
a light-emission control step of individually controlling light-emission brightness of each of the light sources based on brightness of each part of the first image corresponding to each of the light sources;
a second correction step of generating a second image by correcting a gradation value of a pixel of the first image according to brightness of light applied to a region of the display panel corresponding to the pixel; and
a third correction step of generating a third image by reducing a gradation value of the second image that is smaller than a second gradation value; and
a control step of controlling light transmittance of the display panel based on the third image.

8. The method according to claim 7, wherein
in the third correction step, the gradation value of the second image that is smaller than the second gradation value is converted into a gradation value representing a black color.

9. The method according to claim 7, further comprising:
an estimation step of estimating distribution of the brightness of the light applied to the display panel using the light-emission brightness of each of the light sources, wherein
in the second correction step, a gradation value of a pixel of the first image is corrected based on the brightness estimated in the estimation step for a region of the display panel corresponding to the pixel.

10. The method according to claim 7, further comprising:
a brightness setting step of setting a maximum value of display brightness capable of being displayed by the image display apparatus, wherein
a ratio of a minimum value of light-emission brightness capable of being controlled in the light-emission control step to a maximum value of the light-emission brightness capable of being controlled in the light-emission control step is smaller as the maximum value of the display brightness is higher.

11. The method according to claim 7, wherein
a ratio of a minimum value of light-emission brightness capable of being controlled in the light-emission control step to a maximum value of the light-emission brightness capable of being controlled in the light-emission control step is smaller as the first gradation value is greater.

* * * * *